US008392515B2

(12) United States Patent
Kakivaya et al.

(10) Patent No.: US 8,392,515 B2
(45) Date of Patent: Mar. 5, 2013

(54) SUBFEDERATION CREATION AND MAINTENANCE IN A FEDERATION INFRASTRUCTURE

(75) Inventors: Gopala Krishna R. Kakivaya, Sammamish, WA (US); Lu Xun, Kirkland, WA (US); Richard L. Hasha, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 793 days.

(21) Appl. No.: 12/491,841

(22) Filed: Jun. 25, 2009

(65) Prior Publication Data

US 2009/0319684 A1 Dec. 24, 2009

Related U.S. Application Data

(63) Continuation-in-part of application No. 10/971,451, filed on Oct. 22, 2004, now abandoned, and a continuation-in-part of application No. 11/015,460, filed on Dec. 17, 2004, now Pat. No. 7,624,194, and a continuation-in-part of application No. 11/428,133, filed on Jun. 30, 2006, now Pat. No. 8,095,600, and a continuation-in-part of application No. 11/465,316, filed on Aug. 17, 2006, now Pat. No. 7,730,220.

(51) Int. Cl.
*G06F 15/16* (2006.01)

(52) U.S. Cl. ........................................ 709/206; 709/223

(58) Field of Classification Search .................. 709/206, 709/223

See application file for complete search history.

(56) References Cited

U.S. PATENT DOCUMENTS

| 5,689,701 | A | 11/1997 | Ault et al. |
| 5,745,683 | A | 4/1998 | Lee et al. |
| 5,831,975 | A | 11/1998 | Chen |
| 6,115,804 | A | 9/2000 | Carpenter |
| 6,243,814 | B1 | 6/2001 | Matena |
| 6,253,292 | B1 | 6/2001 | Jhang |
| 6,269,085 | B1 | 7/2001 | Provino |
| 6,279,034 | B1 | 8/2001 | Jarriel et al. |
| 6,304,556 | B1 | 10/2001 | Haas |
| 6,411,967 | B1 | 6/2002 | Van Renesse |
| 6,449,641 | B1 | 9/2002 | Moiin |
| 6,456,597 | B1 | 9/2002 | Bare |
| 6,480,473 | B1 | 11/2002 | Chambers et al. |
| 6,542,513 | B1 | 4/2003 | Franke |
| 6,546,415 | B1 | 4/2003 | Park |
| 6,553,377 | B1 | 4/2003 | Eschelbeck et al. |
| 6,615,362 | B1 | 9/2003 | Daruwalla |

(Continued)

FOREIGN PATENT DOCUMENTS

| EP | 1139602 | 10/2001 |
| EP | 1398924 | 3/2004 |

(Continued)

OTHER PUBLICATIONS

U.S. Appl. No. 11/936,556, filed Nov. 7, 2007, Hasha.

(Continued)

*Primary Examiner* — Adnan Mirza
(74) *Attorney, Agent, or Firm* — Workman Nydegger

(57) ABSTRACT

A computational system determines that a joining node in the federation infrastructure desires to join an identified subfederation within the federation infrastructure. The system accesses the joining node's group table, where the group table includes membership information identifying subfederations within the federation infrastructure. Each node in the federation maintains neighborhood information for each subfederation of which the node is aware. The system determines that no entry for the identified subfederation exists in the joining node's group table and, based on the determination, routes a group join message to a rendezvous point within the federation infrastructure. The rendezvous point checks its group table for an entry corresponding to the identified subfederation. The system also receives an indication from the rendezvous point indicating that the rendezvous point's group table does not include a corresponding entry for the identified subfederation and that the joining node is the first member of the identified subfederation.

24 Claims, 40 Drawing Sheets

U.S. PATENT DOCUMENTS

| | | |
|---|---|---|
| 6,708,198 B1 | 3/2004 | Simmons |
| 6,775,703 B1 | 8/2004 | Burns |
| 6,836,756 B1 | 12/2004 | Gruber |
| 6,850,987 B1 | 2/2005 | McCanne |
| 6,909,721 B2 | 6/2005 | Ekberg |
| 6,917,985 B2 | 7/2005 | Madruga et al. |
| 6,928,578 B2 | 8/2005 | Archibald |
| 6,947,963 B1 | 9/2005 | Agarwal |
| 6,980,555 B2 | 12/2005 | Mar |
| 6,983,397 B2 | 1/2006 | Fairhurst |
| 6,988,173 B2 | 1/2006 | Blake |
| 7,043,550 B2 | 5/2006 | Knop |
| 7,062,563 B1 | 6/2006 | Lewis |
| 7,076,507 B1 | 7/2006 | Tarin |
| 7,085,825 B1 | 8/2006 | Pishevar |
| 7,103,884 B2 | 9/2006 | Fellin |
| 7,117,273 B1 | 10/2006 | O'Toole et al. |
| 7,120,824 B2 | 10/2006 | Burton |
| 7,137,018 B2 | 11/2006 | Gutman et al. |
| 7,139,270 B1 | 11/2006 | Fatehi et al. |
| 7,139,930 B2 | 11/2006 | Mashayekhi |
| 7,177,646 B2 | 2/2007 | O'Neill et al. |
| 7,181,547 B1 | 2/2007 | Millet |
| 7,231,463 B2 | 6/2007 | Nagendra |
| 7,324,440 B2 | 1/2008 | Takagi |
| 7,334,062 B1 | 2/2008 | Agarwal et al. |
| 7,353,335 B2 | 4/2008 | Kawamura |
| 7,362,718 B2 | 4/2008 | Kakivaya |
| 7,373,468 B1 | 5/2008 | Gupta |
| 7,379,994 B2 | 5/2008 | Collazo |
| 7,404,006 B1 | 7/2008 | Slaughter |
| 7,453,884 B2 | 11/2008 | Ma |
| 7,463,648 B1 | 12/2008 | Eppstein |
| 7,466,662 B2 | 12/2008 | Kakivaya |
| 7,467,265 B1 | 12/2008 | Tawri et al. |
| 7,478,263 B1 | 1/2009 | Kownacki |
| 7,512,649 B2 | 3/2009 | Faybishenko |
| 7,571,290 B1 | 8/2009 | Ranade et al. |
| 7,613,703 B2 | 11/2009 | Kakivaya |
| 7,617,289 B2 | 11/2009 | Srinivasan et al. |
| 7,778,972 B1 | 8/2010 | Cormie |
| 7,805,407 B1 | 9/2010 | Verbeke et al. |
| 7,984,137 B2 * | 7/2011 | O'Toole et al. ............... 709/224 |
| 2002/0059425 A1 | 5/2002 | Belfiore |
| 2002/0085506 A1 | 7/2002 | Hundscheidt |
| 2002/0128995 A1 | 9/2002 | Muntz et al. |
| 2002/0129086 A1 | 9/2002 | Garcia-Luna-Aceves |
| 2002/0150094 A1 | 10/2002 | Cheng |
| 2002/0150145 A1 | 10/2002 | Alriksson |
| 2002/0184357 A1 | 12/2002 | Traversat |
| 2003/0009754 A1 | 1/2003 | Rowley et al. |
| 2003/0055892 A1 | 3/2003 | Huitema |
| 2003/0067871 A1 | 4/2003 | Busi |
| 2003/0108050 A1 | 6/2003 | Black et al. |
| 2003/0110408 A1 | 6/2003 | Wells |
| 2003/0131246 A1 | 7/2003 | Reeves et al. |
| 2003/0145086 A1 | 7/2003 | O'Reilly |
| 2003/0152098 A1 | 8/2003 | Zhu |
| 2003/0165140 A1 | 9/2003 | Tang |
| 2003/0182444 A1 | 9/2003 | Pedone |
| 2003/0220993 A1 | 11/2003 | Blizniak et al. |
| 2004/0054807 A1 | 3/2004 | Harvey et al. |
| 2004/0064511 A1 | 4/2004 | Abdel-Aziz |
| 2004/0064548 A1 | 4/2004 | Adams et al. |
| 2004/0066741 A1 | 4/2004 | Dinker |
| 2004/0098502 A1 | 5/2004 | Xu et al. |
| 2004/0111651 A1 | 6/2004 | Mukherjee |
| 2004/0122927 A1 | 6/2004 | Muehl |
| 2004/0139150 A1 | 7/2004 | McCanne |
| 2004/0215795 A1 | 10/2004 | Poyhonen |
| 2004/0218536 A1 | 11/2004 | Yasukawa |
| 2004/0236945 A1 | 11/2004 | Risan et al. |
| 2005/0021725 A1 | 1/2005 | Lobbert |
| 2005/0031119 A1 | 2/2005 | Ding |
| 2005/0050320 A1 | 3/2005 | Wassmann et al. |
| 2005/0091399 A1 | 4/2005 | Candan |
| 2005/0100036 A1 | 5/2005 | Davis |
| 2005/0108481 A1 | 5/2005 | Iyengar et al. |
| 2005/0111352 A1 | 5/2005 | Ho |
| 2005/0114291 A1 | 5/2005 | Becker-Szendy |
| 2005/0138173 A1 | 6/2005 | Ha |
| 2005/0152318 A1 | 7/2005 | Elbatt |
| 2005/0187946 A1 | 8/2005 | Zhang |
| 2005/0220106 A1 | 10/2005 | Raverdy |
| 2005/0276216 A1 | 12/2005 | Vasseur |
| 2006/0015507 A1 | 1/2006 | Butterworth |
| 2006/0039371 A1 | 2/2006 | Castro |
| 2006/0087990 A1 | 4/2006 | Kakivaya |
| 2006/0088015 A1 | 4/2006 | Kakivaya |
| 2006/0106940 A1 | 5/2006 | Jagannathan |
| 2006/0155781 A1 | 7/2006 | MacCormick |
| 2006/0182034 A1 | 8/2006 | Klinker et al. |
| 2006/0282505 A1 | 12/2006 | Hasha |
| 2007/0002774 A1 | 1/2007 | Hasha |
| 2007/0016663 A1 | 1/2007 | Weis |
| 2007/0053285 A1 | 3/2007 | Beer |
| 2007/0183460 A1 | 8/2007 | Enders |
| 2007/0204061 A1 | 8/2007 | Chen |
| 2007/0214194 A1 | 9/2007 | Reuter |
| 2007/0271385 A1 | 11/2007 | Davis |
| 2008/0005624 A1 | 1/2008 | Kakivaya |
| 2008/0031246 A1 | 2/2008 | Hasha |
| 2008/0069124 A1 | 3/2008 | Patrick |
| 2009/0268677 A1 | 10/2009 | Chou |
| 2010/0046399 A1 | 2/2010 | Kakivaya |
| 2010/0262717 A1 | 10/2010 | Critchley |
| 2011/0235551 A1 | 9/2011 | Kakivaya |
| 2011/0238841 A1 | 9/2011 | Kakivaya |
| 2012/0036237 A1 | 2/2012 | Hasha |

FOREIGN PATENT DOCUMENTS

| | | |
|---|---|---|
| EP | 1643730 | 4/2006 |
| EP | 1650911 | 4/2006 |
| JP | 2004-266796 | 9/2004 |
| JP | 2005-323346 | 11/2005 |

OTHER PUBLICATIONS

U.S. Appl. No. 11/936,589, filed Nov. 7, 2007, Hasha.
U.S. Appl. No. 11/907,799, filed Oct. 19, 2010, Hasha.
Consistancy-based Routing in Overlay Networks (1 page) http://www.actpress.com/Paperinfo.aspx?PaperID=16686.
Enforcing Routing Consistency in Structured Peer to Peer Overlays: Should We and Could We? (6 pages) http://research.microsoft.com/asia/dload_files/group/system/2006/Chen-Cons06.pdf.
On the Consistancy of DHT-Based Routing (17 pages) http://www.eecs.berkeley.edu/-kjk/consistancy-rep.pdf.
U.S. Appl. No. 12/611,825, Oct. 8, 2010, Office Action.
U.S. Appl. No. 11/936,556, Jul. 23, 2010, Office Action.
U.S. Appl. No. 11/220,756, Nov. 23, 2010, Office Action.
Notice of Allowance dated Sep. 14, 2011 cited in U.S. Appl. No. 11/428,146.
Notice of Allowance dated Sep. 14, 2011 cited in U.S. Appl. No. 11/428,133.
Office Action dated Dec. 22, 2011 cited in U.S. Appl. No. 13/221,635.
Office Action dated Mar. 7, 2012 cited in U.S. Appl. No. 13/155,098.
Skonnard, Aaron, "Learn the ABCs of Programming Windows Communication Foundation" MSDN Magazine The Microsoft Journal for Developers, Feb. 2006, pp. 1-14.
Sun Microsystems, "Federeated Naming Service Programming Guide", Sep. 2002, 110 pages.
Triantafillou, "PLANES: The Next Step in Peer-to-Peer Network Architectures", Oct. 2, 2003, retrieved from http://www.celd.upatras.gr/faculty/peter/papers/ on Jan. 3, 2011.
U.S. Appl. No. 11/752,198, Dec. 27, 2010, Notice of Allowance.
U.S. Appl. No. 10/971,451, Dec. 30, 2010, Office Action.
U.S. Appl. No. 11/428,133, Jan. 7, 2011, Office Action.
U.S. Appl. No. 11/220,756, May 10, 2011, Notice of Allowance.
U.S. Appl. No. 11/428,146, May 9, 2011, Office Action.
U.S. Appl. No. 11/428,133, May 9, 2011, Office Action.
"NoN-Greedy Routing Algorithms Are Optimal or Know thy Neighbor's Neighbor", Dec. 8, 2003, retrieved from http://citeseerx.ist.psu.edu/viewdoc/summary?doi=10.1.1.4.4688 on Aug. 12, 2010.

U.S. Appl. No. 11/428,146, Aug. 16, 2010, Office Action.
U.S. Appl. No. 11/428,133, Aug. 19, 2010, Office Action.
Notice of Allowance dated Dec. 4, 2009 cited in U.S. Appl. No. 11/549,332.
Notice of Allowance dated Dec. 23, 2009 cited in U.S. Appl. No. 11/465,316.
Office Action dated Jan. 14, 2010 cited in U.S. Appl. No. 11/220,756.
Office Action dated Feb. 17, 2010 in U.S. Appl. No. 11/752,198.
Office Action dated Feb. 22, 2010 cited in U.S. Appl. No. 10/971,451.
Tang; "GoCast: Gossip-Enhanced Overlay Multicast for Fast and Dependable Group Communication"—2005—pp. 1-10—http://www.cogsci.rochester.edu/~sarrmor/publications/GoCast-DSN05.pdf.
Choi; "D2HT: Directory Federation Using DHT to Support Open Scalability in Ubiquitous Network"—2005—pp. 1-5—http://ieeexplore.ieee.org/iel5/9593/30313/01392843.pdf?isNumber=.
Baldi; "A comparison of ring and tree embedding for real-time group multicast"—Jun. 2003—pp. 451-464—http://delivery.acm.org/10.1145/880000/874106/p451-baldi.pdf?key1=874106&key2=4662566811&coll=GUIDE&dl=GUIDE&CFID=31221611&CFTOKEN=81646820.
Garcia-Luna-Aceves; "A Multicast Routing Protocol for Ad-Hoc Networks"—1999—pp. 1-9—http://citeseer.ist.psu.edu/cache/papers/cs/11652/http:zSzzSzwww.cse.ucsc.eduzSzresearchzSzcrgzSzpublicationszSzmadruga.infocom99.pdf/garcia-luna-aceves99multicast.pdf.
Castro; "Proximity neighbor selection in tree-based structured peer-to-peer overlays"—2003—pp. 1-11—http://project-iris.com/irisbib/papers/proximity:mstr03/paper.pdf.
Garces-Erice; "Multi+: Building Topology-Aware Overlay Multicast Trees"—2007—pp. 1-3—http://www.springerlink.com/content/dtbujud595f4ae6f/.
Pierson, Nick, Microsoft Windows Server 2003 R2, "Overview of Active Directory Federation Services in Windows Server 2003 R2", Oct. 2005, 20 pages.
Ahlgren, Bengt, et al., "A Node Identity Internetworking Architecture", Mar. 29, 2006.
Cluster Resources, "Moab Adaptive Computing Suite", 2010, 4 pages.
Narendula, Rammohan, et al., "Towards Access Control Aware P2P Data Management Systems", ACM Internation Conference Proceeding Series; vol. 360, Proceedings of the 2009 EDBT/ICDT Workshops, 2009, 8 pages.
U.S. Appl. No. 11/936,556, Jun. 24, 2011, Notice of Allowance.
Chord: A scalable Peer-to-peer Lookup Protocol for Internet Applications Ion Stoica, Robert Morris, David Liben-Nowell, David R. Karger, M. Frans Kaashoek, Frank Dabek, Harris Balakrishnan, Member, IEEE/ACM Transactions on Networking, vol. 11, No. 1, Feb. 2003.
Pastry: Scalable, decentralized object location and routing for large-scale peer-to-peer systems Anthony Rowstron and Peter Druschel, 2001.
Kademlia: A Peer-to-peer Information System Based on the XOR Metric Peter Maymounkov and David Mazieres, p. 1-15, 2002.
Exploiting network proximity in peer-to-peer overlay networks Miguel Castro, Peter Druschel, Y. Charlie Hu, Anthony Rowstron, Technical Report MSR-TR-2002-82 pp. 1-15, 2002.
A Scalable Content-Addressable Network Sylvia Ratnasamy, Paul Francis, Mark Handley, Richard Karp, Scott Shenker p. 1-17 Written by Vladimir Eske. Saarland University, Department of Computer Science, 2001.
A Scalable Content-Addressable Network, Sylvia Ratnasamy, et al, Copyright 2001, Aug. 27-31, 2001, San Diego, CA p. 161-172.
Tapestry: An Infrastructure for Fault-tolerant Wide-area Location and Routing, Ben Y. Zhao, et al., Computer Science Division, p. 1-27.
Conti, Marco, et al. "Towards Scalable P2P Computing for Mobile Ad Hoc Networks" Pervasive Computing and Communications Workshops, 2004. Proceedings of the Second IEEE Annual Conference on, Piscataway, NJ, Mar. 14, 2002, pp. 109-113.
Ganesan, Prasanna, et al. Canon in Go Major: Designing DHT's with Hierarchical Structure, Distributed Computing Systems, 2004 Proceedings, 24th International Conference on Hachioji, Tokyo, Japan, Mar. 24, 2004, pp. 263-272.

Cai, Min, et al. "MAAN: A Multi-Attributed Addressable Network for Grid Information Services" Grid Computing, 2003, Proceedings, Fourth International Workshop on Nov. 17, 2003, Piscataway, NJ, pp. 184-191.
Liu, Huaiyu, et al. "Neighbor Table Construction and Update in a Dynamic Peer-to-Peer Network" Proceedings of the 23rd International Conference on Distributed Computing Systems, ICDCS 2003. Providence, RI, May 19-22, vol. Conf. 23, May 19, 2003, pp. 509-518.
Seshadri, Mukund, "A Scalable Architecture for Broadcast Federation", http://www.cs.berkeley.edu/~mukunds/ms/citris/ms-report.pdf, Dec. 2002.
Krumm, John, et al., "The NearMe Wireless Proximity Server", Ubi Comp 2004. The Sixth International Conference on Ubiquitous Computing, Sep. 7-10, 2004, Nottingham, England, http://research.microsoft.com/users/jckrumm/Publications%202004/nearme%20distribute.pdf.
Waldo, Jim, Sun Microsystems, Inc. "Constructing Ad Hoc Networks", pp. 9-20 2001 IEEE.
Berger Stefan, et al., "Towards Pluggable Discovery Frameworks for Mobile and Pervasive Applications", 12 pages 2004 IEEE.
Pertselakis, M., et al., "An Intelligent Agent based approach for Service Discovery in Wireless AD hoc Networks", 2002.
Gandhi, Rajiv, et al., "Minimizing Broadcast Latency and Redundancy in Ad Hoc Networks", 2003, pp. 222-232.
Li, Ning, et al., "BLMST: A Scalable, Power-Efficient Broadcast Algorithm for Wireless Networks", IEEE Computer Society, 2004.
Chen et al., "Enforcing Routing Consistency in Structured Peer to Peer Overlays: Should We and Could We?", 6 pages. 2006.
Gupta, Manish, "TPC-W E-Commerce Benchmark Using Javlin/ObjectStore", 6 pages, 2001.
Mendonga et al., "The Hierarchical Ring Protocol: An Efficient Scheme for Reading Replicated Data", Date: 1993, 33 pages.
Naef et al., "The blue-c Distributed Scene Graph", dated: 2003.
Wepiwe, Giscard, et al., A concentric Multi-ring Overlay for Highly Reliable P2P Networks, Proceedings of the 2005 Fourth IEEE International Symposium on Network Computing and Applications (NCA'05), 8 page.
Cohen, Reuven, et al., "A New Protocol for Route Discovery in Multiple-Ring Networks: Park II—Multicast, Recovery and High-Speed Processing", IEEE Transactions on Communications, vol. 42, No. 2/3/4, Feb./Mar./Apr. 1994, pp. 1112-1119.
Wang, Guojun, et al., "A Proxy-based Mobile Group Membership Protocol for Large Scale and Highly Dynamic Groups", Jun. 2006, IEEE, pp. 1897-1902.
Harvey et al., "SkipNet: A Scalable Overlay Network with Practical Locality Properties", Mar. 2003, Retrieved from http://research.microsoft.com/en-us/um/people/ssaroiu/publications/usits/2003/abstract.html on Jul. 2009.
Pietzuch et al., "Hermes: A Distributed Event-Based Middleware Architecture", Jul. 11, 2002, Retrieved from http://ieee.org.xpls/abs_all.jsp?arnumber=1030837 on Jul. 6, 2009.
Office Action Jun. 8, 2009 cited in U.S. Appl. No. 10/971,451.
Notice of Allowance dated Sep. 25, 2007 cited in U.S. Appl. No. 11/016,446.
Notice of Allowance dated Nov. 14, 2007 cited in U.S. Appl. No. 11/016,446.
Office Action dated Apr. 2, 2009 cited in U.S. Appl. No. 11/220,756.
Office Action dated Feb. 5, 2009 cited in U.S. Appl. No. 11/015,460.
Notice of Allowance dated Jun. 15, 2009 cited in U.S. Appl. No. 11/015,460.
Notice of Allowance dated Sep. 14, 2009 cited in U.S. Appl. No. 11/015,460.
Notice of Allowance dated Oct. 1, 2008 cited in U.S. Appl. No. 11/016,422.
Office Action dated May 7, 2009 cited in U.S. Appl. No. 11/549,332.
Office Action dated Aug. 21, 2009 cited in U.S. Appl. No. 11/752,198.
Office Action dated Mar. 16, 2009 cited in U.S. Appl. No. 11/428,146.
Office Action dated Aug. 17, 2009 cited in U.S. Appl. No. 11/428,146.

Office Action dated Jun. 24, 2009 cited in U.S. Appl. No. 11/465,316.
Office Action dated Feb. 6, 2009 cited in U.S. Appl. No. 11/428,133.
Office Action dated Jul. 13, 2009 cited in U.S. Appl. No. 11/428,133.
U.S. Appl. No. 11/220,756, Mar. 17, 2011, Notice of Allowance.
U.S. Appl. No. 10/971,451, Mar. 22, 2011, Office Action.
U.S. Appl. No. 12/611,825, Mar. 23, 2011, Office Action.
U.S. Appl. No. 11/220,756, Jul. 20, 2010, Office Action.

Office Action dated Aug. 10, 2012 cited in U.S. Appl. No. 12/821,002.
Notice of Allowance dated Jul. 10, 2012 cited in U.S. Appl. No. 13/155,098.
Notice of Allowance dated Dec. 5, 2012 cited in U.S. Appl. No. 13/155,113.

* cited by examiner

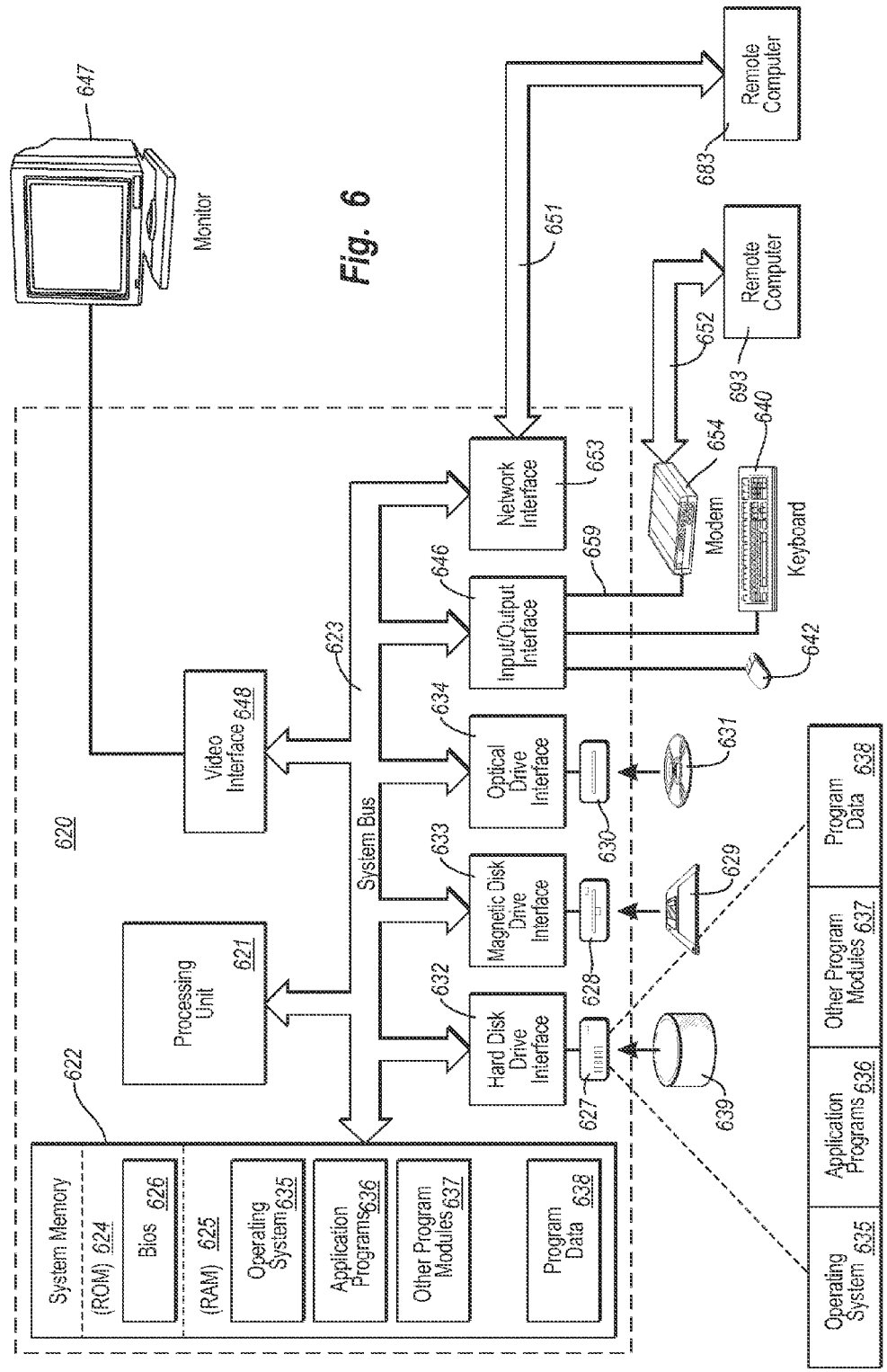

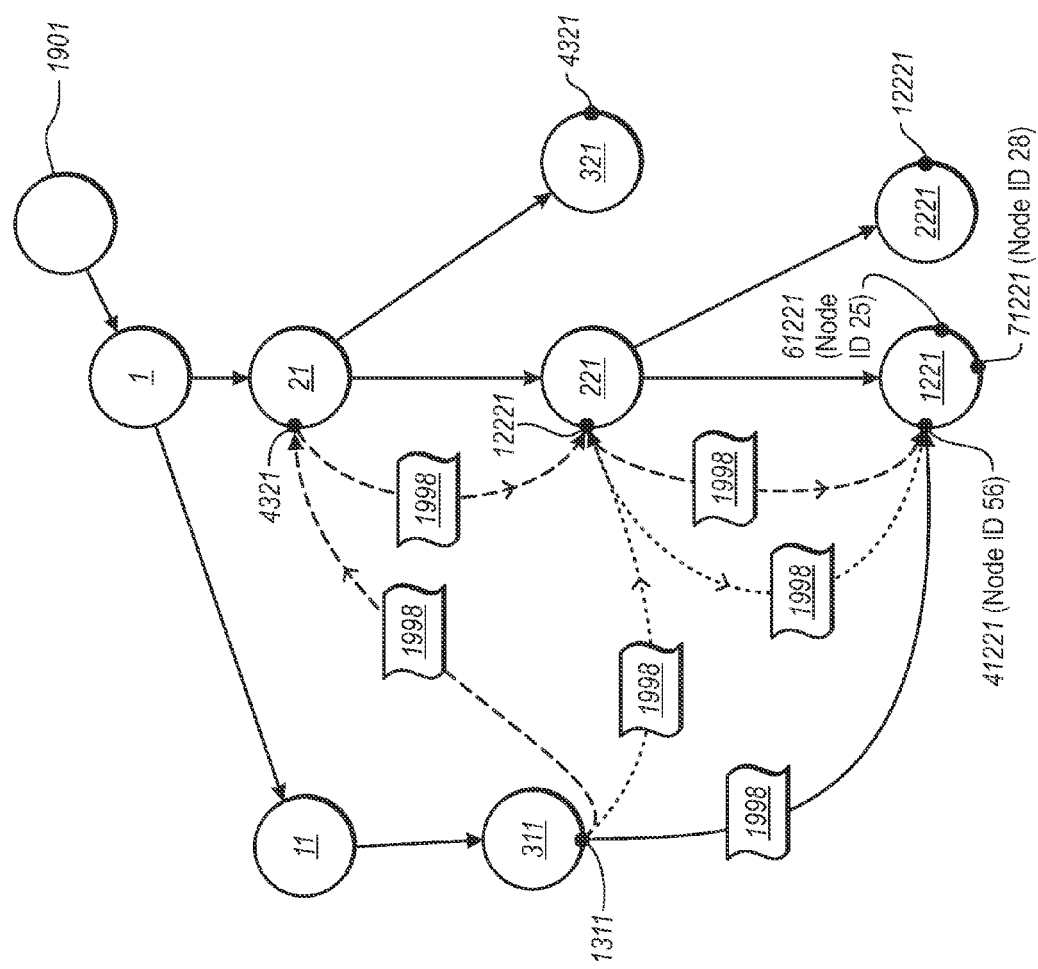

SUBFEDERATION CREATION AND MAINTENANCE IN A FEDERATION INFRASTRUCTURE

CROSS-REFERENCE TO RELATED APPLICATIONS

This application is a continuation-in-part of U.S. patent application Ser. No. 10/971,451, filed Oct. 22, 2004, and entitled "Rendezvousing Resource Requests With Corresponding Resources", which is herein incorporated by reference in its entirety; which is a continuation-in-part of U.S. patent application Ser. No. 11/015,460, filed Dec. 17, 2004, and entitled "Establishing Membership Within A Federation Infrastructure", which is herein incorporated by reference in its entirety. This application is also a continuation-in-part of U.S. patent application Ser. No. 11/428,133, filed Jun. 30, 2006, and entitled "Inter-Proximity Communication within a Rendezvous Federation", which is herein incorporated by reference in its entirety. This application is also a continuation-in-part of U.S. patent application Ser. No. 11/465,316, filed Aug. 17, 2006, and entitled "Broadcasting Communication Within A Rendezvous Federation", which is herein incorporated by reference in its entirety.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the exchange of electronic messages between a number of computer systems and/or other electronic devices via wired and/or wireless computer networks.

However, to utilize a network resource to perform a computerized task, a computer system must have some way to identify and access the network resource. Accordingly, resources are typically assigned unique identifiers, for example, network addresses, that uniquely identify resources and can be used to distinguish one resource from other resources. Thus, a computer system that desires to utilize a resource can connect to the resource using the network address that corresponds to the resource. However, accessing a network resource can be difficult if a computer system has no prior knowledge of a network address for a network resource. For example, a computer system can not print a document at a network printer unless the computer system (or another networked computer system) knows the network address of the network printer.

Accordingly, various mechanisms (e.g., Domain Name System ("DNS"), Active Directory ("AD"), Distributed File Systems ("DFS")) have been developed for computer systems to identify (and access) previous unknown resources. However, due to the quantity and diversity of resources (e.g., devices and services) that are accessible via different computer networks, developers are often required to develop applications that implement a variety of different resource identification and access mechanisms. Each different mechanism may have different coding requirements and may not provide a developer with all the functionality that is needed in an application.

For example, although DNS has a distributed administration architecture (i.e., centralized management is not required), DNS is not sufficiently dynamic, not self-organizing, supports a weak data and query model, and has a fixed set of roots. On the other hand, AD is sufficiently dynamic but requires centralized administration. Further, aspects of different mechanisms may not be compatible with one another. For example, a resource identified using DNS may not be compatible with DFS routing protocols. Thus, a developer may be forced to choose the most suitable mechanism and forgo the advantages of other mechanisms.

Mechanisms for identifying resources can be particularly problematic in peer-to-peer networks. DNS provides a lookup service, with host names as keys and IP addresses as values, that relies on a set of special root servers to implement lookup requests. Further, DNS requires management of information (NS records) for allowing clients to navigate the name server hierarchy. Thus, a resource must be entered into DNS before the resource can be identified on a network. On larger scale networks where nodes frequently connect and disconnect form the network relying on entry of information is not always practical. Additionally, DNS is specialized to the task of find hosts or services and is not generally applicable to other types of resources.

Accordingly, other mechanisms for resource identification and access have been developed to attempt to address these shortcomings. A number of mechanisms include distributed lookup protocols that are more scalable than DNS. These mechanisms use various node arrangements and routing algorithms to route requests to corresponding resources and to store information for lookup.

At least one of these mechanisms utilizes local multi-level neighbor maps at each node in a network to route messages to a destination node. This essentially results in an architecture where each node is a "root node" of a corresponding tree of nodes (the nodes in its neighbor map). Messages are incrementally routed to a destination ID digit by digit (e.g., *6=>46=>, *346=>2346, where *s represent wildcards). The routing efficiency of these types of mechanisms is O(log N) routing hops and require nodes to maintain a routing table of O(log N) size.

At least one other of these mechanisms assigns nodes a unique ID that is taken from a linear ring of numbers. Nodes maintain routing tables that contain pointers to their immediate successor node (according to ID value) and to those nodes whose ID values are the closest successor of the value ID+$2^L$. The routing efficiency of these types of mechanisms is also O(log N) routing hops and require nodes to maintain a routing table of O(log N) size.

At least one further mechanisms requires O(log $IN^{1/d}$) routing hops and requires nodes to maintain a routing table of O(D) size. Thus, the routing efficiency of all of these mechanisms depends, at least in part, on the number of nodes in the system.

Further, since IDs (for at least some of the mechanisms) can be uniformly distributed around a ring, there is always some possibility that routing between nodes on the ring will result in some inefficiency. For example, routing hops can cross vast geographic distances, cross more expensive links, or pass through insecure domains, etc. Additionally, when message routing involves multiple hops, there is some chance that such events will occur multiple times. Unfortunately, these mechanisms do not take into account the proximity of nodes (physical or otherwise) with respect one another. For example, depending on node distribution on a ring, routing a message from New York to Boston could involve routing the message from New York, to London, to Atlanta, to Tokyo, and then to Boston.

Accordingly, at least one other more recent mechanism takes proximity into account by defining proximity as a single scalar proximity metric (e.g., IP routing hops or geographic distance). These mechanisms use the notion of proximity-based choice of routing table entries. Since there are many "correct" node candidates for each routing table entry, these mechanisms attempt to select a proximally close node from among the candidate nodes. For these mechanisms can provide a function that allows each node to determine the "distance" of a node with a given IP address to itself. Messages are routed between nodes in closer proximity to make progress towards a destination before routing to a node that is further away. Thus, some resources can be conserved and routing is more efficient.

Unfortunately, these existing mechanisms typically do not provide for, among other things, symmetric relationships between nodes (i.e., if a first node considers a second node to be its partner, the second node considers the first node as a partner as well), routing messages in both directions (clockwise and counterclockwise) on a ring, partitioning linked lists of nodes based on a plurality of proximity metrics, and routing messages based on a plurality of proximity metrics. These deficiencies can limit dynamic, distributed, and efficient transfer of data between nodes of a network, such as, for example, when broadcasting data to all nodes of the network.

BRIEF SUMMARY

The present invention extends to methods, systems, and computer program products for forming a subfederation within a federation infrastructure. In one embodiment, a computational system determines that a joining node in the federation infrastructure desires to join an identified subfederation within the federation infrastructure. The system accesses the joining node's group table, where the group table includes membership information identifying subfederations within the federation infrastructure. Each node in the federation infrastructure maintains neighborhood information for each subfederation of which the node is aware. The system determines that no entry for the identified subfederation exists in the joining node's group table and, based on the determination, routes a group join message to a rendezvous point of the federation infrastructure. The rendezvous point checks its group table for an entry corresponding to the identified subfederation. The system also receives an indication from the rendezvous point indicating that the rendezvous point's group table does not include a corresponding entry for the identified subfederation and that the joining node is the first member of the identified subfederation.

In another embodiment, a computational system determines that a departing node is a member node of a subfederation within a federation infrastructure. The member node routes a group depart message to the member node's successor and predecessor nodes in the subfederation. Either or both of the successor and predecessor nodes perform the following: updates its group table to include a no-longer-participating indication indicating that the departing member node is no longer participating in the subfederation, propagates the no-longer-participating indication for the departing member node to one or more other nodes in the subfederation and removes the associated entry in its group table corresponding to the departing member node after a time period has expired.

In yet another embodiment, a computational system maintains a subfederation in a federation infrastructure. A first member node that is a member of the federation infrastructure receives federation infrastructure messages from another federation node. The first member node determines from group table information appended to the federation infrastructure messages that a second member node that is a member of a subfederation in the federation infrastructure is no longer active. The first member node also sends a group depart message on behalf of the second member node to predecessor and successor nodes of those subfederations of which the member node was a member indicating that the second member node has departed the subfederation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 6 illustrates a suitable operating environment for the principles of the present invention.

FIG. 19G illustrates an expanded view of a portion of FIG. 19F.

DETAILED DESCRIPTION

Figure 1:
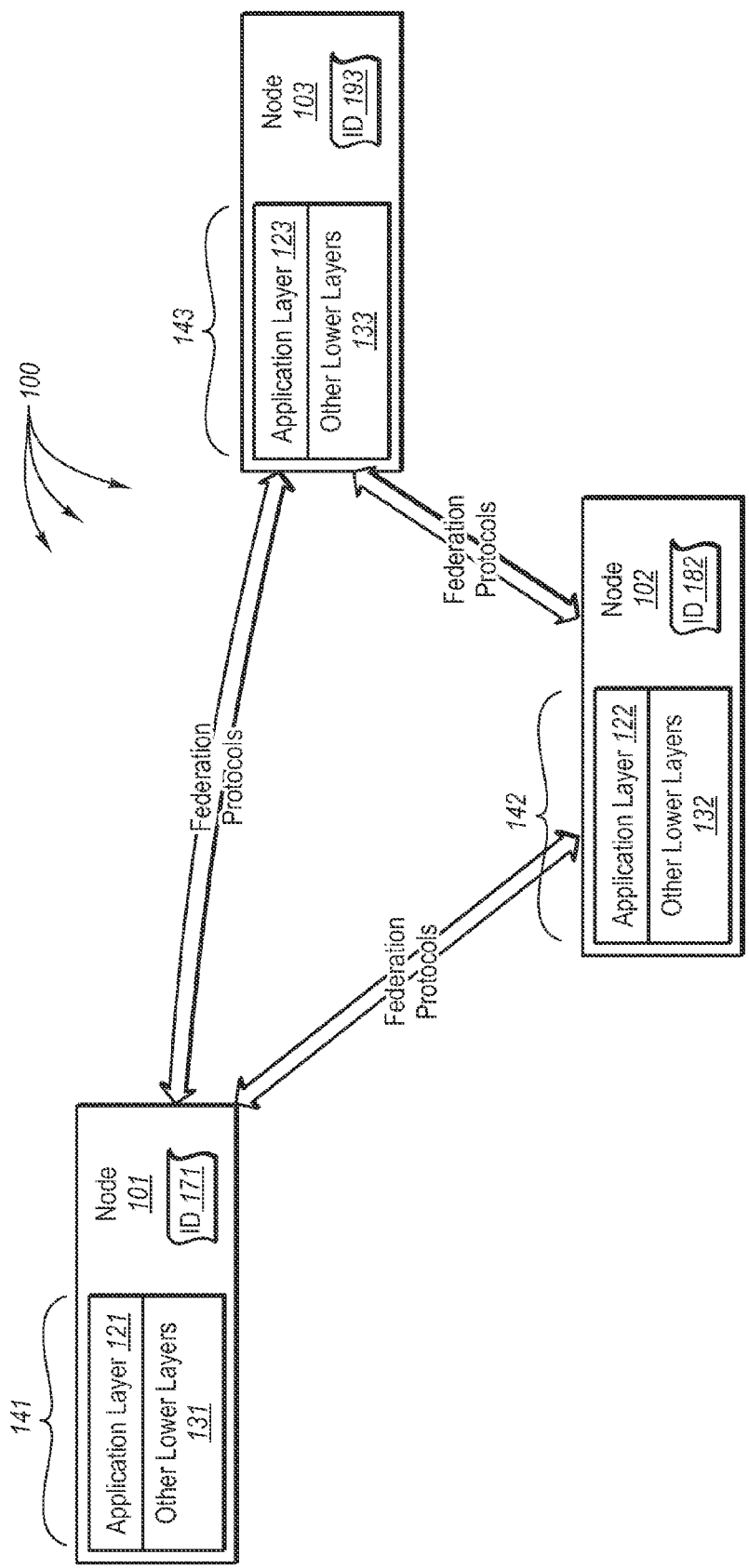
FIG. 1 illustrates an example of a federation infrastructure.

The present invention extends to methods, systems, and computer program products for forming a subfederation within a federation infrastructure. In one embodiment, a computational system determines that a joining node in the federation infrastructure desires to join an identified subfederation within the federation infrastructure. The system accesses the joining node's group table, where the group table includes membership information identifying subfederations within the federation infrastructure. Each node in the federation maintains neighborhood information for each subfederation of which the node is aware. The system determines that no entry for the identified subfederation exists in the joining node's group table and, based on the determination, routes a group join message to a rendezvous point of the federation infrastructure. The rendezvous point checks its group table for an entry corresponding to the identified subfederation. The system also receives an indication from the rendezvous point indicating that the rendezvous point's group table does not include a corresponding entry for the identified subfederation and that the joining node is the first member of the identified subfederation.

In another embodiment, a computational system determines that a departing node is a member node of a subfederation within a federation infrastructure. The member node routes a group depart message to the member node's successor and predecessor nodes in the subfederation. Either or both of the successor and predecessor nodes perform the following: updates its group table to include a no-longer-participating indication indicating that the departing member node is no longer participating in the subfederation, propagates the no-longer-participating indication for the departing member node to one or more other nodes in the subfederation and removes the associated entry in its group table corresponding to the departing member node after a time period has expired.

In yet another embodiment, a computational system maintains a subfederation in a federation infrastructure. A first member node that is a member of the federation infrastructure receives federation infrastructure messages from another federation node. The first member node determines from group table information appended to the federation infrastructure messages that a second member node that is a member of a subfederation in the federation infrastructure is no longer active. The first member node also sends a group depart message on behalf of the second member node to predecessor and successor nodes of those subfederations of which the member node was a member indicating that the second member node has departed the subfederation.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links (of possibly different speeds) that enable the transport of electronic data between computer systems and/or modules (e.g., hardware and/or software modules). When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code. In some embodiments, hardware modules, such as, for example, special purpose integrated circuits or Gate-arrays are optimized to implement the principles of the present invention.

In this description and in the following claims, a "node" is defined as one or more software modules, one or more hardware modules, or combinations thereof, that work together to perform operations on electronic data. For example, the definition of a node includes the hardware components of a personal computer, as well as software modules, such as the operating system of the personal computer. The physical layout of the modules is not important. A node can include one or more computers coupled via a network. Likewise, a node can include a single physical device (such as a mobile phone or Personal Digital Assistant "PDA") where internal modules (such as a memory and processor) work together to perform operations on electronic data. Further, a node can include special purpose hardware, such as, for example, a router that includes special purpose integrated circuits.

Those skilled in the art will appreciate that the invention may be practiced in network computing environments with many types of node configurations, including, personal computers, laptop computers, hand-held devices, multi-processor systems, microprocessor-based or programmable consumer electronics, network PCs, minicomputers, mainframe computers, mobile telephones, PDAs, pagers, routers, gateways, brokers, proxies, firewalls, redirectors, network address translators, and the like. The invention may also be practiced in distributed system environments where local and remote nodes, which are linked (either by hardwired data links, wireless data links, or by a combination of hardwired and wireless data links) through a network, both perform tasks. In a distributed system environment, program modules may be located in both local and remote memory storage devices.

FIG. 6 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 6, an example system for implementing the invention includes a general-purpose computing device in the form of computer system 620, including a processing unit 621, a system memory 622, and a system bus 623 that couples various system components including the system memory 622 to the processing unit 621. Processing unit 621 can execute computer-executable instructions designed to implement features of computer system 620, including features of the present invention. The system bus 623 may be any of several types of bus structures including a memory bus or memory controller, a peripheral bus, and a local bus using any of a variety of bus architectures. The system memory includes read only memory ("ROM") 624 and random access memory ("RAM") 625. A basic input/output system ("BIOS") 626, containing the basic routines that help transfer information between elements within computer system 620, such as during start-up, may be stored in ROM 624.

The computer system 620 may also include magnetic hard disk drive 627 for reading from and writing to magnetic hard disk 639, magnetic disk drive 628 for reading from or writing to removable magnetic disk 629, and optical disk drive 630 for reading from or writing to removable optical disk 631, such as, or example, a CD-ROM or other optical media. The magnetic hard disk drive 627, magnetic disk drive 628, and optical disk drive 630 are connected to the system bus 623 by hard disk drive interface 632, magnetic disk drive-interface 633, and optical drive interface 634, respectively. The drives and their associated computer-readable media provide non-volatile storage of computer-executable instructions, data structures, program modules, and other data for the computer system 620. Although the example environment described herein employs magnetic hard disk 639, removable magnetic disk 629 and removable optical disk 631, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 639, magnetic disk 629, optical disk 631, ROM 624 or RAM 625, including an operating system 635, one or more application programs 636, other program modules 637, and program data 638. A user may enter commands and information into computer system 620 through keyboard 640, pointing device 642, or other input devices (not shown), such as, for example, a microphone, joy stick, game pad, scanner, or the like. These and other input devices can be connected to the processing unit 621 through input/output interface 646 coupled to system bus 623. Input/output interface 646 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 647 or other display device is also connected to system bus 623 via video interface 648. Speakers 669 or other audio output device is also connected to system bus 623 via audio interface 649. Other peripheral output devices (not shown), such as, for example, printers, can also be connected to computer system 620.

Computer system 620 is connectable to networks, such as, for example, an office-wide or enterprise-wide computer network, a home network, an intranet, and/or the Internet. Computer system 620 can exchange data with external sources, such as, for example, remote computer systems, remote applications, and/or remote databases over such networks.

Computer system 620 includes network interface 653, through which computer system 620 receives data from external sources and/or transmits data to external sources. As depicted in FIG. 6, network interface 653 facilitates the exchange of data with remote computer system 683 via link 651. Network interface 653 can logically represent one or more software and/or hardware modules, such as, for example, a network interface card and corresponding Network Driver Interface Specification ("NDIS") stack. Link 651 represents a portion of a network (e.g., an Ethernet segment), and remote computer system 683 represents a node of the network.

Likewise, computer system 620 includes input/output interface 646, through which computer system 620 receives data from external sources and/or transmits data to external sources. Input/output interface 646 is coupled to modem 654 (e.g., a standard modem, a cable modem, or digital subscriber line ("DSL") modem) via link 659, through which computer system 620 receives data from and/or transmits data to external sources. As depicted in FIG. 6, input/output interface 646 and modem 654 facilitate the exchange of data with remote computer system 693 via link 652. Link 652 represents a portion of a network and remote computer system 693 represents a node of the network.

While FIG. 6 represents a suitable operating environment for the present invention, the principles of the present invention may be employed in any system that is capable of, with suitable modification if necessary, implementing the principles of the present invention. The environment illustrated in FIG. 6 is illustrative only and by no means represents even a small portion of the wide variety of environments in which the principles of the present invention may be implemented.

In accordance with the present invention, nodes, application layers, and other lower layers, as well as associated data, including routing tables and node IDs may be stored and accessed from any of the computer-readable media associated with computer system 620. For example, portions of such modules and portions of associated program data may be included in operating system 635, application programs 636, program modules 637 and/or program data 638, for storage in system memory 622.

When a mass storage device, such as, for example, magnetic hard disk 639, is coupled to computer system 620, such modules and associated program data may also be stored in the mass storage device. In a networked environment, program modules depicted relative to computer system 620, or portions thereof, can be stored in remote memory storage devices, such as, system memory and/or mass storage devices associated with remote computer system 683 and/or remote computer system 693. Execution of such modules may be performed in a distributed environment as previously described.

Federation Architecture

FIG. 1 illustrates an example of a federation infrastructure 100. The federation infrastructure 100 includes nodes 101, 102, 103, that can form different types of federating partnerships. For example, nodes 101, 102, 103 can be federated among one another as peers without a root node. Each of nodes 101, 102, and 103 has a corresponding ID 171, 182, and 193 respectively.

Generally, the nodes 101, 102, 103, can utilize federation protocols to form partnerships and exchange information (e.g., state information related to interactions with other nodes). The formation of partnerships and exchange of information facilitates more efficient and reliable access to resources. Other intermediary nodes (not shown) can exist between nodes 101, 102, and 103 (e.g., nodes having IDs between 171 and 193). Thus, a message routed, for example, between node 101 and node 103, can be pass through one or more of the other intermediary nodes.

Nodes in federation infrastructure 100 (including other intermediary nodes) can include corresponding rendezvous protocol stacks. For example, nodes 101, 102, and 103 include corresponding rendezvous protocol stacks 141, 142, and 143 respectively. Each of the protocols stacks 141, 142, and 143 includes an application layer (e.g., application layers 121, 122, and 123) and other lower layers (e.g., corresponding other lower layers 131, 132, and 133). Each layer in a rendezvous protocol stack is responsible for different functionality related to rendezvousing a resource request with a corresponding resource.

For example, other lower layers can include a channel layer, a routing layer, and a function layer. Generally, a channel layer is responsible for reliably transporting a message (e.g., using WS-ReliableMessaging and Simple Object Access Protocol ("SOAP")) from one endpoint to another (e.g., from node 101 to node 103). The channel layer is also responsible for processing incoming and outgoing reliable messaging headers and maintaining state related to reliable messaging sessions.

Generally, a routing layer is responsible for computing the next hop towards a destination. The routing layer is also responsible for processing incoming and outgoing addressing and routing message headers and maintaining routing state. Generally, a function layer is responsible for issuing and processing rendezvous protocol messages such as join and depart requests, pings, updates, and other messages, as well as generation of responses to these messages. The function layer processes request messages from the routing layer and sends back corresponding response messages, if any, to the originating node using the routing layer. The function layer also initiates request messages and utilizes the routing layer to have the requests messages delivered.

Generally, an application layer processes non-rendezvous protocol specific data delivered from the function layer (i.e., application messages). The function layer can access application data from the application layer and get and put application data in rendezvous protocol messages (e.g., pings and updates). That is, the function layer can cause application data to be piggybacked on rendezvous protocol messages and can cause the application data to be passed back to the application layer in receiving rendezvous protocol nodes. In some embodiments, application data is used to identify resources and resource interests. Thus, an application layer can include application specific logic and state that processes data received from and sent to the other lower layers for purposes of identifying resources and resource interests.

Federating Mechanisms

Nodes can federate using a variety of different mechanisms. A first federating mechanism includes peer nodes forwarding information to all other peer nodes. When a node is to join a federation infrastructure, the node utilizes a broadcast/multicast discovery protocol, such as, for example, WS-Discovery to announce its presence and issues a broadcast/multicast find to detect other nodes. The node then establishes a simple forwarding partnership with other nodes already present on the network and accepts new partnerships with newly joining nodes. Thereafter, the node simply forwards all application specific messages to all of its partner nodes.

A second federating mechanism includes peer nodes that most efficiently transmit application specific messages to their destination(s). When a new node is to join a federation infrastructure, the new node utilizes a broadcast/multicast discovery protocol, such as, for example, WS-Discovery to announce its presence and issues a broadcast/multicast find to detect other nodes that are part of the federation infrastructure. Upon detecting another node, the new node establishes a partnership with the other node. From the established partnership, the new node learns about the presence of other nodes already participating in federation infrastructure. It then establishes partnerships with these newly-learned nodes and accepts any new incoming partnership requests.

Both node arrivals/departures and registrations of interest in certain application specific messages are flooded through the federation infrastructure resulting in every node having global knowledge of other partner nodes and registrations of interest in application specific messages. With such global knowledge, any node can send application specific messages directly to the nodes that have expressed interest in the application specific message.

A third federating mechanism includes peer nodes indirectly forwarding all application specific messages to their destination/s. In this third mechanism, nodes are assigned identifiers (ID's), such as, for example, a 128-bit or 160-bit ID. The node responsible for a maintaining registration of interest in a given application specific message can be determined to be the one whose ID is closest to the one obtained by mapping (e.g., hashing) the destination identity (e.g. URI) of the application specific message to this 128-bit or 160-bit ID-space.

In this third mechanism, node arrivals and departures are flooded over the entire fabric. On the other hand, registrations of interest in certain application specific messages are forwarded to the nodes determined to be responsible for maintaining such registration information. For scalability, load balancing, and fault-tolerance, the node receiving registration of interest in certain application specific messages can reliably flood that registration information within its neighborhood set. The neighborhood set for a specified node can be determined to be the set of nodes having IDs within a pre-defined range on either side of the ID of specified node.

Similar to the second mechanism, a newly-joining node utilizes a broadcast/multicast discovery protocol, such as, for example, WS-Discovery to announce its presence and issues a local broadcast/multi-cast find to detect a node that is already part of the federation infrastructure. The new node establishes a partnership with the discovered node and uses that partnership to learn about the presence of other new nodes participating in the federation infrastructure. The new node then establishes further partnerships with the newly discovered nodes and accepts any new incoming partnership requests. The new node accepts incoming registrations of interest in certain application layer specific resources from its partners for which it is responsible and may flood them over its neighborhood set. Thus, messages can generally be forwarded to their final destination via intermediary routing nodes (e.g., that a newly joining node has partnered with or that a partner node is aware of).

In response to receiving an incoming application specific message, the new node forwards the message to the partner node that may be responsible for maintaining the registration information for the destination specified in the message. Thus, when using this third mechanism, every node in the federation infrastructure has global knowledge of all other nodes but the registration information is efficiently partitioned among the nodes. Application specific messages are transmitted to their final destination via only the partner's nodes that may have the responsibility for maintaining registration information of interest in those application specific messages. Thus, indirection is accomplished by forwarding only to the partner node that has global knowledge of the registration information of interest for the message being processed. This is in contrast to the first mechanism where the indirection is accomplished by forwarding to all the partner nodes.

A fourth federating mechanism includes peer nodes that route messages to other peer nodes. This fourth mechanism differs from the third mechanism at least in that both node arrivals/departures and registrations of interest in certain application specific messages are all routed instead being flooded. Routing protocols are designed to guarantee rendezvous between application specific messages and the registration messages that express interest in those application specific messages.

Figure 2:
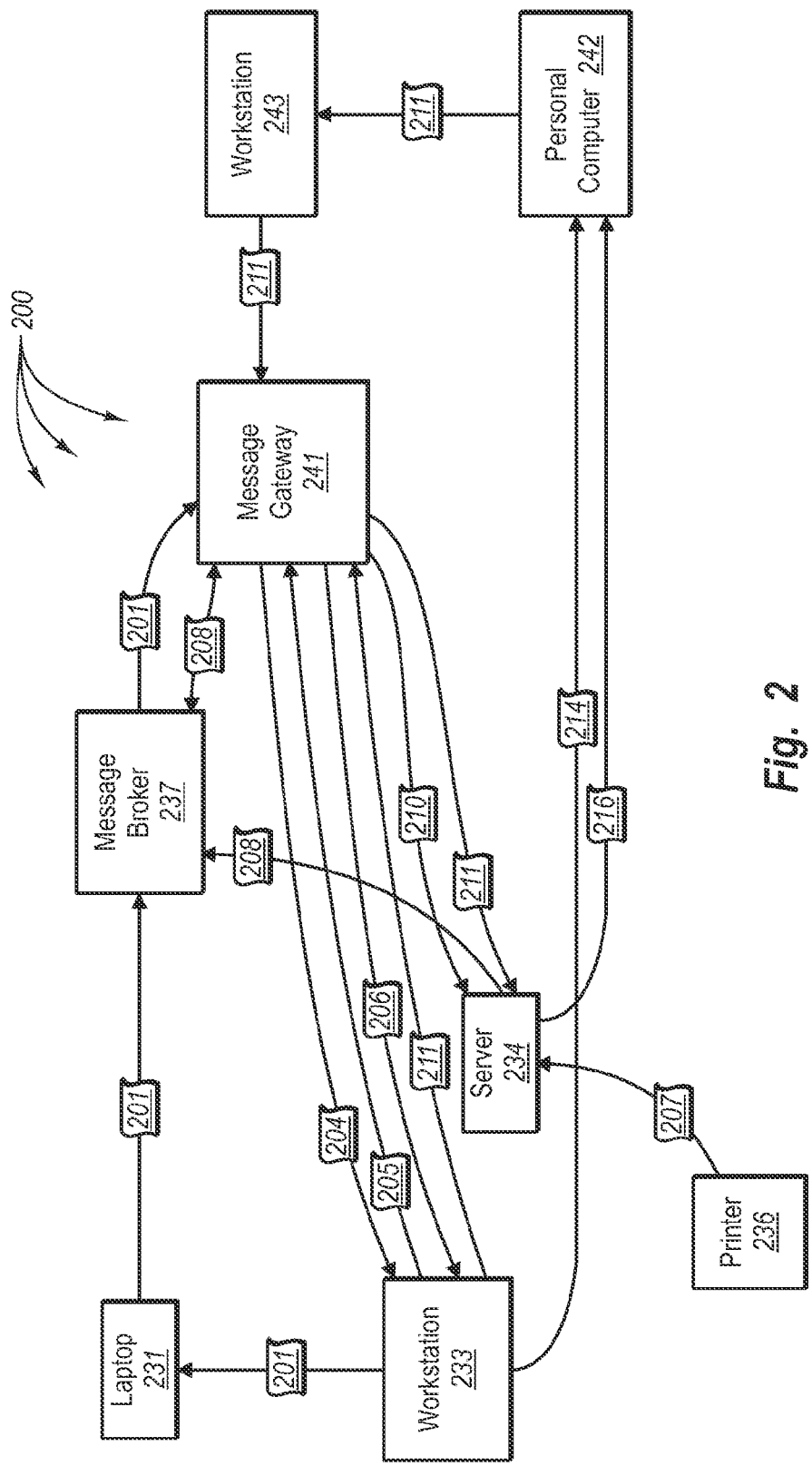
FIG. 2 illustrates an example of a computer architecture that facilitates routing request indirectly to partners.

FIG. 2 illustrates an example of a computer architecture 200 that facilitates routing requests indirectly to partners. Computer architecture 200 depicts different types of computer systems and devices potentially spread across multiple local discovery scopes participating in a federation infrastructure.

Workstation 233 can include a registered PnP provider instance. To inform its partners of the presence of this PnP provider instance, workstation 233 routes registration request 201 over the federation infrastructure. Registration request 201 is initially forwarded to laptop 231, which in turn forwards registration request 201 to message broker 237, which in turn forwards registration request 201 to message gateway 241. Message gateway 241 saves the registration information registration request 201 in its database and returns success message 204 to workstation 233.

Subsequently, another registered provider instance, this time that of running services, comes alive within the workstation 233. This time the node is aware that message gateway 241 is responsible for registrations and forwards registration request 205 to message gateway 241 directly. Message gateway 241 saves the registration information registration request 205 in its database and returns success message 206 to workstation 233.

Subsequently, the printer 236 (e.g., a UPnP printer) is powered on and sends announcement 207. Server 234 detects announcement 207 and routes registration request 208 to message broker 237. Message broker 237 forwards registration request 208 to message gateway 241. Message gateway 241 saves the registration information registration request 208 in its database and returns success message 210 to server 234.

Subsequently, personal computer 242 issues lookup request 211 to discover all devices. Since personal computer 242 doesn't know where to forward lookup request 211, it routes lookup request 211 through workstation 243. As registration and lookup requests are routed to the same destination, the routing protocol essentially guarantees rendezvous between the two requests resulting in workstation 243 forwards find request 211 to message gateway 241. Message gateway 241 looks up the registration information maintained by it and forwards find request 211 to both the workstation 233 and server 234. Workstation 233 and server 234 send response messages 214 and 216 respectively to personal computer 242.

This fourth mechanism works by routing (instead of flooding) a request to the node (message gateway 241) that has global knowledge of the registrations specified in a request. This fourth mechanism, as will be described in further detail below, essentially guarantees that routing can be accomplished in O(log N) hops, where N is the number of nodes participating in the federation infrastructure. Since this fourth mechanism efficiently partitions both node partnership and registration information, it scales to very large networks, even the Internet.

Although a number of federating mechanisms have been described, it would be apparent to one skilled in the art, after having reviewed this description, that other federation mechanisms are possible.

Relationship Between Nodes in a Federation

Accordingly, a federation consists of a set of nodes that cooperate among themselves to form a dynamic and scalable network in which information can be systematically and efficiently disseminated and located. Nodes are organized to participate in a federation as a sorted list using a binary relation that is reflexive, anti-symmetric, transitive, total, and defined over the domain of node identities. Both ends of the sorted list are joined, thereby forming a ring. Thus, each node in the list can view itself as being at the middle of the sorted list (as a result of using modulo arithmetic). Further, the list is doubly linked so that any node can traverse the list in either direction.

Each federating node can be assigned an ID (e.g., by a random number generator with duplicate detection) from a fixed set of IDs between 0 and some fixed upper bound. Thus, adding 1 to an ID of the fixed upper bound results in an ID of zero (i.e., moving from the end of the linked list back to the beginning of the linked listed). In addition, a 1:1 mapping function from the value domain of the node identities to the nodes themselves is defined.

Figure 3:
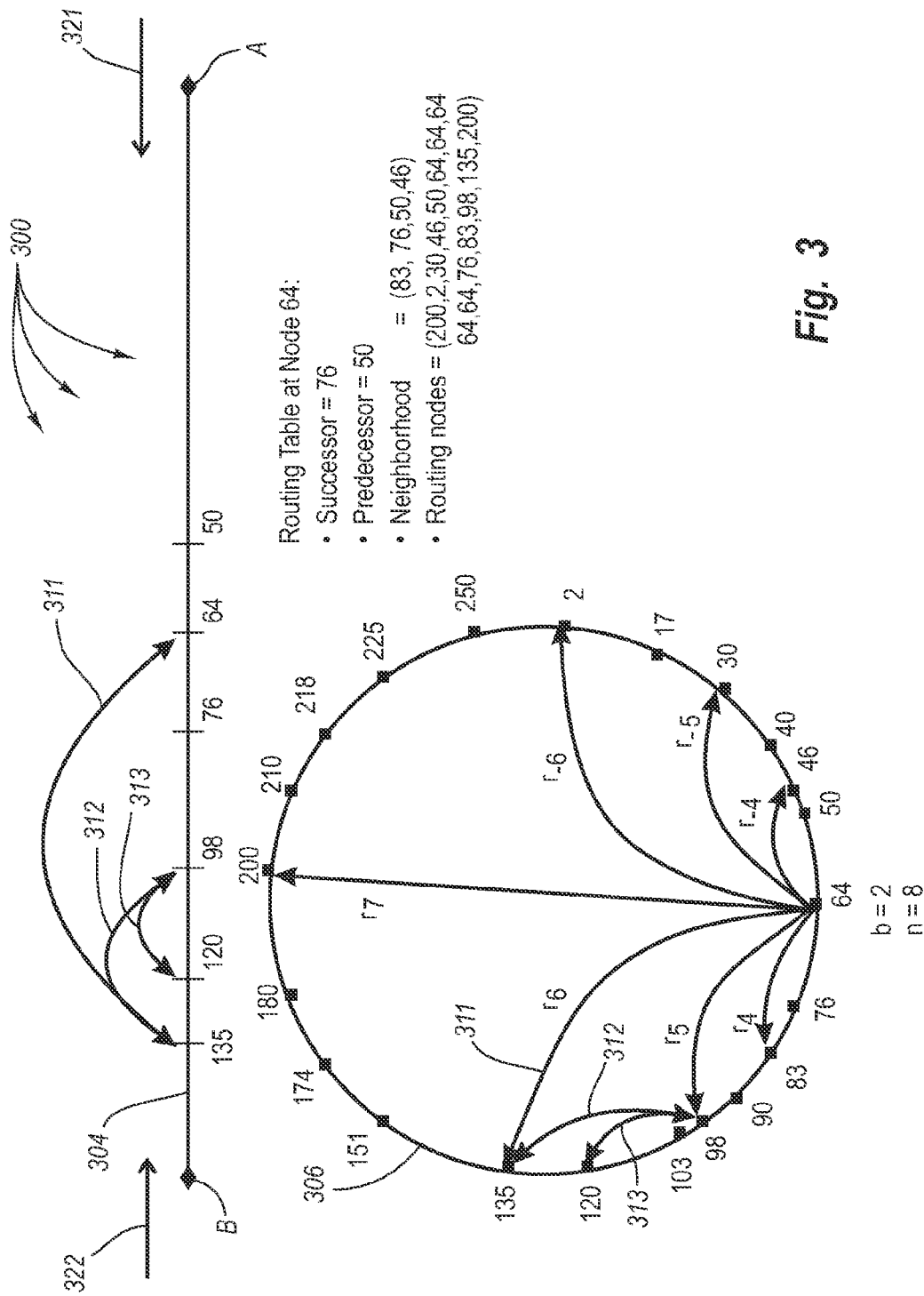
FIG. 3 illustrates an example binary relationship between nodes in a federation infrastructure in the form of a sorted list and corresponding ring.

FIG. 3 depicts an example linked list 304 and corresponding ring 306. Given such a ring, the following functions can be defined:

RouteNumerically(V, Msg): Given a value V from the value domain of node identities and a message "Msg," deliver the message to node X whose identity can be mapped to V using the mapping function.

Neighborhood(X, S):Neighborhood is the set of nodes on the either side of node X with cardinality equal to S.

When every node in the federation has global knowledge of the ring, RouteNumerically(V, Msg) is implemented by directly sending Msg to the node X, whose identity is obtained by applying the mapping function to V. Alternately, when nodes have limited knowledge of other nodes (e.g., only of immediately adjacent nodes), RouteNumerically(V, Msg) is implemented by forwarding the message to consecutive nodes along the ring until it reaches the destination node X. Alternately (and advantageously), nodes can store enough knowledge about the ring to perform a distributed binary search (without having to have global knowledge or implement routing between immediately adjacent nodes). The amount of ring knowledge is configurable such that maintaining the ring knowledge has a sufficiently small impact on each node but allows increased routing performance from the reduction in the number of routing hops.

As previously described, IDs can be assigned using the "<" (less than) relation defined over a sufficiently large, bounded set of natural numbers, meaning its range is over a finite set of numbers between 0 and some fixed value, inclusive. Thus, every node participating in the federation is assigned a natural number that lies between 0 and some appropriately-chosen upper bound, inclusive. The range does not have to be tight and there can be gaps between numbers assigned to nodes. The number assigned to a node serves as its identity in the ring. The mapping function accounts for gaps in the number space by mapping a number falling in between two node identities to the node whose identity is numerically closest to the number.

This approach has a number of advantages. By assigning each node a uniformly-distributed number, there is an increased likelihood that all segments of the ring are uniformly populated. Further, successor, predecessor, and neighborhood computations can be done efficiently using modulo arithmetic.

In some embodiments, federating nodes are assigned an ID from within an ID space so large that the chances of two nodes being assigned the same ID are highly unlikely (e.g., when random number generation is used). For example, a node can be assigned an ID in the range of 0 to $b^n-1$, where b equals, for example, 8 or 16 and n equals, for example, 128-bit or 160-bit equivalent digits. Accordingly, a node can be assigned an ID, for example, from a range of 0 to $16^{40}-1$ (or approximately 1.461502E48). The range of 0 to $16^{40}-1$ would provide, for example, a sufficient number of IDs to assign every node on the Internet a unique ID.

Thus, each node in a federation can have:

An ID which is a numerical value uniformly distributed in the range of 0 to $b^n-1$; and A routing table consisting of (all arithmetic is done modulo $b^n$):

Successor node (s);

Predecessor node (p);

Neighborhood nodes $(p_k, \ldots, p_1, p, s, s_1, \ldots, s_j)$ such that $s_j.\text{id} > (\text{id}+u/2)$, $j \geq v/2-1$, and $p_k.p.\text{id} < (\text{id}-u/2)$, and $k \geq v/2-1$; and Routing nodes $(r_{-(n-1)}, \ldots, r_{-1}, r_1, \ldots, r_{n-1})$ such that $r_{\pm i} = \text{RouteNumerically}(\text{id} \pm b^i), \text{Msg})$.

where b is the number base, n is the field size in number of digits, u is the neighborhood range, v is the neighborhood size, and the arithmetic is performed modulo $b^n$. For good routing efficiency and fault tolerance, values for u and v can be u=b and $v \geq \max(\log_2(N), 4)$, where N is the total number of nodes physically participating in the federation. N can be estimated from the number of nodes present on a ring segment whose length is greater than or equal to b, for example, when there is a uniform distribution of IDs. Typical values for b and n are b=8 or 16 and n=128-bit or 160-bit equivalent digits.

Accordingly, routing nodes can form a logarithmic index spanning a ring. Depending on the locations of nodes on a ring, a precise logarithmic index is possible, for example, when there is an existing node at each number in the set of $\text{id} \pm b^i$ where i=(1, 2, ... (n-1)). However, it may be that there are not existing nodes at each number in the set. IN those cases, a node closest to $\text{id} \pm b^i$ can be selected as a routing node. The resulting logarithmic index is not precise and may even lack unique routing nodes for some numbers in the set.

Referring again to FIG. 3, FIG. 3 illustrates an example of a binary relation between nodes in a federation infrastructure in the form of sorted list 304 and corresponding ring 306. The ID space of sorted list 304 is in the range 0 to $2^8-1$ (or 255). That is, b=2 and n=8. Thus, nodes depicted in FIG. 3 are assigned IDs in a range from 0 to 255. Sorted list 304 utilizes a binary relation that is reflexive, anti-symmetric, transitive, total, and defined over the domain of node identities. Both ends of sorted list 304 are joined, thereby forming ring 306. This makes it possible for each node in FIG. 3 to view itself as being at the middle of sorted list 304. The sorted list 304 is doubly linked so that any node can traverse the sorted list 304 in either direction. Arithmetic for traversing sorted list 304 (or ring 306) is performed modulo $2^8$. Thus, 255 (or the end of sorted list 304)+1=0 (or the beginning of sorted list 304).

The routing table indicates that the successor to ID 64 is ID 76 (the ID immediately clockwise from ID 64). The successor can change, for example, when a new node (e.g., with an ID of 71) joins or an existing node (e.g., ID 76) leaves the federation infrastructure. Likewise, the routing table indicates that the predecessor to ID 64 is ID 50 (the ID immediately counters clockwise from ID 64). The predecessor can change, for example, when a new node (e.g., with an ID of 59) joins or an existing node (e.g., ID 50) leaves the federation infrastructure.

The routing table further indicates that a set of neighborhood nodes to ID 64 have IDs 83, 76, 50 and 46. A set of neighbor nodes can be a specified number of nodes (i.e., neighborhood size v) that are within a specified range (i.e., neighbor range u) of ID 64. A variety of different neighborhood sizes and neighbor ranges, such as, for example, V=4 and U=10, can potentially be used to identify the set of neighborhood nodes. A neighborhood set can change, for example, when nodes join or leave the federation infrastructure or when the specified number of nodes or specified range is changed.

The routing table further indicates that ID 64 can route to nodes having IDs 200, 2, 30, 46, 50, 64, 64, 64, 64, 76, 83, 98, 135, and 200. This list is generated by identifying the node closest to each number in the set of id±$2^i$ where i=(1, 2, 3, 4, 5, 6, 7). That is, b=2 and n=8. For example, the node having ID 76 can be identified from calculating the closest node to 64+$2^3$, or 72.

A node can route messages (e.g., requests for access to resources) directly to a predecessor node, a successor node, any node in a set of neighborhood nodes, or any routing node. In some embodiments, nodes implement a numeric routing function to route messages. Thus, RouteNumerically(V, Msg) can be implemented at node X to deliver Msg to the node Y in the federation whose ID is numerically closest to V, and return node Y's ID to node X. For example, the node having ID 64 can implement RouteNumerically(243, Msg) to cause a message to be routed to the node having ID 250. However, since ID 250 is not a routing node for ID 64, ID 64 can route the message to ID 2 (the closest routing node to 243). The node having ID 2 can in turn implement RouteNumerically(243, Msg) to cause the message to be routed (directly or through further intermediary nodes) to the node having ID 250. Thus, it may be that a RouteNumerically function is recursively invoked with each invocation routing a message closer to the destination.

Advantageously, other embodiments of the present invention facilitate partitioning a ring into a ring of rings or tree of rings based on a plurality of proximity criteria of one or more proximity categories (e.g., geographical boundaries, routing characteristics (e.g., IP routing hops), administrative domains, organizational boundaries, etc.). It should be understood a ring can be partitioned more than once using the same type of proximity criteria. For example, a ring can be partition based on a continent proximity criteria and a country proximity criteria (both of a geographical boundaries proximity category).

Since IDs can be uniformly distributed across an ID space (a result of random number generation) there is a high probability that any given segment of a circular ID space contains nodes that belong to different proximity classes provided those classes have approximately the same cardinality. The probability increases further when there are a sufficient number of nodes to obtain meaningful statistical behavior.

Thus, neighborhood nodes of any given node are typically well dispersed from the proximality point of view. Since published application state can be replicated among neighborhood nodes, the published information can be well dispersed as well from the proximality point of view.

Figure 4:
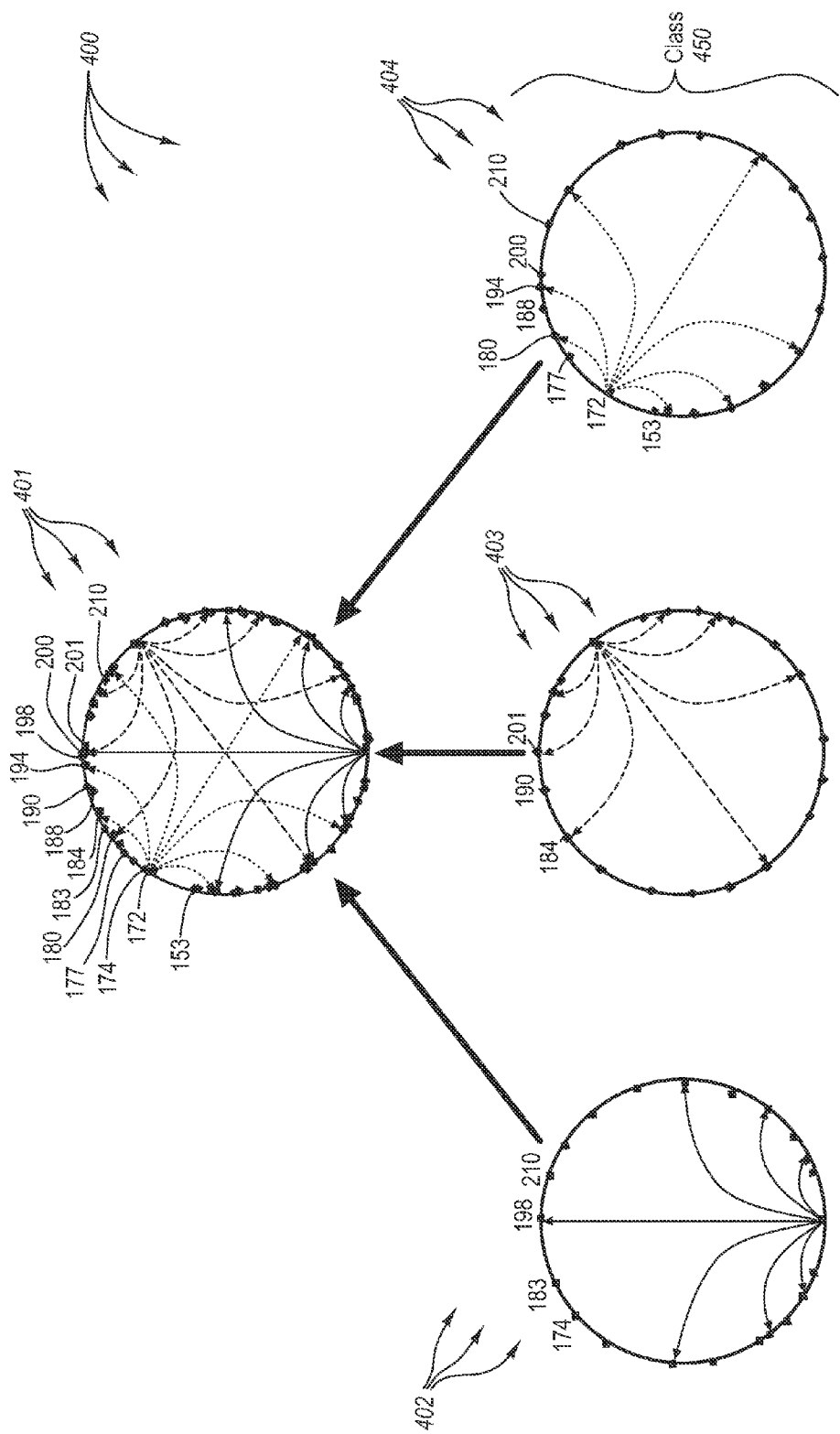
FIG. 4 illustrates an example ring of rings that facilitates proximal routing.

FIG. 4 illustrates a ring of rings 400 that facilitates proximal routing. Ring 401 can be viewed as a master or root ring, and contains all the nodes in each of the rings 402, 403, and 404. Each of the rings 402, 403, and 404 contain a subset of nodes from ring 401 that are partitioned based on a specified proximity criterion. For example, ring 401 may be partitioned based on geographic location, where ring 402 contains nodes in North America, ring 403 contains nodes in Europe, and ring 404 contains nodes in Asia.

In a numerical space containing 65,536 ($2^{16}$) IDs, routing a message from a North American node having an ID 5,345 to an Asian node having an ID 23,345 can include routing the message within ring 402 until a neighbor node of the Asian node is identified. The neighbor node can then route the message to the Asian node. Thus, a single hop (as opposed to multiple hops) is made between a North American node and an Asian node. Accordingly, routing is performed in a resource efficient manner.

Figure 5:
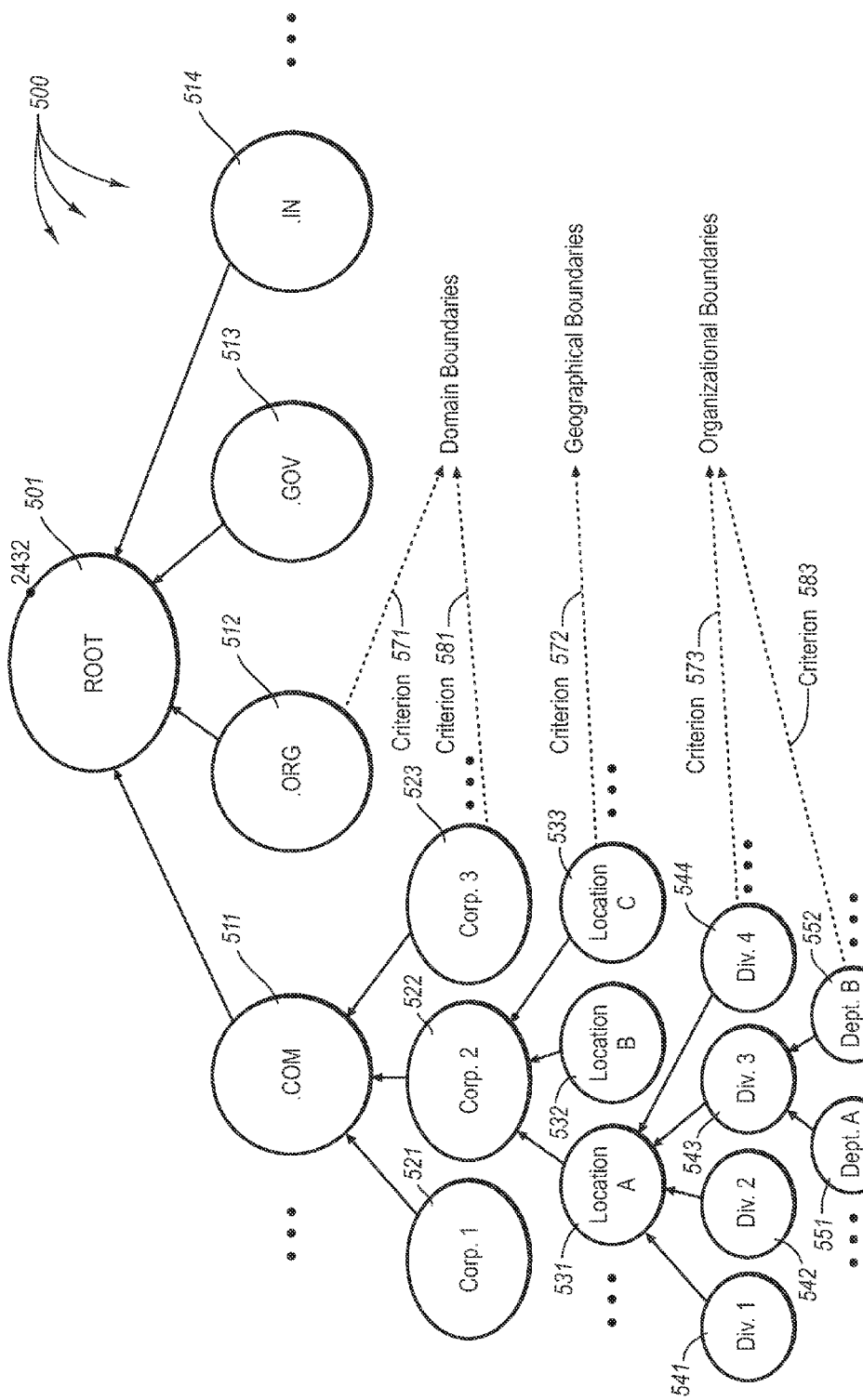
FIG. 5 illustrates an example proximity induced partition tree of rings that facilitates proximal routing.

FIG. 5 illustrates an example proximity induced partition tree of rings 500 that facilitates proximal routing. As depicted, partition tree of rings 500 includes a number of rings. Each of the rings represents a partition of a sorted linked list. Each ring including a plurality a nodes having IDs in the sorted linked list. However for clarity due to the number of potential nodes, the nodes are not expressly depicted on the rings (e.g., the ID space of partition tree 500 may be b=16 and n=40).

Within partition tree 500, root ring 501 is partitioned into a plurality of sub-rings, including sub-rings 511, 512, 513, and 514, based on criterion 571 (a first administrative domain boundary criterion). For example, each component of a DNS name can be considered a proximity criterion with the partial order among them induced per their order of appearance in the DNS name read right to left. Accordingly, sub-ring 511 can be further partitioned into a plurality of sub-rings, including sub-rings 521, 522, and 523, based on criterion 581 (a second administrative domain boundary criterion).

Sub-ring 522 can be further partitioned into a plurality of sub-rings, including sub-rings 531, 532, and 533, based on criterion 572 (a geographic boundary criterion). Location based proximity criterion can be partially ordered along the lines of continents, countries, postal zip codes, and so on. Postal zip codes are themselves hierarchically organized meaning that they can be seen as further inducing a partially ordered sub-list of proximity criteria.

Sub-ring 531 can be further partitioned into a plurality of sub-rings, including sub-rings 541, 542, 543, and 544, based on criterion 573 (a first organizational boundary criterion). A partially ordered list of proximity criterion can be induced along the lines of how a given company is organizationally structured such as divisions, departments, and product groups. Accordingly, sub-ring 543 can be further partitioned into a plurality of sub-rings, including sub-rings 551 and 552, based on criterion 583 (a second organizational boundary criterion).

Within partition tree 500, each node has a single ID and participates in rings along a corresponding partition path starting from the root to a leaf. For example, each node participating in sub-ring 552 would also participate in sub-rings 543, 531, 522, 511 and in root 501. Routing to a destination node (ID) can be accomplished by implementing a RouteProximally function, as follows:

RouteProximally(V, Msg, P): Given a value V from the domain of node identities and a message "Msg," deliver the message to the node Y whose identity can be mapped to V among the nodes considered equivalent by the proximity criteria P.

Thus, routing can be accomplished by progressively moving closer to the destination node within a given ring until no further progress can be made by routing within that ring as determined from the condition that the destination node lies between the current node and its successor or predecessor node. At this point, the current node starts routing via its partner nodes in the next larger ring in which it participates.

This process of progressively moving towards the destination node by climbing along the partitioning path towards the root ring terminates when the closest node to the destination node is reached within the requested proximal context, as originally specified in the RouteProximally invocation.

Routing hops can remain in the proximal neighborhood of the node that originated the request until no further progress can be made within that neighborhood because the destination node exists outside it. At this point, the proximity criterion is relaxed to increase the size of the proximal neighborhood to make further progress. This process is repeated until the proximal neighborhood is sufficiently expanded to include the destination node (ID). The routing hop made after each successive relaxation of proximal neighborhood criterion can be a potentially larger jump in proximal space while making a correspondingly smaller jump in the numerical space compared to the previous hop. Thus, only the absolutely required number of such (inter-ring) hops is made before the destination is reached.

It may be the case that some hops are avoided for lookup messages since published application data gets replicated down the partition tree when it is replicated among the neighborhood nodes of the destination node.

To accomplish proximal routing, each federation node maintains references to its successor and predecessor nodes in all the rings it participates as a member (similar to successor and predecessor for a single ring)—the proximal predecessor, proximal successor, and proximal neighborhood. In order to make the routing efficient, the nodes can also maintain reference to other nodes closest to an exponentially increasing distance on its either half of the ring as routing partners (similar to routing nodes for a single ring). In some embodiments, routing partner nodes that lie between a pair of consecutive successor or predecessor nodes participate in the same lowest ring shared by the current node and the node numerically closest to it among the successor or predecessor node pairs respectively. Thus, routing hops towards a destination node transition into using a relaxed proximity criterion (i.e., transitioning to a higher ring) only when absolutely needed to make further progress. Accordingly, messages can be efficiently rendezvoused with a corresponding federation node.

In some embodiments, nodes implement a proximal routing function to route messages based on equivalence criteria relations. Thus, given a number V and a message "Msg", a node can implement RouteProximally(V, Msg, P) to deliver the message to the node Y whose identify can be mapped to V among the nodes considered equivalent by proximity criterion P. The proximity criterion P identifies the lowest ring in the partition tree that is the common ancestor to all the nodes considered proximally equivalent by it. It can be represented as a string obtained by concatenating the proximity criterion found along the path from the root ring to the ring identified by it separated by the path separator character '/'. For example, the proximity criterion identifying sub-ring 542 can be represented as "Proximity:/.COM/Corp2/LocationA/Div2". Each ring in the partition tree 500 can be assigned a unique number, for example, by hashing its representational string with a SHA based algorithm. If the number 0 is reserved for the root ring, it can be inferred that RouteNumerically(V, Msg)=RouteProximally(V, Msg, 0).

For example, a node in sub-ring 544 can implement RouteProximally to identify a closer node in sub-ring 531 (e.g., to a node in sub-ring 513). In turn, sub-ring 531 can implement RouteProximally to identify a closer node in sub-ring 522. Likewise, sub-ring 522 can implement RouteProximally to identify a closer node in sub-ring 511. Similarly, sub-ring 511 can implement RouteProximally to identify a closer node in ring 501. Thus, it may be that a RouteProximally function is recursively invoked with each invocation routing a message closer to the destination.

Thus, when proximity criterion is taken into account, routing hops on a path to a final destination can remain within the proximity of a node that originates a request, while making significant progress between the originating node and the destination node in a numerical space, until either the destination node is reached or no further progress can be made under the chosen proximity criterion at which point it is relaxed just enough to make further progress towards the destination. For example, proximity criterion can be relaxed enough for a message to be routed from ring 531 up to ring 522, etc.

Utilizing the above approach to proximity, it is possible to confine published information to a given ring. For example, organizations may like to ensure that organization specific information is not available to entities outside of their trust domains either (1) implicitly in the form of neighborhood replication to nodes outside of their domains or (2) explicitly in the form of servicing lookup requests for such information. The first aspect is satisfied by replicating published information only among the nodes neighboring the target ID within the specified ring. Because all messages originated by a node are routed by successively climbing the rings to which it belongs towards the root ring, there is a high likelihood that all lookup requests originated within an organization will be able to locate the published information confined to it thereby implicitly satisfying the second aspect.

Also, organizations dislike nodes automatically federating with nodes outside of their trust domain. This can happen, for example, when a visiting sales person connects his/her laptop computer to the network in the customer premises. Ideally, the laptop computer belonging to the sales person wishes to locate information published in its home domain and/or federate with the nodes in its home domain starting at its lowest preferred proximity ring. It will typically not be permitted to federate with the nodes in the customer's domain. Supporting this scenario requires ability to locate seed nodes in the home domain. Such seed nodes can be used for locating information published in the home domain, to join the home federation, and selectively import and export published information across domains. Seed nodes are also sometimes referred as message gateways.

In other embodiments, an entity publishes references to seed nodes in the root ring. Seed nodes can be published at the unique number (such as the one obtained by hashing its representational string) associated with the ring (as a target ID). Seed node information can further be on-demand cached by the nodes in various rings that are on the path to the corresponding target IDs in the root ring. Such on-demand caching provides for improved performance and reduction in hotspots that might occur when semi-static information is looked up quite frequently. Seed node information can also be obtained via other means such as DNS To provide fault tolerance for confined published information, each node can maintain a set of neighborhood nodes in all of the rings it participates in. Given the above, the state maintained by a node can be summarized as follows:

An ID which is a numerical value uniformly distributed in the range of 0 to $b^n-1$.
A routing table consisting of (all arithmetic is done modulo $b^n$):
  For each ring, say ring d, in which the node participates
    Successor node ($s_d$)
    Predecessor node ($p_d$)

Neighborhood nodes $(p_{kd}, \ldots, p_{1d}, p_d, s_d, s_{1d}, \ldots, s_{jd})$ such that $s_{jd}.s_d.id > (id+u/2)$, $j \geq v/2-1$, $p_{kd}.p_d.id < (id-u/2)$, and $k \geq v/2-1$.

Routing nodes $(r_{-(n-1)}, \ldots, r_1, \ldots, r_1, \ldots, r_{n-1})$ such that $r_{\pm i} = \text{RouteProximally}(id \pm b^i, \text{updateMsg}, d)$ such that $s_d \leq id + b^i \leq s_{d+1}$ or $p_{d+1} \leq id - b^i \leq p_d$ as appropriate.

where b is the number base, n is the field size in number of digits, u is the neighborhood range, and v is the neighborhood size.

Note that a subset of the neighborhood nodes maintained by a given node in ring "d" can appear again as neighborhood nodes in the child ring "d+1" in which the given node participates as well. As such one can derive the upper bound on the total number of neighborhood nodes maintained by a given node across all the D rings it participates as $D^* \max(u,v)/2$. This considers that only one reference to a given node is kept and the worst case upper bound is for a balanced tree.

It should be noted that when a ring is partitioned into a plurality of corresponding sibling sub-rings, it is permitted for a specified node to simultaneously participate in more than one of the plurality of corresponding sibling sub-rings, for example, through aliasing. Aliasing can be implemented to associate different state, for example, from different sub-rings, with the specified node. Thus, although aliases for a given node have the same ID, each alias can have distinct state associated with them. Aliasing allows the specified node to participate in multiple rings having distinct proximity criteria that are not necessarily common ancestors of more specific proximity criteria. That is, the specified node can participate in multiple branches of the proximity tree.

For example, a dual NIC (wired and wireless) laptop can be considered to be proximally equivalent to both other wireless and wired nodes sharing the same LAN segments as the laptop. But, these two distinct proximity criteria can be modeled as sub-criteria that are applicable only after application of a different higher priority proximity criterion, such as, for example, one based on organizational membership. As the laptop belongs to the same organization, the aliased nodes in the two sub-rings representing 1) membership in the wired and 2) membership in the wireless LAN segments merge into a single node in the ring representing the organization to which the laptop belongs. It should be understand that the RouteProximally works as expected without any modifications in the presence of aliasing.

Each proximal ring can be configured in accordance with (potentially different) ring parameters. Ring parameters can be used to define a neighborhood (e.g., ring parameters can represent a neighborhood range, a neighborhood size, ping message and depart message timing and distribution patterns for ping and depart messages), indicate a particular federating mechanisms (e.g., from among the above-described first through fourth federating mechanisms previously described or from among other federating mechanisms), or define communication specifics between routing partners in the same proximal ring. Some ring parameters may be more general, applying to a plurality of different federating mechanisms, while other ring parameters are more specific and apply to specific type of federating mechanism.

Ring parameters used to configure a higher level proximal ring can be inherited in some embodiments by lower level proximal rings. For example, it may be that ring 543 inherits some of the ring parameters of ring 531 (which in turn inherited from ring 522, etc.). Thus, a neighborhood size and neighborhood range associated with ring 531 is also associated with ring 541.

However, inherited ring parameters can be altered and/or proximal rings can be individually configured in accordance with different ring parameters. For example, it may be that ring 511 is for an administrative domain that contains a large number of nodes and thus the above-described fourth federating mechanism is more appropriate for ring 511. On the other hand, it may be that ring 521 is for a small business with a relatively smaller number of nodes and thus the above-described second federating mechanism is more appropriate for ring 521. Thus, the ring parameters associated with ring 521 can be set to (or inherited parameters changed to) different values than the ring parameters associated with ring 511. For example, a ring parameter indicating a particular type of federating mechanisms can be different between rings 511 and 521. Similarly parameters defining a neighborhood can be different between rings 511 and 521. Further, ring 521 can be configured in accordance with specific parameters that are specific to the above-described second federating mechanism, while ring 511 is configured in accordance additional with specific parameters that are specific to the above-described fourth federating mechanism.

Accordingly, proximal rings can be flexibly configured based on the characteristics (e.g., number, included resources, etc.) of nodes in the proximal rings. For example, an administrator can select ring parameters for proximal rings using a configuration procedure (e.g., through a user-interface). A configuration procedure can facilitate the configuration of inheritance relationships between proximal rings as well as the configuration of individual proximal rings, such as, for example, to override otherwise inherited ring parameters.

Figure 8:
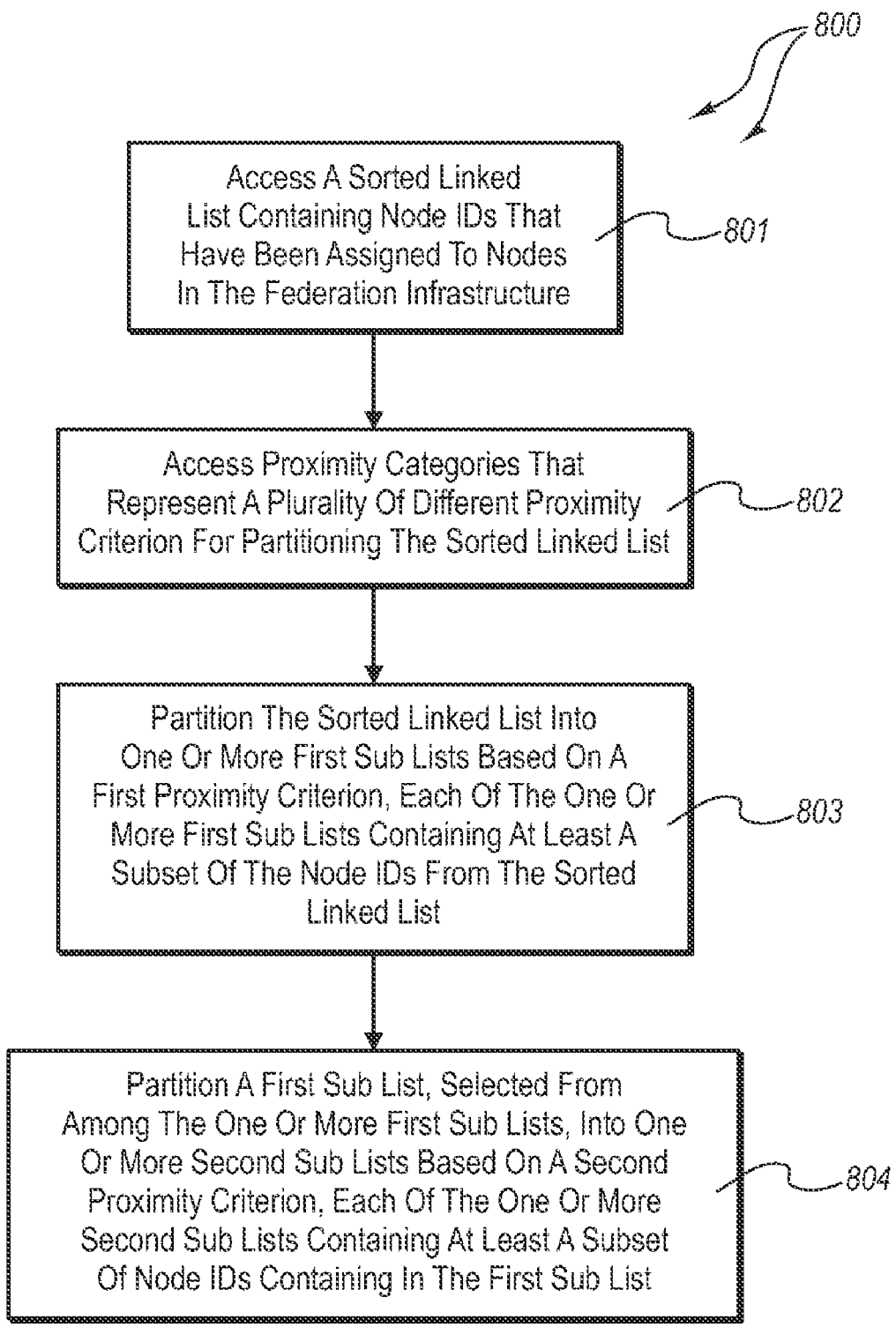
FIG. 8 illustrates an example flow chart of a method for partitioning the nodes of a federation infrastructure.

FIG. 8 illustrates an example flow chart of a method 800 for partitioning the nodes of a federation infrastructure. The method 800 will be described with respect to the rings of partition a tree 500 in FIG. 5. Method 800 includes an act of accessing a sorted linked list containing node IDs that have been assigned to nodes in a federation infrastructure (act 801). For example, the sorted linked list represented by ring 501 can be accessed. The node IDs of the sorted linked list (the nodes depicted on ring 501) can represent nodes in a federation infrastructure (e.g., federation infrastrucre 100).

Method 800 includes an act of accessing proximity categories that represent a plurality of different proximity criteria for partitioning the sorted linked list (act 802). For example, proximity criterion representing domain boundaries 561, geographical boundaries 562, and organizational boundaries 563 can be accessed. However, other proximity criteria, such as, trust domain boundaries, can also be represented in accessed proximity criterion. Proximity categories can include previously created partially ordered lists of proximity criteria. A ring can be partitioned based on partially ordered lists of proximity criteria.

Method 800 includes an act of partitioning the sorted link list into one or more first sub lists based on a first proximity criterion, each of the one or more first sub lists containing at least a subset of the node IDs from the sorted linked list (act 803). For example, ring 501 can be partitioned into sub-rings 511, 512, 513, and 514 based on criterion 571. Each of sub-rings 511, 512, 513, and 514 can contain a different sub-set of node IDs from ring 501.

Method 800 includes an act of partitioning a first sub list, selected from among the one or more first sub lists, into one or more second sub lists based on a second proximity criterion, each of the one or more second sub lists containing at least a subset of node IDs contained in the first sub list (act 804). For example, sub-ring 511 can be partitioned into sub-rings 521, 522, and 523 based on criterion 581. Each of the sub-rings 521, 522, and 523 can contain a different sub-set of node IDs from sub-ring 511.

Figure 9:
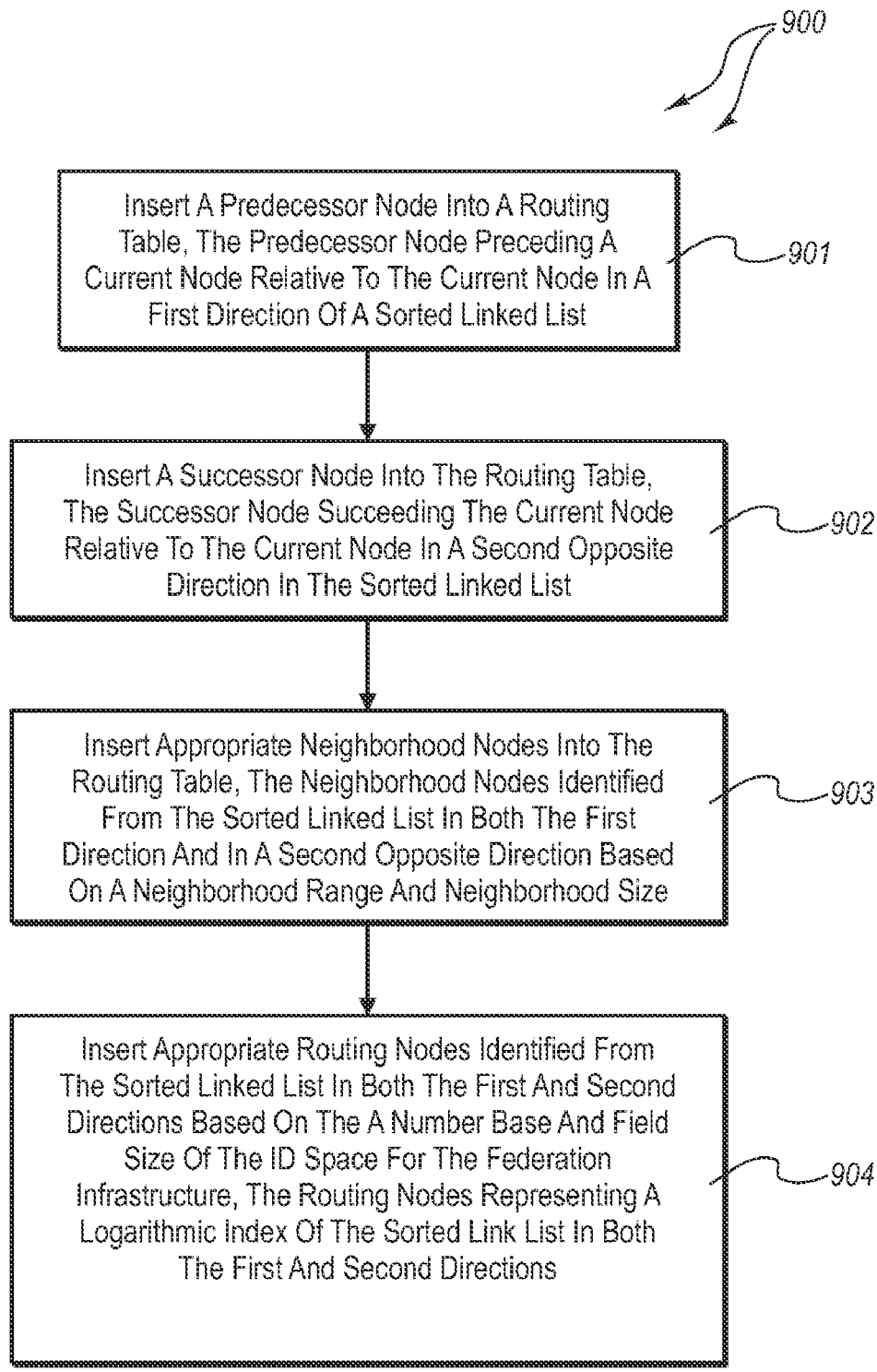
FIG. 9 illustrates an example flow chart of a method for populating a node routing table.

FIG. 9 illustrates an example flow chart of a method 900 for populating a node's routing table. The method 900 will be described with respect to the sorted linked list 304 and ring 306 in FIG. 3. Method 900 includes an act of inserting a predecessor node into a routing table, the predecessor node preceding a current node relative to the current node in a first direction of a sorted linked list (act 901). For example, the node having ID 50 can be inserted into the routing table as a predecessor for the node having ID 64 (the current node). Moving in a clockwise direction 321 (from end A of sorted linked list 304 towards end B of sorted linked list 304), the node having ID 50 precedes the node having ID 64. Inserting a predecessor node can establish a symmetric partnership between the current node and the predecessor node such that current node is a partner of predecessor node and the predecessor node is a partner of the current node Method 900 includes an act of inserting a successor node into the routing table, the successor node succeeding the current node relative to the current node in the first direction in the sorted linked list (act 902). For example, the node having ID 76 can be inserted into the routing table as a successor for the node having ID 64 (the current node). Moving in a counter-clockwise direction 322, the node having ID 76 succeeds the node having ID 64. Inserting a successor node can establish a symmetric partnership between the current node and the successor node such that current node is a partner of the successor node and the successor node is a partner of the current node.

Method 900 includes an act of inserting appropriate neighborhood nodes into the routing table, the neighborhood nodes identified from the sorted linked list in both the first direction and in a second opposite direction based on a neighborhood range and neighborhood size (act 903). For example, the nodes having IDs 83, 76, 50, and 46 can be inserted into the routing table as neighborhood nodes for the node having ID 64 (the current node). Based on a neighborhood range of 20 and a neighborhood size 4, the nodes having IDs 83 and 76 can be identified in clockwise direction 321 and the nodes having IDs 50 and 46 can be identified in counter-clockwise direction 322 (moving from end B of sorted linked list 304 towards end A of sorted linked list 304). It may be that in some environments no appropriate neighborhood nodes are identified. Inserting a neighborhood node can establish a symmetric partnership between the current node and the neighborhood node such that current node is a partner of the neighborhood node and the neighborhood node is a partner of the current node.

Method 900 includes an act of inserting appropriate routing nodes into the routing table, the routing nodes identified from the sorted linked list in both the first and second directions based on the a number base and field size of the ID space for the federation infrastructure, the routing nodes representing a logarithmic index of the sorted link list in both the first and second directions (act 904). For example, the nodes having IDs 200, 2, 30, 46, 50, 64, 64, 64, 64, 64, 76, 83, 98, 135 and 200 can be inserted into the routing table as routing nodes for the node having ID 64. Based on the number base 2 and field size of 8 the nodes having IDs 64, 64, 76, 83, 98, 135 and 200 can be identified in direction 321 and the nodes having IDs 64, 64, 50, 46, 30, 2, and 200 can be identified in direction 322. As depicted inside ring 306, the routing nodes represent a logarithmic index of the sorted link list 304 in both clockwise direction 321 and counter-clockwise direction 322. Inserting a routing node can establish a symmetric partnership between the current node and the routing node such that current node is a partner of the routing node and the routing node is a partner of the current node.

Figure 7:
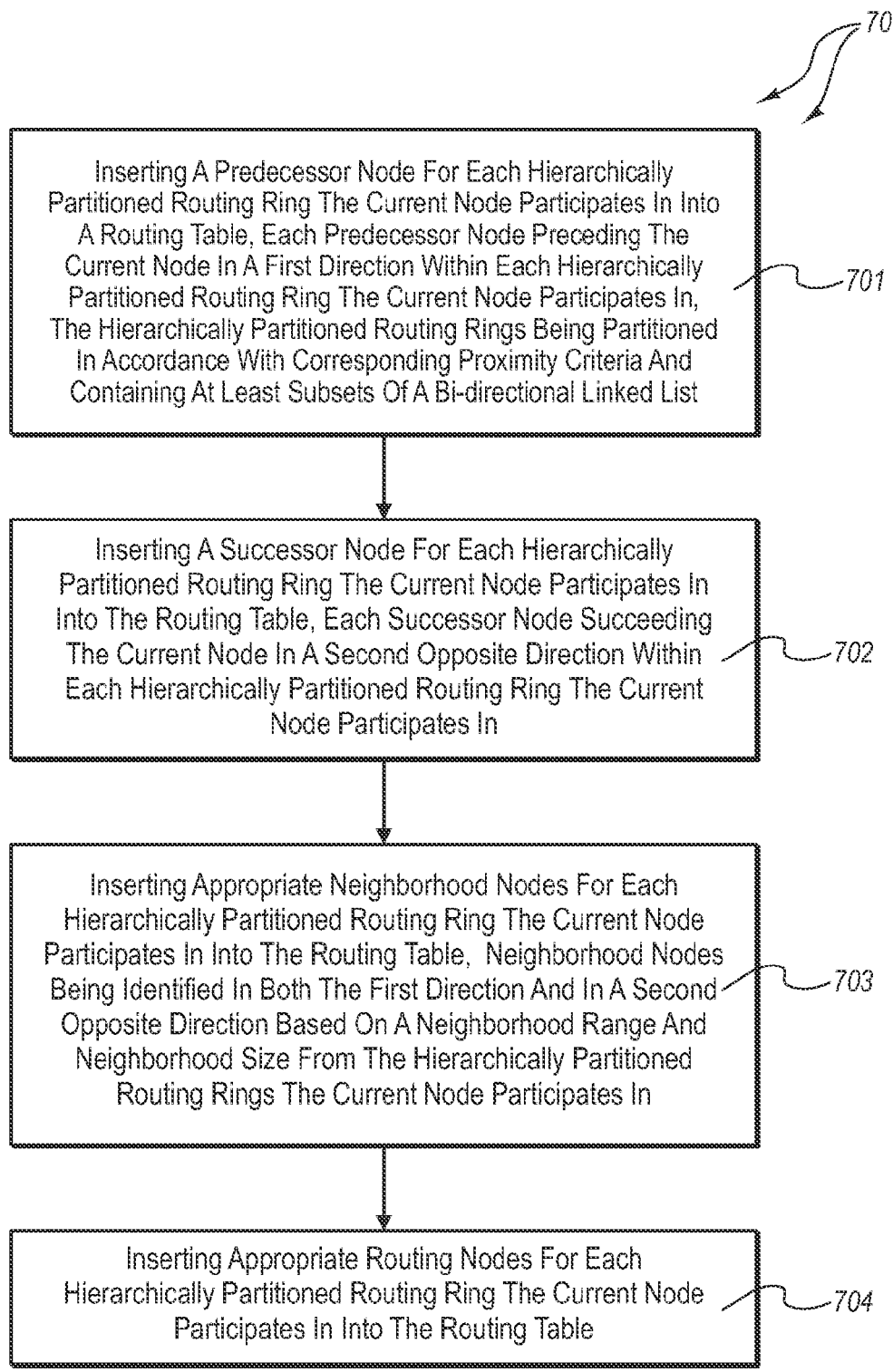
FIG. 7 illustrates an example flow chart of a method for populating a node routing table that takes proximity criteria into account

FIG. 7 illustrates an example flow chart of a method 700 for populating a node routing table that takes proximity criteria into account. The method 700 will be described with respect to the rings in FIG. 5. Method 700 includes an act of inserting a predecessor node for each hierarchically partitioned routing ring the current node participates in into a routing table (act 701). Each predecessor node precedes the current node in a first direction (e.g., clockwise) within each hierarchically partitioned routing ring the current node participates in. The hierarchically partitioned routing rings are partitioned in accordance with corresponding proximity criteria and contain at least subsets of a bi-directionally linked list (and possibly the whole bi-directionally linked list). For example, it may be that a specified node participates in root ring 501 and sub-rings 511, 522, 523, 531, and 542. Thus, a predecessor node is selected for the specified node from within each of the rings 501 and sub-rings 511, 522, 523, 531, and 542.

Method 700 includes an act of inserting a successor node for each hierarchically partitioned routing ring the current node participates in into the routing table (act 702). Each successor node succeeding the current node in the first direction within each hierarchically partitioned routing ring the current node participates in. For example, a successor node is selected for the specified node from within each of the rings 501 and sub-rings 511, 522, 523, 531, and 542.

Method 700 includes an act of inserting appropriate neighborhood nodes for each hierarchically partitioned routing ring the current node participates in into the routing table (act 703). The neighborhood nodes can be identified in both the first direction (e.g., clockwise) and in a second opposite direction (e.g., counter clockwise) based on a neighborhood range and neighborhood size from the hierarchically partitioned routing rings the current node participates in. For example, neighborhood nodes can be identified for the specified node from within each of the rings 501 and sub-rings 511, 522, 523, 531, and 542.

Method 700 includes an act of inserting appropriate routing nodes for each hierarchically partitioned routing ring the current node participates in into the routing table (act 704). For example, routing nodes can be identified for the specified node from within each of the rings 501 and sub-rings 511, 522, 523, 531, and 542.

In some embodiments, appropriate routing nodes are inserted for each proximity ring d except the leaf ring (or leaf rings in embodiments that utilize aliasing), in which the node Y participates. Appropriate routing nodes can be inserted based on the following expression(s):

if $Y.s_d.id < Y.id + b^i < Y.s_{d+1}.id$ is true, then use ring d; or if $Y.p_d.id < Y.id - b^i < Y.p_{d+1}.id$ is true, then use ring d.

If a ring has not been identified in the previous step, use the lead (e.g., ring 501) ring as ring d. Now, ring d is the proximity ring in which node Y should look for the routing partner closest to z.

Figure 10:
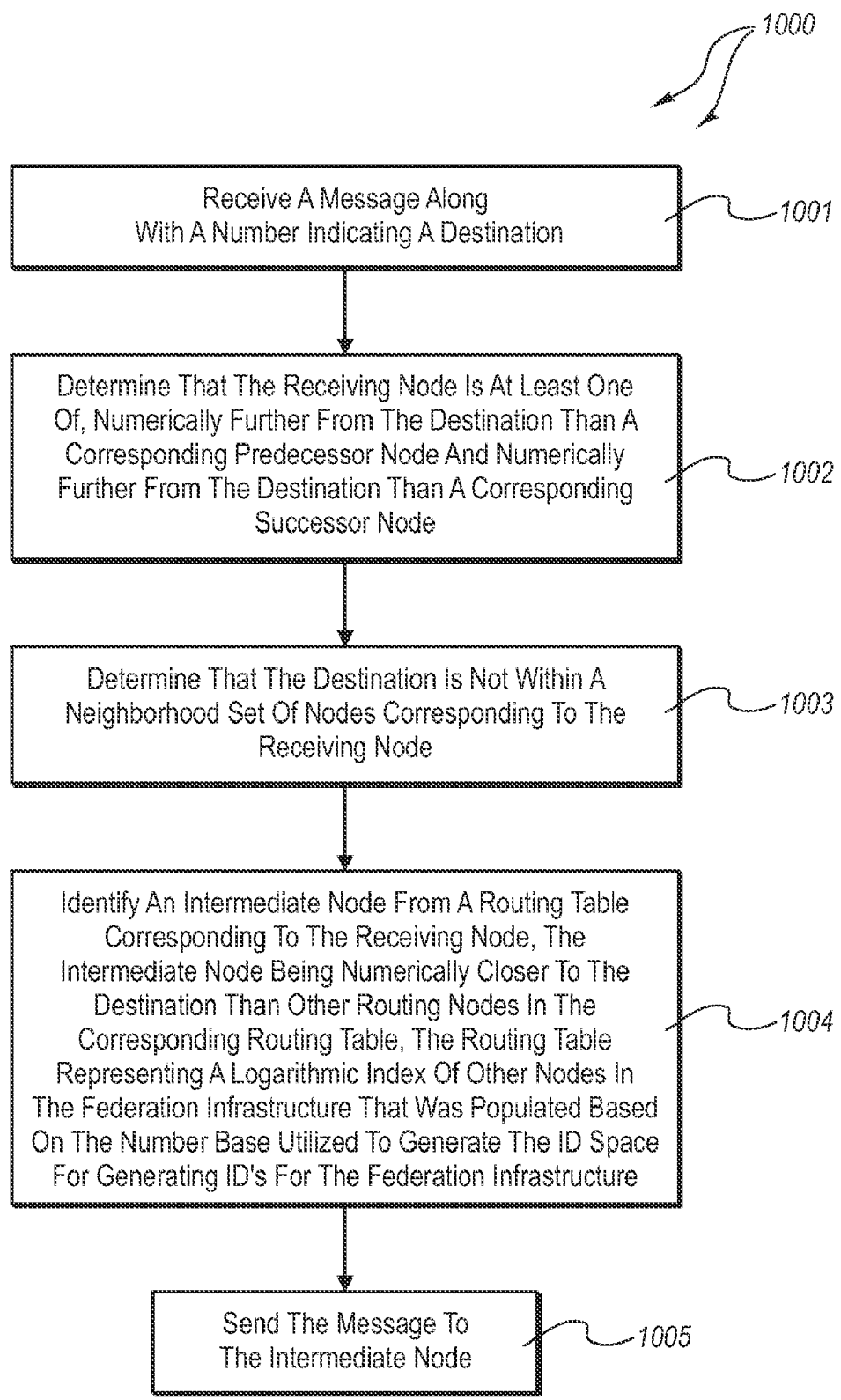
FIG. 10 illustrates an example flow chart of a method for numerically routing a message towards a destination node.

FIG. 10 illustrates an example flow chart of a 1000 method for routing a message towards a destination node. The method 1000 will be described with respect to the sorted linked list 304 and ring 306 in FIG. 3. Method 1000 includes an act of a receiving node receiving a message along with a number indicating a destination (act 1001). For example, the node having ID 64 can receive a message indicating a destination of 212.

Method 1000 includes an act of determining that the receiving node is at least one of numerically further from the destination than a corresponding predecessor node and numerically further from the destination than a corresponding successor node (act 1002). For example, in direction 322, ID 64 is further from destination 212 than ID 50 and, in direction

321, ID 64 is further from destination 212 than ID 76. Method 1000 includes an act of determining that the destination is not within a neighborhood set of nodes corresponding to the receiving node (act 1003). For example, the node with ID 64 can determine that destination 212 is not within the neighborhood set of 83, 76, 50, and 46.

The method 1000 includes an act of identifying an intermediate node from a routing table corresponding to the receiving node, the intermediate node being numerically closer to the destination than other routing nodes in the corresponding routing table (act 1004). For example, the node having ID 64 can identify the routing node having ID 200 as being numerically closer to destination 212 that other routing nodes. The method 1000 includes an act of sending the message to the intermediate node (act 1005). For example, the node having ID 64 can send the message to the node having ID 200.

Figure 11:
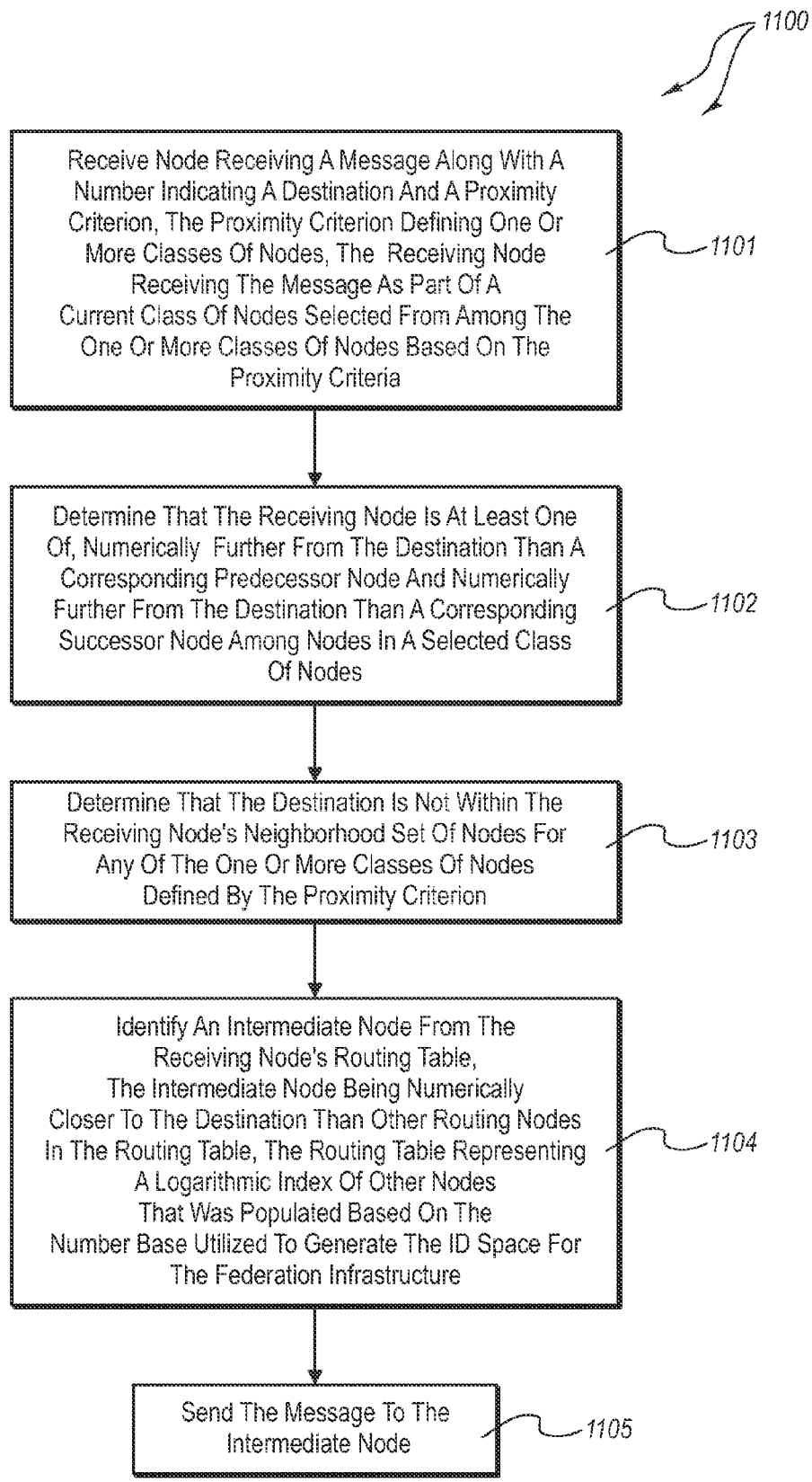
FIG. 11 illustrates an example flow chart of a method for proximally routing a message towards a destination node.

FIG. 11 illustrates an example flow chart of a method 1100 for routing a message towards a destination node based on proximity criteria. The method 1100 will be described with respect to the rings in FIG. 4 and FIG. 5. Method 1100 includes an act of a receiving node receiving a message along with a number indicating a destination and a proximity criterion (act 1101). The proximity criterion defines one or more classes of nodes. The receiving node receives the message as part of a current class of nodes selected form among the one or more classes of nodes based on the proximity criterion. For example, the node having ID 172 can receive a message indicating a destination of 201 and proximity criterion indicating that the destination node be part of classes represented by ring 401. The node having ID 172 can receive the message as part of ring 404.

Method 1100 includes an act of determining that the receiving node is at least one of, numerically further from the destination than a corresponding predecessor node and numerically further from the destination than a corresponding successor node, among nodes in a selected class of nodes (act 1102). For example, within ring 404, the node with ID 172 is further from destination 201 than the node having ID 174 in the clockwise direction and is further from destination 201 than the node having ID 153 in the counterclockwise direction.

Method 1100 includes an act of determining that the destination is not within the receiving node's neighborhood set of nodes for any of the one or more classes of nodes defined by the proximity criterion (act 1103). For example, the node having ID 172 can determine that destination 201 is not in a corresponding neighborhood set in ring 404 or in ring 401.

Method 1100 includes an act of identifying an intermediate node from the receiving node's routing table, the intermediate node being numerically closer to the destination than other routing nodes in the routing table (act 1104). For example, the node having ID 172 can identify the node having ID 194 as being numerically closer to destination 201 than other routing nodes in ring 404. The method 1100 includes an act of sending the message to the intermediate node (act 1105). For example, the node having ID 172 can send the received message to the node having ID 194. The node having ID 172 can send the received message to the node having ID 194 to honor a previously defined partially ordered list of proximity criterion Node 194 may be as close to destination 201 as is possible within ring 404. Thus, proximity can be relaxed just enough to enable further routing towards the destination to be made in ring 401 in the next leg. That is, routing is transitioned from ring 404 to ring 401 since no further progress towards the destination can be made on ring 404. Alternately, it may be that the node having ID 201 is within the neighborhood of the node having ID 194 in ring 401 resulting in no further routing. Thus, in some embodiments, relaxing proximity criteria to get to the next higher ring is enough to cause further routing.

However, in other embodiments, incremental relaxation of proximity criteria causing transition to the next higher ring continues until further routing can occur (or until the root ring is encountered). That is, a plurality of transitions to higher rings occurs before further routing progress can be made. For example, referring now to FIG. 5, when no further routing progress can be made on ring 531, proximity criteria may be relaxed enough to transition to ring 511 or even to root ring 501.

Node Phases

A node participating in a federation infrastructure can operate in different operational phases. Valid phase values for a node can be defined to be members of an ordered set. For example, {NodeId}.{InstanceIds}.{Phase Value [Phase-State Values: Inserting, Syncing, Routing, Operating]. [Phase.Unknown Indication: phase known at time of transmission, phase unknown at time of transmission]} defines one possible ordered set representing a phase-space of a given node within a federation infrastructure. A node instance can transition (or advance) through the node phase-states from Inserting to Syncing to Routing to Operating in order. Further, in some embodiments, a node instance can be configured such that the node instance is prevented from transitioning back to a prior node phase-state. In some embodiments, a node advances its instance ID each time the node comes up.

For example, a node instance can prevented from transitioning from Routing back to Syncing (or back to Inserting), etc. Accordingly, in some embodiments, when it is known that a given node instance (e.g., identified by (NodeId, InstanceId)) has advanced to a particular node phase-state (e.g., Operating), it is also known that the given node instance is not likely to (and in some embodiments will not) revert to a prior node phase-state (e.g., back to Routing, Syncing, or Inserting). Thus, there is a significant likelihood that any node instance in a node phase prior to the particular node phase-state is a new (and advanced) instance of the node.

In some embodiments, phase information and corresponding instance Ids (which advance as a node comes up) are transferred together. Thus, it is possible to determine that a lesser node phase-state for the same instance is older. Further, when a newer node instance is known (at any phase-state values) any information about older instances is considered out of date.

From time to time, nodes can reboot or lose communication with one another, such as, for example, when first starting up, through a graceful departure, or as a result of abnormal termination (crash). Thus, there is the potential for a node in any node phase-state to reboot or lose communication with other nodes. For example, a crash can cause a node in a Routing phase-state to reboot. During a reboot or lose of communication, there may be no way to determine what node phase-state a node is in. Accordingly, when a node is rebooting or communication to a node is lost, a [Phase.Unknown Indication] can be set to indicate that the phase-state for the node is currently not known. However, any previously expressed and/or detected phase-state for the node can be maintained and is not lost.

The [Phase.Unknown Indication] can be used to indicate whether a phase-state was known at the time a phase-state value was transmitted (e.g phase value with phase.unknown not set) or if a phase-state is a previously expressed phase-state and the phase-state was not known at the time the phase-state was transmitted (e.g., phase value with phase.unknown set). Thus, the phase of a node (its phase value) can be represented using both a phase-state value and a phase.unknown indication.

Join Protocol

Figure 12A:
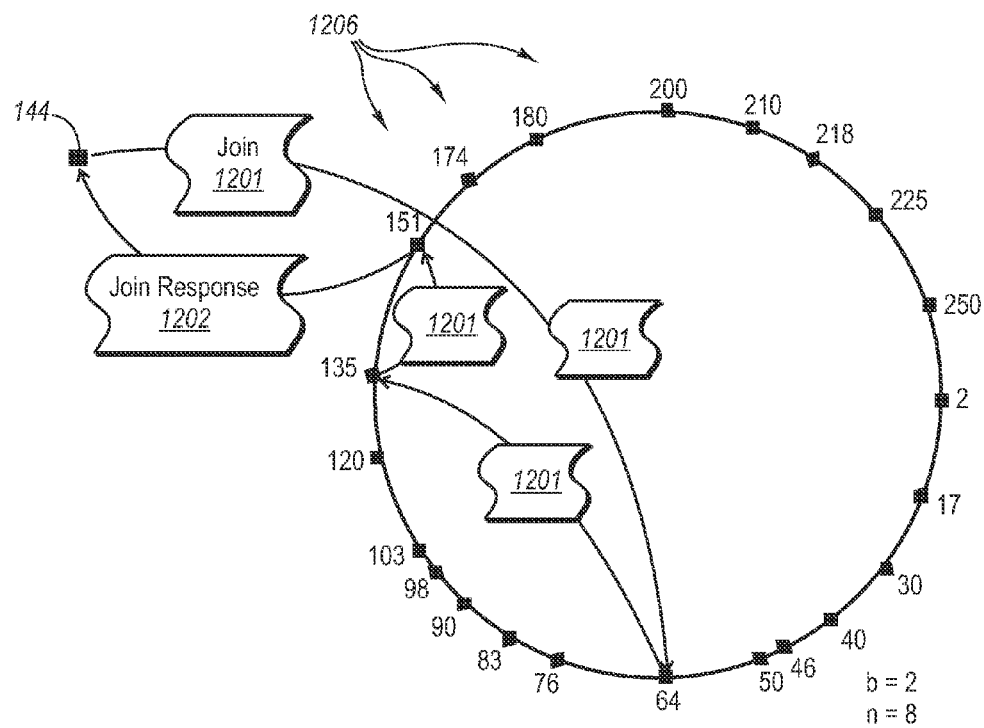
FIG. 12A illustrates an example of a node establishing membership within an existing federation.
Figure 12B:
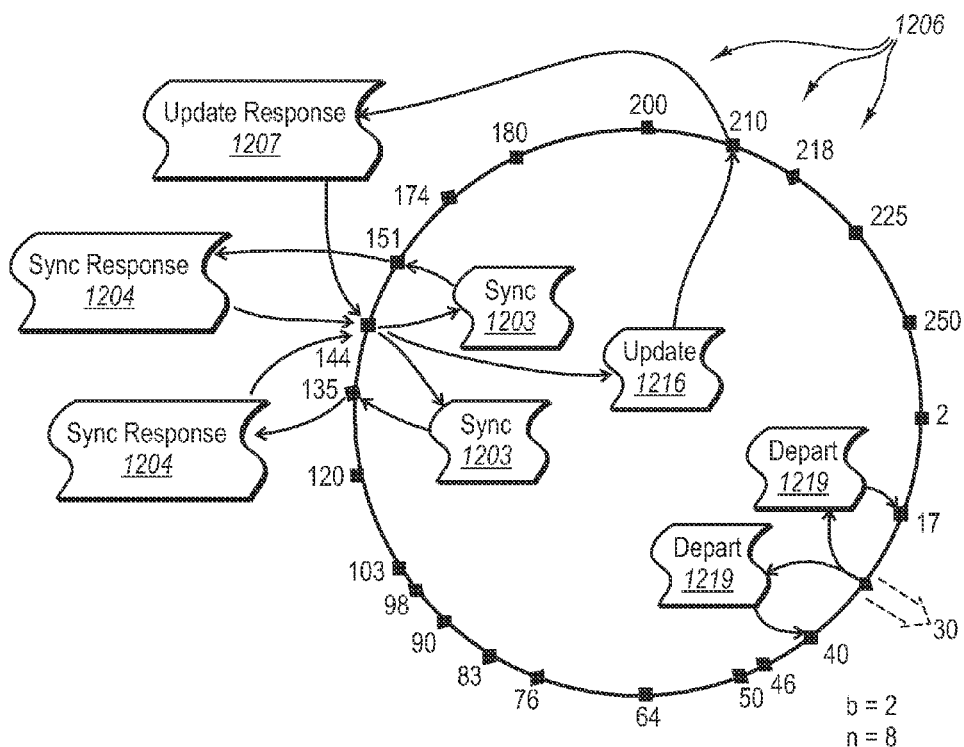
FIG. 12B illustrates an example of nodes in a federation infrastructure exchanging messages.

From time to time, nodes can join to and depart from existing federations. The nodes can implement appropriate protocols for joining and departing federations. For example, a node can implement a Join( ) function to become part of an existing federation. A node implementing the Join( ) function can transition through three ordered phase-states: an inserting phase-state, a synchronizing phase-state, and a routing phase-state before reaching the final operating phase-state. In other embodiments these specific order phase-states may not exist while others may be defined. FIG. 12A illustrates an example of a node establishing membership within a federation infrastructure. FIG. 12B illustrates an example of nodes in a federation infrastructure exchanging messages.

Insertion Phase:

A node, Y, enters this phase-state by issuing a join message, including at least its node ID and indicating a join action to the federation. A join message can be a routed message sent by a newly joining node (node Y) with its destination property set to the identity of the newly joining node. In this phase-state, a newly-joining node is inserted between its predecessor and successor nodes in the federation. The insertion phase-state can be implemented according to the following algorithm (All arithmetic is performed modulo $b^n$):

IP1 Y identifies an existing node that is already part of a lowest ring from which the joining node wishes to participate in the federation. This can either be statically configured or dynamically discovered using DHCP and/or DNS and/or WS-Discovery or a (potentially well-known) constant. Let this existing federation node be E.

IP2. Y invokes E.RouteNumerically(Y, joinMsg) to determine the node X whose ID is numerically closest to Y.id in every proximity ring that the node Y participates. This can include routing a join message to multiple nodes.

IP3. Determine the numerical successor (s) and predecessor (p) nodes. (Note that the data needed to do the following insertion can be carried in the join message and its response. As such, there are no additional roundtrips needed.)

Case 1: X.id>Y.id
Y.s=X, Y.p=X.p, X.p.s=Y, and X.p=Y
Case 2: X.id<Y.id
Y.p=X, Y.s=X.s, X.s.p=Y, and X.s=Y In response to the join message, node X (the node that processed the join message) can send a join response back to node Y. The join response can indicate the predecessor node (Y.p) and successor node (Y.s) for node Y. Node Y can receive the join response and process the join response to become aware of its predecessor and successor nodes. After processing the join response, Node Y can be a weak routing participant in the federation. For example, Node Y can simply forward message sent to it, either to its successor or predecessor nodes. Thus, Node Y is inserted into the federation infrastructure but routing and neighborhood tables are not populated. Before reaching this point, node Y will request other nodes sending it messages to redirect the messages sent to it through a different node by returning a status message to the sending node indicating that node Y's liveness phase is in an inserting phase-state.

Generally, from time to time, nodes can exchange sync request and response messages. Sync request and sync response messages can include liveness information (e.g., headers) for other nodes from the sender's point of view. Neighborhood state can also be included in sync request and response messages such that application layers in a neighborhood are aware of one another's state. One example of when sync request and response messages are exchanged is during a synchronizing phase-state of a joining node. However, sync request and response messages can be exchanged during other operational phase-states as well (e.g. while in the Operating Phase-state).

Figure 16:
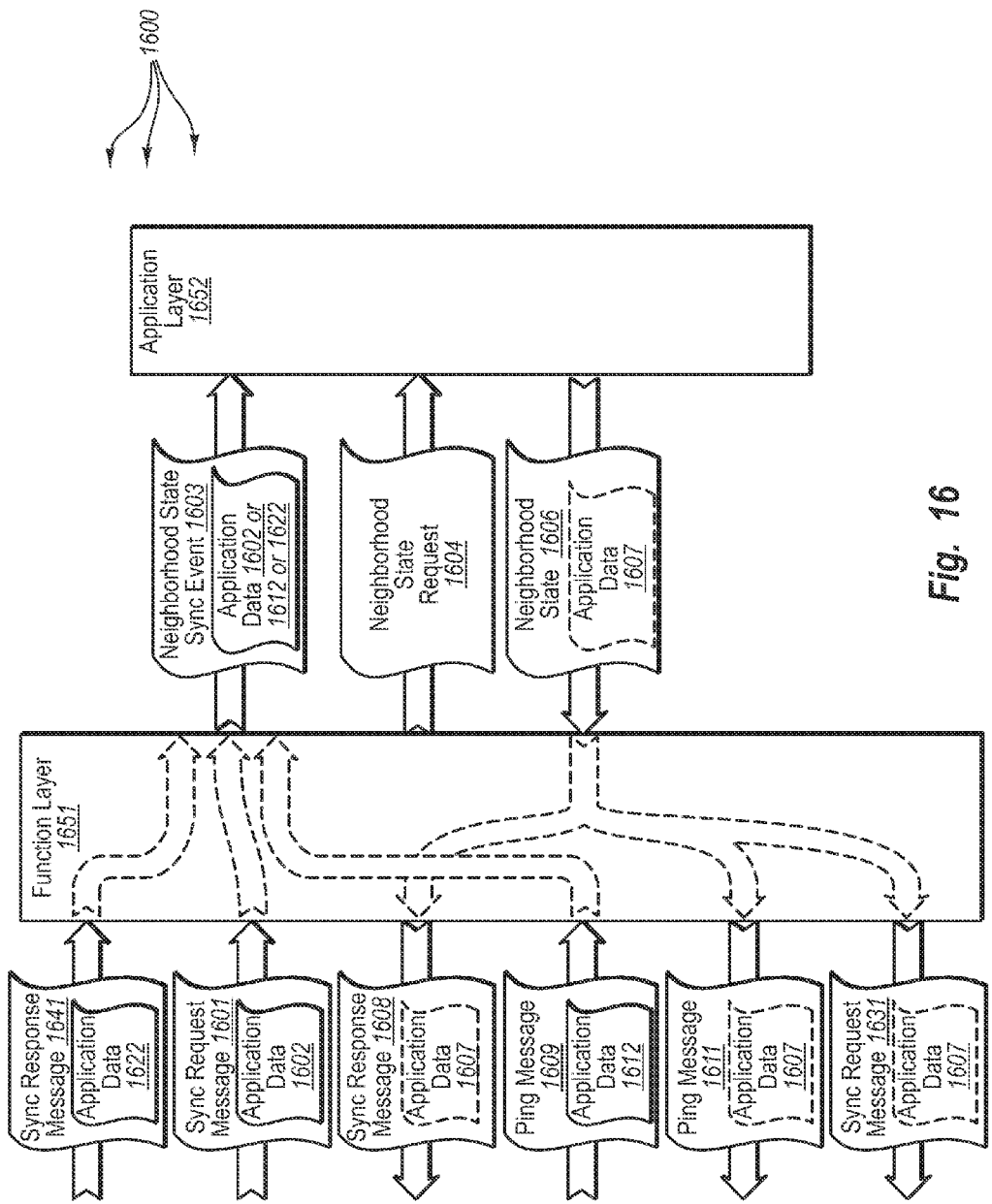
FIG. 16 illustrates an example of a message model and related processing model.

FIG. 16 depicts an example of a message model and related processing model 1600. As depicted in FIG. 16, a node can send and receive sync requests messages. For example, sync request message 1601 can be received at function layer 1651 from a newly inserted node (e.g., the node in FIG. 12B having ID 144). Application data 1602 (e.g., namespace subscriptions) can be piggybacked in sync request message 1601. Function layer 1651 can inform application layer 1652 of any application data included in sync requests messages. For example, function layer 1651 can invoke neighborhood state sync event 1603, including application data 1602, to application layer 1652. Sync request 1631, including application data 1607, can also be sent to another node that processes sync request 1631 similar to the processing to sync request 1601 in processing model 1600.

In response to some function layer event (e.g., sync request message 1601, sync response message 1641, or ping message 1612) function layer 1651 can invoke the neighborhood state request function 1604 in application layer 1652. Neighborhood state request 1604 is a request to the application layer to obtain the state that needs to be propagated in the neighborhood. In response to neighborhood state request 1604, application layer 1652 can supply neighborhood state 1606, including optional application data 1607, to function layer 1651. Alternately, application layer 1652 can send neighborhood state 1606, including optional application data 1607 in reaction to some application layer event. Using internal mechanisms similar to the above, function layer 1651 can send sync response message 1608, including optional application data 1607, to propagate application layer neighborhood state.

Synchronization Phase:

After processing a join response message, a node Y transitions from the insertion phase-state to synchronizing (Syncing) phase-state. In the synchronization phase-state, the newly-inserted node Y synchronizes information with nodes in the neighborhood. Generally, Node Y can send sync messages to at least its predecessor and successor nodes identified in the insertion phase-state. These nodes processing the sync messages can return sync responses that indicate corresponding neighborhood and routing partner nodes of these processing nodes. In a more specific example, the synchronizing phase-state can be implemented according to the following algorithm (All arithmetic is performed modulo $b^n$):

SP1. Compute the Neighborhood(Y) from the union of Neighborhood(Y.s) and Neighborhood(Y.p) nodes in each proximal ring the node Y participates. The union computation can be done as follows:

$(s_j, \ldots, s_1, s, p, p_1, \ldots, pk)$ such that $s_j.s.id>(Y.id+u/2)$, $j \geq v/2-1$, $p_k.p.id<(Y.id-u/2)$, and $k \geq v/2-1$ SP2. Referring briefly to FIG. 16, query Y's local application layer (e.g., application layer 1652) via a neighborhood state request (e.g., neighborhood state request) 1604 to obtain optional application specific neighborhood data (e.g., application specific data 1607).

SP3. Send synchronize message to at least the proximal successor and predecessor nodes including at least liveness state information of each proximal neighborhood and routing partner node from Y's perspective. Any optional application specific neighborhood data (e.g., application data 1607) accessed via SP 2 is included in the sync request 1631.

SP3. Y receives sync response messages back from those nodes processing sync messages sent in SP2. For example, node Y can exchange synchronize messages (request/response) with one or more nodes within its computed neighborhood. After synchronize messages are exchanged with at least one and potentially all of a node Y's neighborhood nodes, the computed neighborhood nodes can exchange further messages to propagate synchronized data. A synchronization message (request or response) can be a non-routed message sent by a node to proactively synchronize its data with a target node that is, for example, in the nodes neighborhood.

SP4. As sync response message in SP3 are received (e.g., sync response message 1641), any optional application specific neighborhood data present in these received sync response messages (e.g., application data 1622) can be offered to Y's application layer 1652 via neighborhood state sync event 1603.

As part of the synchronizing phase-state, the proximal successor (e.g., Y.s) and predecessor (Y.p) nodes exchange their routing tables with the newly-inserted node (e.g., Y). Nodes that receive sync messages can respond by sending sync responses. Sync responses carry data similar to synchronize messages except from the perspective of the responding node. Both sync messages and sync responses can carry (or piggyback) application data. Thus, application data can be propagated between nodes during the synchronizing phase-state. When the synchronize phase-state is complete, the node can process messages destined for it, instead of simply forwarding them either to a successor or predecessor. However, the node may still be viewed as a weak routing participant because its routing table is not populated.

Routing Phase:

After the synchronizing phase-state is completed, a node transitions into the routing phase-state. In the routing phase-state, the newly-synchronized node (e.g., node Y) computes its routing nodes. The routing phase-state can be implemented according to the following algorithm (All arithmetic is performed modulo $b^n$):

RP1 If the routing phase-state is being executed as part of the balancing procedure (explained later), ensure that the successor node (Y.s) and the predecessor node (Y.p) are alive in every proximity ring the node Y participates. If either is not alive, determine the replacement node for the failed one(s) by choosing a next best successor or predecessor node among the neighborhood nodes in the ring under consideration.

RP2. For $1 \leq i \leq n-1$

RP2a. Compute $z=Y.id \pm b^i$

RP2b. If the ring d is not the most specific proximity, find the proximity ring d in which the node Y participates and satisfying the condition $Y.s_d.id < Y.id + b^i < Y.s_{d+1}.id$ or $Y.p_d.id < Y.id - b^i < Y.p_{d+1}.id$. Else make ring d the most specific proximity ring. Ring d is the proximity ring in which node Y should look for the routing partner closest to z. Let Q be the node numerically closest to z between $Y.s_d.r_{\pm i}$ and $Y.p_d.r_{\pm i}$. If $|Q.id-z|$ is within a configurable percentage of $b^i$ (typically 20%), simply make $Y.r_{\pm i}=Q$. If Q.id is closer to z than either $(Y.s_d.id \pm b^i)$ or $(Y.p_d.id \pm b^i)$, it means node Y is a better partner routing node to node Q in proximity ring d than either $Y.s_d$ or $Y.p_d$. Therefore, send updateMsg to node Q, if it has not already been sent, supplying i and node Y as parameters so that node Q can establish node Y as its partner routing node at $r_{-i}$.

RP2c. If this phase-state is being executed as part of the balancing procedure and if $Y.s_d.r_{\pm i}.id == Y.p_d.r_{\pm i}.id$, there is only one node in the numerical range between $(Y.s_d.id \pm b^i)$ and $(Y.p_d.id \pm b^i)$. That node is the one pointed to by the routing node $r_{\pm i}$ of the successor (or predecessor) node. Therefore, simply make $Y.r_{\pm i}=Y.s_d.r_{\pm i-i}$.

RP2d. Else, compute the routing partner $Y.r_{\pm i}$ by invoking RouteProximally on node Q with the proximity criterion set to that of ring d. This implies $Y.r_{\pm i}=Q.RouteProximally(z, updateMsg, d)$.

RP3. At this point, node Y can process not only messages destined for it but can also route messages.

Figure 17:
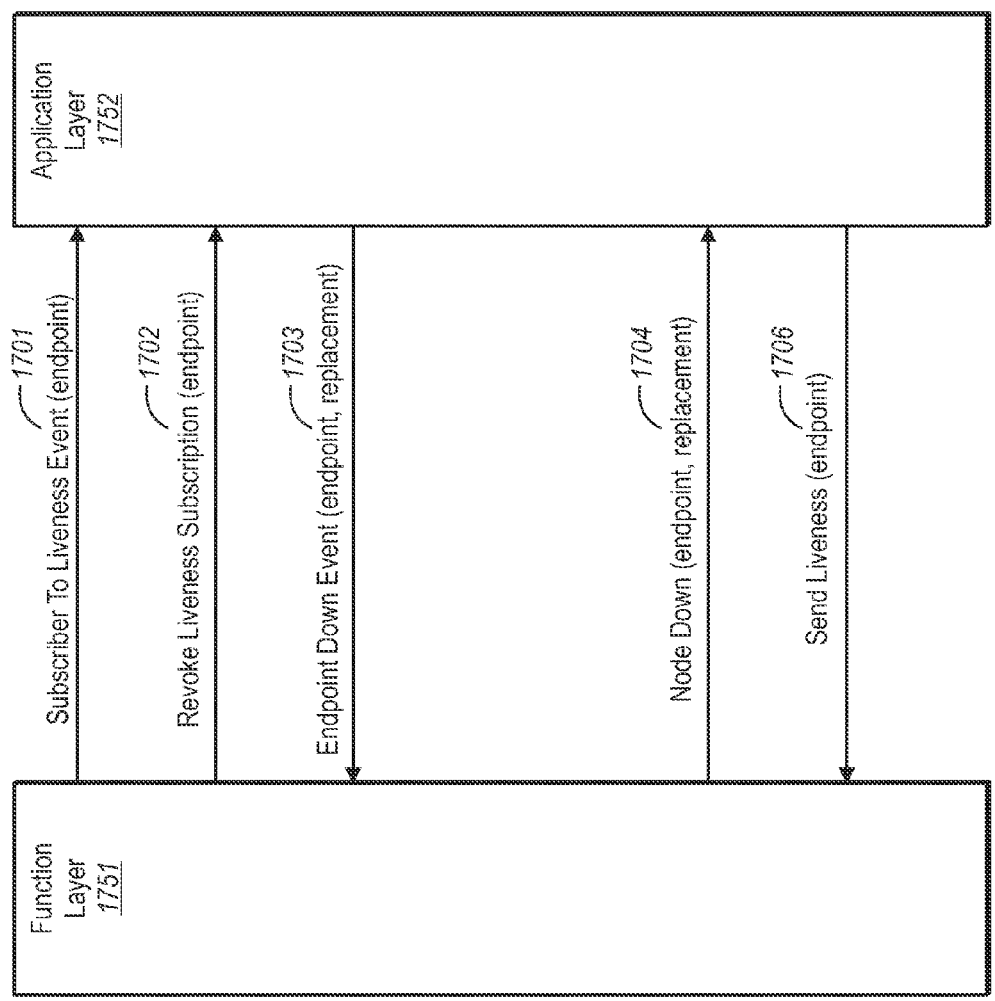
FIG. 17 illustrates an example of a number of liveness interactions that can occur between a function layer and an application layer.

RP4. Subscribe to liveness notification events sent from the application layer for the endpoint IDs of the partner routing nodes, if this has not already been done. Also, revoke any liveness event subscriptions previously established with the application layer for the nodes that are no longer partner routing nodes. For example, subscription and/or revoke requests can be passed up to an application layer (e.g., application layer 121) that implements pub-sub logic for a corresponding application (e.g., a namespace application). When subsequent application specific liveness messages (e.g. those resulting from namespace subscriptions) are received at the application layer, notifications (events) can be pushed down to other lower layers (e.g., other lower layers 131) for processing FIG. 17 depicts an example of a number of liveness interactions that can occur between function layer 1751 and application layer 1752. As depicted in FIG. 17, endpoints are, for example, publish/subscribe topics (e.g., represented by a URL or URI) representing various nodes and can be, for example, federation infrastructure nodes. Subscribe To Liveness Event 1701 can be invoked from function layer 1751 to application layer 1752 to subscribe to a liveness event (e.g., to a publish/subscribe topic). Revoke Liveness Subscription 1702 can be invoked from function layer 1751 to application layer 1752 to revoke a subscription to a liveness event. End Point Down 1703 can be sent from application layer 1752 to function layer 1751 to indicate that an endpoint may be down and provide function layer 1751 with an optional replacement endpoint. End Point Down event 1703 can be sent asynchronously based on a prior subscription (e.g., Subscribe To Liveness Event 1701).

Node Down 1704 can be invoked from function layer 1751 to application layer 1752 to indicate that function layer 1751 (or some other lower layer) has detected a failed node and optionally provide application layer 1752 with a replacement node. Application layer 1752 can subsequently propagate that a potentially failed node was detected to other interested parties. Node down event 1704 can be sent asynchronously anytime function layer 1751 or some other lower layer detects a potentially failed node. Send liveness 1706 can be invoked from application layer 1752 to function layer 1751 when application layer 1752 detects that a node is down (e.g., from node down event 1704 or from some other out-of-band mechanism). Send liveness event 1706 can cause function layer 1751 to send a liveness message. Send liveness event 1706 can also be invoked asynchronously anytime application layer 1752 detects that a node is down and does not depend on any prior established subscriptions (via subscribe to liveness).

Thus, in some embodiments, function layer 1751 is used recursively. For example, function layer 1751 can indicate an interest in a specified node (e.g., is the particular node up or down) to application layer 1752. Application layer 1752 can formulate an application specific subscription for notifications related to the specified node and then reuse function layer 1751 to communicate the formulated subscription to appropriate corresponding application layer 1752 instances in other federation nodes. For example if the application layers 1752 with in federation nodes implemented a namespaces pub/sub behaviors, function layer 1751 can route the subscription to a publish/subscribe manager that manages notifications for the specified node—the pub/sub Manager being implemented as at least part of the application 1752 in the related federation nodes. Accordingly, function layer 1751 is used to route a subscription that function layer 1751 caused to be generated. Similar recursive mechanisms can also be used to unsubscribe or otherwise indicate that there is no longer an interest in the specified node.

Operating Phase:

After the routing phase-state is completed, a node transitions into the operating phase-state. The node can remain in an operating phase-state until it goes down (e.g., rebooting). In the operating phase-state, the node can send update messages to routing partners from time to time. Update messages (both update requests and update responses) can include neighborhood node liveness information for the sending nodes (e.g., for all proximal neighborhoods of interest). This sent liveness information can also include that of the sender's liveness info. Update messages can be routed messages originated by nodes to periodically update its routing partner nodes. Application data can be piggyback on update messages such that application data can be propagated during routing partner updates. The message destination is set to the identity of the perfect routing partner at the desired routing index. The Message ID property of this message is assigned an application sequence number so as to enable the node(s) processing this message to determine the latest message and this message is routed proximally.

A node that receives an update message can respond with an update response. An update response carries the same data as the update message except that the data is from the perspective of the responding node. Through the exchange of update messages and update responses nodes can exchange routing information. From time to time, operational nodes can update routing partners.

From time to time, operational nodes can also send ping messages (e.g., ping messages 1609 and 1611). A ping message is a one-way message sent by a node to periodically announce its presence and disseminate information within its neighborhood about its neighborhood/routing nodes and replicate (e.g., piggybacked) application data.

An origin node can send a ping message to one or more of its immediate predecessor and successor neighborhood nodes. Thus, depending on the ping distribution pattern (i.e., which nodes are sent ping messages) information related to the origin node is propagated to other nodes on a ring within the neighborhood of the origin node. For example, the origin node can send a ping message only to its immediate predecessor and successor nodes and the ping message propagates outward from the position (node ID) of the origin node along the ring in both directions to the edge of the origin's neighborhood. Alternately, the origin node can send a ping message to every $n^{th}$ node in its neighborhood in both its predecessor and successor directions.

Each node receiving a ping message checks its interest in the origin node from a neighborhood range perspective. If not interested, it discards the ping message. If interested it processes the ping message and forwards the ping message according to its specified ping pattern if such forwarding is constrained to the neighborhood of the originating node. For example, after processing a ping message a receiving node can forward the ping message to at least its successor node if the sending and origin nodes are in its predecessor node set or at least its predecessor node if the sending and origin node are in its successor set.

Thus, the outward propagation of ping messages stops when the message reaches the edge of the neighborhood node set around the origin node. The Message ID property of ping message is assigned an application sequence number so as to enable the nodes processing this message to determine the latest message from the origin node and avoid duplicate processing or otherwise unneeded forwarding.

Referring back to FIG. 16, ping message 1609 can be received at function layer 1651 from a neighborhood node. Application data 1612 (e.g., namespace subscriptions) can be piggybacked in ping message 1609. Function layer 1651 can inform application layer 1652 of any application data included in ping messages. Similarly, function layer 1651 can inform application layer 1652 of any application data included in Sync Request messages. Both of these cases of transference can be accomplished via sending a neighborhood state sync event 1603, including application data 1612, to application layer 1652.

In response to some function layer event (e.g., received ping message 1609) function layer 1651 can send neighborhood state request 1604 to application layer 1652. Neighborhood state request 1604 is invoked on the application layer 1652 to obtain the state that needs to be optionally propagated in the neighborhood. In response to neighborhood state request 1604, application layer 1652 can return neighborhood state 1606, including optional application data 1607, to function layer 1651. Function layer 1651 can send ping message 1611, including optional application data 1607, to propagate neighborhood and routing partner node liveness information as well as optional application layer neighborhood state. Function layer 1651 can also send sync response 1608, including optional application data 1607, to propagate application state.

Departure Protocol

When it is appropriate for a node to depart from a federation, the node can implement a Depart function to be gracefully removed from the federation. A node departs an existing federation by sending a departure message to one or more of its immediate proximal predecessor and successor nodes, and maybe other nodes in the same proximal neighborhood. Thus, depending on the departure distribution pattern (i.e., which nodes are sent departure messages) information related to the departing node is propagated to other nodes on a ring within the neighborhood of the departing node. A departure message is a one-way message originated by a gracefully departing node to inform one or more other nodes within at least one of its proximal neighborhoods about its impending departure. The departing node propagates the depart message (e.g., within its neighborhood) in a manner similar to the propagation of the ping messages. For example, the node having ID 30 can send depart messages 1219 to the nodes having IDs 17 and 40. The node having ID 30 can then remove itself from the federation infrastructure from the standpoint of a given proximal ring. Note that it is possible that a node remove itself from one proximal neighborhood but not others to which it may belong.

Since the nodes having IDs 17 and 40 (i.e., the predecessor and successor nodes) are likely to be the closest nodes to ID 30 after the node having ID 30 is removed, the nodes having IDs 17 and 40 are made aware of the node having ID 30's departure. Thus, future messages that are to be delivered to ID 30 can be appropriately processed at the nodes having IDs 17 and 40. The nodes having IDs 17 and 40 can propagate the departure of the node having ID 30 to the other nodes on ring

1206. In the absence of the node having ID 30, the nodes have IDs 17 and 40 can also recompute predecessor and successor pointers, potentially pointing to each other.

The Message ID property of a depart message is assigned the same application sequence ID as that of Ping messages so as to enable the nodes processing the depart message to determine the latest message among a series of ping and depart messages sent by an origin node. Graceful departure from a federation proximal ring is optional but encouraged. However, the federation is designed to self-heal if nodes leave abruptly.

Liveness

During the lifetime of a federation, nodes can exchange liveness information to maintain the federation. Liveness information can be included in virtually any message that is exchanged within a federation in the form of Liveness Message Headers. For example, join messages, join responses, sync messages, sync responses, update messages, update response, application specific messages, liveness messages, and ping messages can all include liveness information headers. When a federation node sends any message or response, the node can include Liveness information for processing by other nodes. Linveness information can be included in a liveness information header of liveness message.

Liveness information indicating the liveness state of a node can be represented using the following properties:

[Node]: Identifies the node whose liveness state is being represented. A node can be identified based on [Reference Properties] that further include an [Instance ID].

[Reference Properties]: Element information items specified in the WS-addressing specification. WS-addressing defines the [Instance ID] reference property for inclusion in the reference property set.

[Instance ID]: A number that identifies a particular instance of a node. An incrementing boot count can be used as the instance ID of a node.

[Phase]: Conveys the phase of identified node.

[Phase-State Value] Conveys the highest phase-state (inserting, synchronizing, routing, operating) that the indicated node instance was know to have achieved

[Phase.Unknown Indication] An indicator that conveys if the current phase is known or unknown.

[Freshness]: Conveys the freshness of the information and its value ranges from 0 to MaxFreshness. The higher the value, the fresher the information with 0 implying no information and MaxFreshness is a protocol defined constant.

[Color]: Identifies the proximity equivalence class to which the node belongs. Two nodes with the same color value are always considered to be proximally closest because they both belong to the same equivalence class identified by the color value. The number of proximity equivalence classes can increase over time as more nodes join the federation.

[Weight]: Supplies the node capability metric and its value ranges from 0 to MaxWeight. It measures the desirable characteristics of a federation node such as large computational power, high network bandwidth, and long uptime. The higher the value, the more capable the node is making it more desirable from a partnership perspective.

In some environments, the [Node] and [Freshness] properties of a node are either implicitly or explicitly conveyed in a larger scope such as the [Origin] and [Sender] message headers and as such inclusion of the above properties again in the liveness headers will be duplicative. For example the sender of a message need only convey its current phase, color, and weight information as its ID, Instance Id are supplied in the message addressing headers and its Freshness is implied.

Liveness state can be at least partially ordered based on a "<" binary relation defined as follows:

"L1<L2" is true if

1. "L1.[Node].[Name]==L2. [Node].[Name]" is true and one of the following is true with the tests performed and short-circuited in the order listed:

L1.[Node].[Reference Properties].[Instance ID]L2.[Node].[Reference Properties].[Instance ID]

L1.[Phase.Unknown Indication] !=true AND L2.[Phase.Unknown Indication] !=true AND L1.[Phase-State]<L2.[Phase-State]

L1.[Freshness]<L2.[Freshness]

2. Or "L1.[Color]==L2.[Color]" is true and one of the following is true with the tests performed and short-circuited in the order listed:

L1.[Phase-State]<L2.[Phase-State]

L1.[Weight]<L2.[Weight]

Further, a liveness "down" message can be sent to a specified node when it is detected or suspected that the specified node has become unavailable (e.g. gone down). As an example, when an application layer (e.g., application layer 121) detects that another application layer (e.g., application layer 123) or a node hosting that another application layer is down, the detecting application layer can notify other lower layers (e.g., other lower layers 131) that the node may be down, for example, in accordance with message model and related processing models 1600 and/or 1700. Such a notification can cause other lower layers, such as, for example, function layer 1651, to send a liveness down message. This is only one example of stimulus for the generation of liveness down messages.

Since liveness down messages are routed and thus delivered to a node closest to those nodes suspected of being down, if a liveness down message for a specified node gets delivered back to the specified node, then either the specified node never went down or the specified node is a different instance (e.g., with a different instance ID). On the other hand, if the liveness down message gets delivered to another node, it indicates the specified node does appear to have gone down. Accordingly, if the node receiving the liveness down message views itself as being in the proximal neighborhood of the specified node, it may source a departure message for the specified node into that proximal neighborhood as described as well as indicating to its the application layer (e.g., using Node Down 1704) that the specified node may be down and that the receiving node is its replacement. A liveness down message for the specified node can be routed proximally with its target ID set to that of the node that may be down.

Balancing Procedure

Embodiments of the present invention are designed to accommodate large number of nodes joining and departing the federation in a short period of time. Such changes in the network can cause routing delays if the logarithmic search trees maintained at the various nodes become unbalanced. That is, if there are more nodes on one side of a ring than the other. To facilitate optimal routing efficiency, nodes participating in a federation execute the balancing procedure when certain criteria are met.

For example, when any of the following conditions are true, any node can execute the balancing procedure to ensure a balanced routing table for optimal routing efficiency:

A configured number of liveness messages described above were received.

A configured amount of time has elapsed since the receipt of the last liveness message described above.

The neighborhood has changed in the sense that some new nodes have arrived or some existing nodes have departed.

Balancing the routing tables is a simple process. For example, nodes with an unbalanced routing table can re-execute the Synchronization and Routing phase-states of the Join protocol.

Acts RP2b, RP2d and RP4 combined with 1) finding the closest routing node to a number, 2) the departure protocol followed by the nodes leaving a federation gracefully, and 3) balancing procedure followed by the nodes receiving liveness messages result in a the faster healing system when federating nodes join and depart the network fairly quickly and in large numbers.

Status Messages

Figure 18:
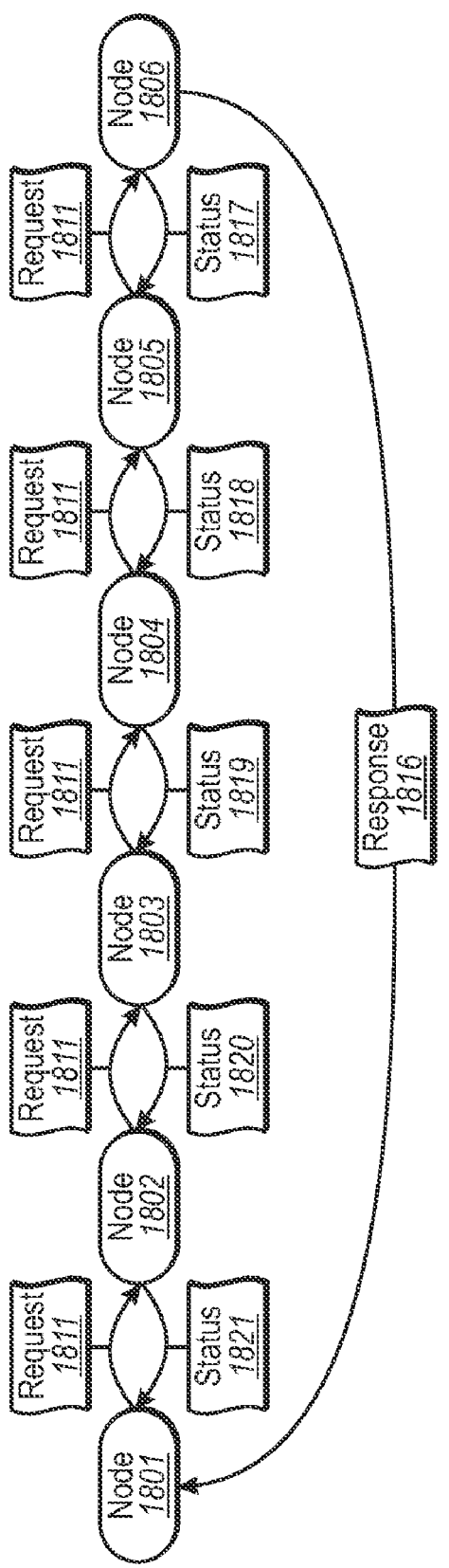
FIG. 18 illustrates an example of messages forming part of a request-response message exchange pattern are routed across nodes on a ring.

A status message is non-routed message sent by a receiver node to a sender node to inform routing success/failure of a correlated message that the sender node previously forwarded to the receiver node. FIG. 18 depicts an example of how messages forming part of a request-response message exchange pattern are routed across nodes on a ring. A status message can include headers that identify the original correlated message whose routing status is being reported. As such, status messages can be used between nodes to indicate that message was successfully routed form one node to the next. For example, routing request message 1811 from node 1801 to node 1806 includes sending request 1811 though nodes 1802, 1803, 1804, and 1805. Corresponding cascading success status messages (status 1817, 1818, 1819, 1820 and 1821) can be sent from node 1806 to node 1805, from node 1805 to node 1804, from node 1804 to node 1803, from mode 1803 to node 1802, and from node 1802 to node 1801 respectively. In response to request 1811, response 1816 can be sent end-to-end from node 1807 to node 1801. Response 1816 is optional and may not exist in a one-way message exchange pattern.

Figure 13:
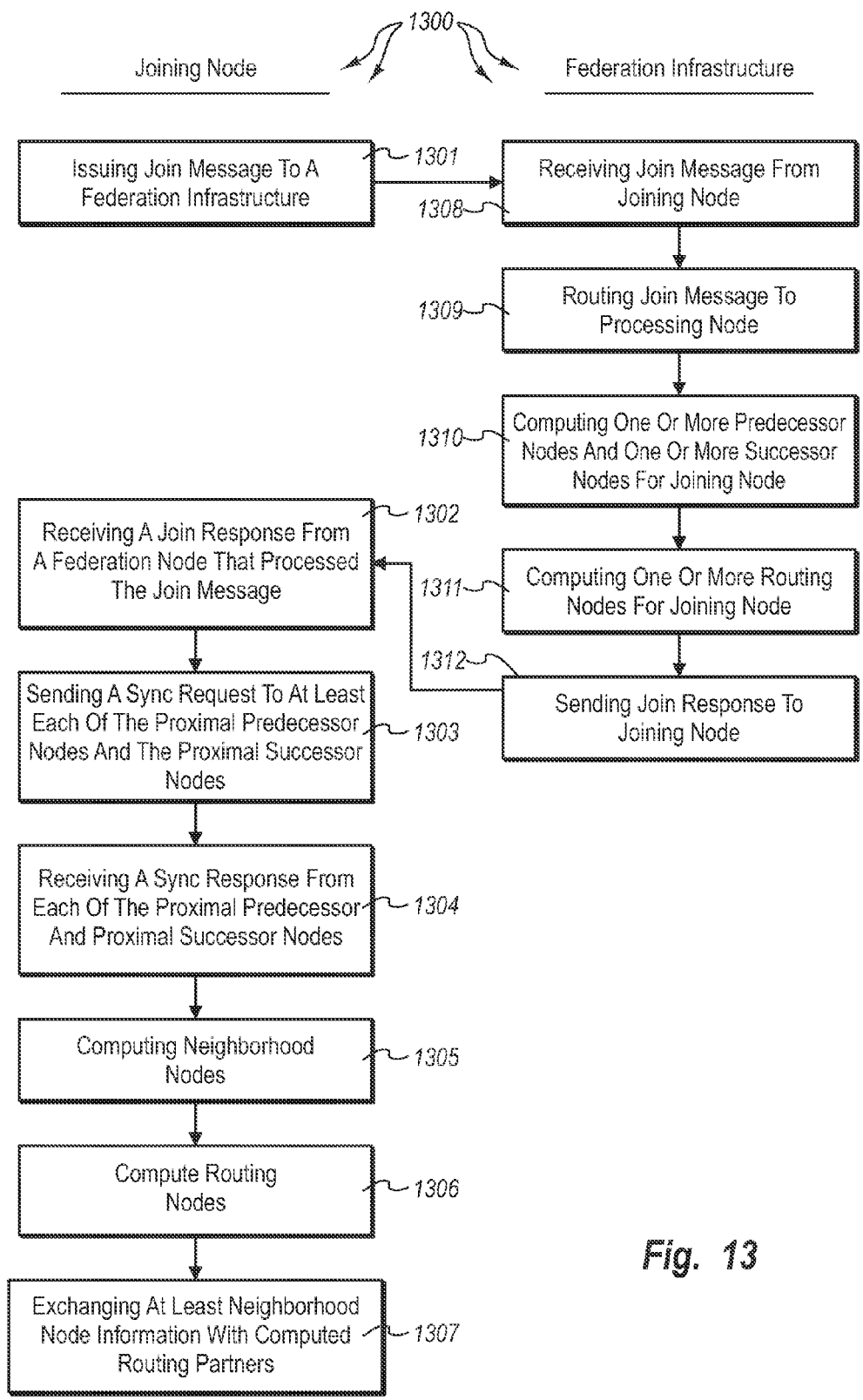
FIG. 13 illustrates an example flow chart of a method for establishing membership within a federation infrastructure.

FIG. 13 illustrates an example flow chart of a method 1300 for a node to join the federation infrastructure. The method 1300 will be described with respect to ring 1206 in FIGS. 12A and 12B. Method 1300 includes an act of issuing a join message to a federation infrastructure (act 1301). For example, the node having ID 144 can issue join 1201 to federation infrastructure including ring 1206. Method 1300 includes an act of receiving a join message from a joining node (act 1308). For example, an existing node in the federation infrastructure including ring 1206 can receive join 1201.

Method 1300 includes an act of routing a join message to a processing node (act 1309). The processing node can be a node having an ID numerically closer the ID of the joining node than other active nodes in the federation infrastructure at the time the join message is being routed. For example, join 1201 can initially be received at the node having ID 64, routed to the node having ID 135 and routing to the node having ID 151.

Method 1300 includes an act of computing one or more predecessor nodes and one or more successor nodes for the joining node (act 1310). For example, the node having ID 151 can compute an immediate predecessor node and an immediate successor node for the node having ID 144. Within ring 1206, the node having ID 151 can compute that the node having ID 135 is an immediate predecessor node that the node having ID 151 is an immediate successor node. Similar computations can be made for other proximal rings.

Method 1300 includes an act of computing one or more routing nodes for the joining node (act 1311). For example, the node having ID 151 can compute routing nodes (from the node having ID 151's perspective) for the node having ID 144. Within ring 1206, the node having ID 151 can compute, for example, that the nodes having IDs 218 and 40 are routing nodes for the node having ID 144. Similar computations can be made for other proximal rings.

Method 1300 includes an act of sending a join response to the joining node (act 1312). A join response can identify all the predecessor and successor neighborhood and routing partner nodes for the joining node as computed by the processing node given its current view of the federation infrastructure. For example, join response 1202 can identify at least the node having ID 135 as the immediate predecessor node to the node have ID 144, can identify the node having ID 151 as the immediate successor node to the node having ID 144, and can identify any routing nodes (for the node having ID 144) computed at the node having ID 151 for node ID 144 (the newly joining node).

Method 1300 includes an act of receiving a join response from a federation node that processed the join message (act 1302). For example, the node having ID 144 can receive join response 1202 from the node having ID 151.

Method 1300 includes an act of sending a sync request to at least each of the immediate proximal predecessor nodes and immediate proximal successor nodes (act 1303). For example, referring now to FIG. 12B, the node having ID 144 can send sync requests 1203 to the nodes having IDs 135 and 151. Sync request 1203 can include an identification of any neighborhood nodes of the node having ID 144 and/or an identification of any routing partners of the node having ID 144.

The nodes having IDs 135 and 151 can receive the sync requests 1203. In response to receiving sync requests 1203, the nodes having IDs 135 and 151 can identify their neighborhood and routing partner nodes from corresponding routing tables. The nodes having IDs 135 and 151 can include their identified neighborhood and routing partner nodes' liveness information in sync response 1204 and send the send sync responses 1204 to the node having ID 144.

Method 1300 includes an act of receiving a sync response from each of the proximal predecessor and successor nodes (act 1304). For example, the node having ID 144 can receive sync responses 1204 from the nodes having IDs 135 and 151. Sync response 1204 can include liveness information for one or more nodes on ring 1206 or other rings in a federation infrastructure. Sync response 1204 can also identify any prospective routing partner nodes for the node having ID 144.

Method 1300 includes an act of computing neighbor nodes (act 1305). For example, the node having ID 144 can compute corresponding neighborhood nodes based on the union of the neighborhood nodes for the nodes having IDs 135 and 151. Neighborhood nodes can be computed based on a summarized view of the join response message and any sync response messages.

Method 1300 includes an act of computing routing nodes (act 1306). For example, the node having ID 144 can compute routing nodes from among the nodes of ring 1206. Routing partners can be computed base on a summarized view of the join response message and any sync response messages.

Method 1300 includes an act of exchanging at least neighborhood node information with computed routing partners (act 1307). For example, the node having ID 144 and the node having ID 218 (a computed routing partner) can exchange state information (e.g., instance ID, phase-state, etc) corresponding to their respective neighborhood nodes. These exchanges are accomplished by the newly joining node sourcing (routing) an Update message to at least each unique computed routing partner as described in the Routing Phase-state text above. The nodes processing the Update message will send corresponding Update response message in reaction to the receipt of these update messages from the newly joining node. The Update response includes at least the liveness information for itself and its neighborhood nodes.

Method 1300 can also include an act of initiating an initial propagation of routing tables to at least one neighborhood node. For example, the node having ID 144 can include computed neighborhood and routing partner nodes in a ping message and send the ping message to the node having ID 174 (e.g., one of the computed neighborhood nodes). The node having ID 174 can receive the ping message and update a corresponding routing table with the liveness information originated at the node having ID 144. The node having ID 174 can also include its corresponding routing table in a second ping message and send the second ping message at some future point to the node having ID 144. The node having ID 144 can receive the second ping message and can update its corresponding routing table with nodes in the liveness information included in second ping message (i.e., nodes in the routing table of the node having ID 174). The node having ID 144 can repeat the sending of ping messages with other neighborhood nodes in ring 1206.

It should be understood that when a newly joining node joins a federation, the newly joining node may not find an existing federation member and thus becomes the sole member. Thus, there may be no predecessor, successor, or neighbor nodes assigned for the newly joining node. Accordingly, the newly joining node is mapped as the best routing partner in all cases.

Further, although the method 1300 has been described with respect to a single ring (ring 1206), it should be understood that in some embodiments a node that joins one ring inherently also joins one or more other rings. For example, referring briefly back to FIG. 5, a node at joins ring 551 inherently also joins rings 543, 531, 522, 511, and 501. Thus, method 1300 can be implemented to join a plurality of rings. In other embodiments some or all of the acts in method 1300 may be repeated when joining multiple rings. For example, referring again to FIG. 5, one or more of the acts of 1300 can be repeated when a node joins both ring 551 and ring 514 (e.g. aliasing). In any event, a joining node ID can be accessed and used to identify a joining node in a sorted linked list as well as corresponding hierarchically partitioned sub-lists the joining node is to participates in. A receiving node is identified from the sorted linked list and each partitioned sub-list. The join message is routed to a processing node (e.g., based on ID) in the sorted linked list and each portioned sub-list. A join response is received from the processing node in the sorted linked list and each partitioned sub-list.

Figure 14:
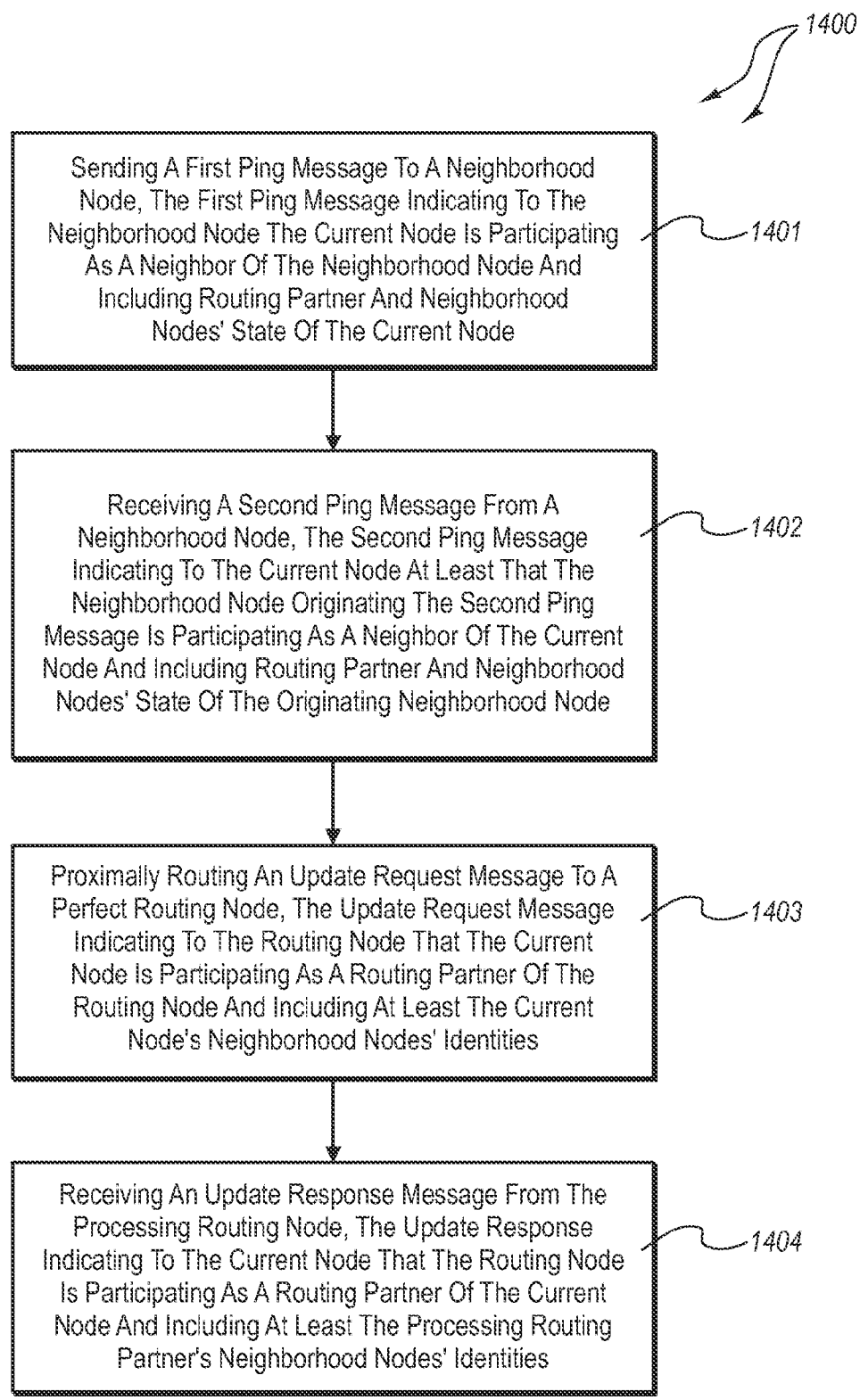
FIG. 14 illustrates an example flow chart of a method for maintaining membership within a federation infrastructure.

FIG. 14 illustrates an example flow chart of a method 1400 for a node to maintain membership in a federation infrastructure. The method 1400 will be described with respect to ring 1206. Method 1400 includes an act of sending a first ping message to a neighborhood node (act 1401). The first ping message indicates that a current node sending the first ping message is neighbor of the neighborhood node. The first ping message can also include routing partner and neighborhood nodes' state of the current node. For example, the node having ID 144 can send a ping message to the node having ID 151. Upon receiving the first ping message, the node having ID 151 is made aware that the node having ID 144 is a neighbor of the node having ID 151. Node 151 may also discover newer liveness information (for other nodes on ring 1206) from node 144 as a side effect of this act.

Ping messages can be periodically repeated at a specified frequency based on, for example, configuration state associated with a proximal ring into which the ping message is to be sent. The frequency can be varied depending on the configuration state. For example a specified ping frequency for a WAN can be different than the specified frequency for a LAN. Ping messages can also be sent in accordance with a ping distribution pattern. The ping distribution pattern for an originating node can indicate that ping messages are to be sent to be neighborhood nodes in both directions on a ring. For example, the node having ID 144 can send pings both in the direction of the node having ID 135 and in the direction of the node having ID 151. Ping distribution patterns and frequencies can be varied. For example, per proximity ring.

Method 1400 includes an act of receiving a second ping message from the neighborhood node (act 1402). The second ping message indicates to the current node at least that the neighborhood node originating the second ping message is a neighbor of the current node. The second ping message can also include routing partner and neighborhood nodes' state of the originating neighborhood node. For example, the node having ID 151 can send a second ping message to the node having ID 144. Upon receiving the second ping message, the node having ID 144 is made aware that the node having ID 151 is a neighbor of the node having ID 144. The second ping message can also include liveness information for other nodes on ring 1206. Thus generally, ping messages can be exchanged within a neighborhood and can be used to maintain neighborhood membership (for each proximal membership) and an approximated common neighborhood view of node presence within the federation.

A received ping message can be periodically repeated/forwarded to other nodes within the proximal neighborhood into which the ping was originated (sent by the originating node). Forwarded ping messages can also be sent in accordance with a ping distribution pattern. The ping distribution pattern for a forwarding node can indicate that ping messages are to be sent to be neighborhood nodes in a direction away from an originating node. For example, the node having ID 1151 can forward pings originating at the node having ID 144 in the direction of the node having ID 174. Ping forwarding distribution patterns can be varied, for example, per proximity ring.

Nodes can be configured to receive ping messages at corresponding intervals. When expected ping messages are not received, a node may interpret a communications failure and set the phase.unknown indication for another node to true for the node that should have originated the expected, but at least late, ping message.

Method 1400 includes an act of proximally routing an update request message to a perfect routing node (act 1403). The update request message indicates to the routing node receiving such a routed update request that the current node is participating as a routing partner of the receiving routing node. The update request message can also include at least the current node's neighborhood nodes' identities (e.g. in the form of liveness information). For example, the node having ID 144 can route update message 1216 to the node having ID 208 (the perfect routing partner offset by 64 from 144). Because node 210 (a previously computed routing node) is closest to 208, it will receive and process the routed update request. Upon receiving update message 1216, the node having ID 210 is made aware (or is reinforced) that the node having ID 144 is a routing partner of the node having ID 210.

Method 1400 includes an act of receiving an update response message from the processing (receiving) routing node (act 1404). The update response indicates to the current node that the processing routing node is participating as a routing partner of the current node. The update response message can also include at least the processing routing partner's neighborhood nodes' identifies. For example, the node having ID 210 can send update response 1207 to the node having ID 144. Upon receiving update response 1207, the node having ID 144 is made aware that the node having ID 210 is a routing partner of the node having ID 144.

Method 1400 can also include an act of appropriately updating node information to indicate that the current node and the neighborhood node are participating as neighbors and that the current node and the neighborhood node are participating as routing partners For example, the node having ID 144 can update node information corresponding to the node having ID 151 to indicate that the nodes having IDs 144 and 141 are participating in a (proximal) neighborhood. Similarly, the node having ID 144 can update node information corresponding to the node having ID 210 to indicate that the nodes having IDs 144 and 210 are participating as routing partners.

In some embodiments, application state saved at a specified node X is replicated among its Neighborhood(X) nodes using reliable-flooding protocol. Each item in the application state has an assigned owner, which could be the endpoint that created the item. Each item in the application state also has an associated timestamp (a.k.a. sequence number) given by its owner. The timestamp has at least three components:

Instance ID (e.g., an unsigned-integer) of the owning entity. Must be at least monotonically (>1) increasing.

Sequence ID (e.g., a URI) identifying the particular sequence generated by an owner. This component allows the same owner to generate multiple independent sequences Ordinal number (e.g., an unsigned-integer) identifying the offset within the identified application sequence ID.

Item timestamps are used to detect latest information associated with the corresponding item during replication because item timestamps generate at least a partial-order with <Instance ID, Sequence ID, and Offset> triples. The timestamp associated with an item being replicated is compared against the local one, if any, to detect the latest one. Item timestamps are also used to support idempotent semantics of create/update/delete operations. For example, when a node receives a request to update an existing item in the application state, the update is accepted only if the timestamp associated with the update request is higher than the one associated with the local item. Conflict resolution techniques based on vector timestamps can be utilized where items cannot be assigned a single owner. Application state replication provides fault-tolerance and facilitates load-balancing requests across neighborhood nodes.

As an optional behavior, Nodes not detecting (after a period of time) an expected Update or Ping from (origin) other partner (routing and/or partner) nodes can consider the phase-state unknown, set a phase.unknown indication to true, and report it as such to other $3^{rd}$ party nodes. In other words periodic generation of updates and pings can be required. This requirement and actual timeout values can be an attribute of various proximal rings. For example, a ring can have more restrictive timing requirements for some sub-rings (e.g., in a LAN segment) and node failure detection/reporting is relatively quick. On the other hand, a ring can have less restrictive timing requirements (or even no timing requirements) for other sub-rings (e.g., on the Internet) and proactive node failure detection/reporting is relative long (or doesn't exist).

Figure 15:
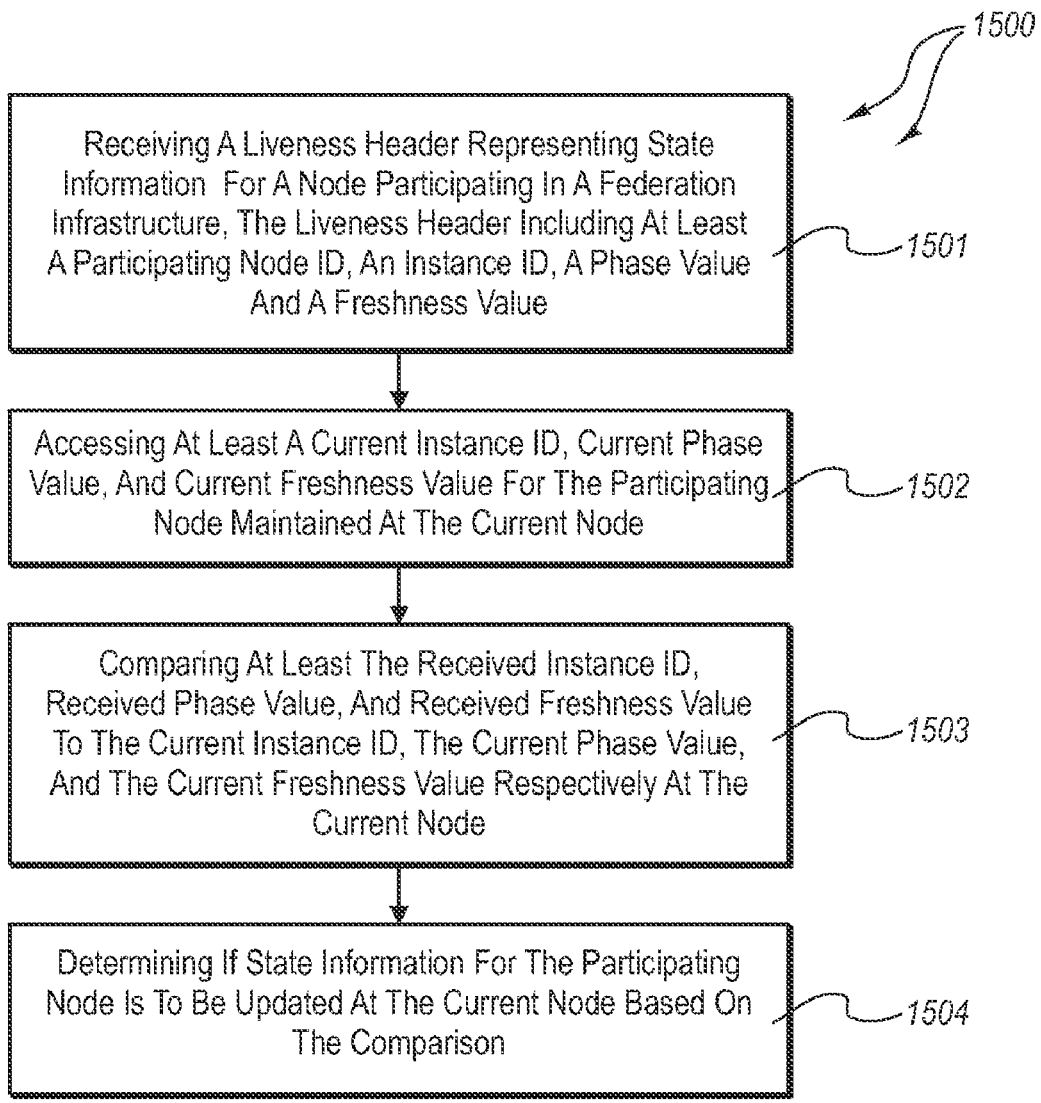
FIG. 15 illustrates an example flow chart of a method for discovering liveness information for another node.

FIG. 15 illustrates an example flow chart of a method 1500 for discovering liveness information for another node. The method 1500 will be described with respect to ring 1206 in FIGS. 12A and 12B. Generally, any message, such as, for example, sync 1203, sync response, 1204, update 1216, update response 1207, etc., can include at least one liveness header. In some embodiments, a liveness header includes a <node ID, instance ID, phase [phase-state value].[phase.unknown indication], freshness value, a color (proximity) value, and a weight value> for a node. In other embodiments, a liveness header includes <a phase [phase-state value].[phase-.unknown indication], freshness value, a color (proximity) value, and a weight value>. In these other embodiments, liveness headers can be used to augment addressing headers that already include node ID and instance ID for sender and origin nodes. Since the addressing headers already include node ID and instance ID, this information can be omitted from the liveness header.

Method 1500 includes an act of receiving a liveness header representing state information for a node participating in a federation infrastructure (act 1501). The liveness header includes at a least a received participating node ID, a received node's instance ID, a received phase value, and a received freshness value. For example, the node having ID 144 can receive a first liveness header in sync response 1204 from the node having ID 151. The first liveness header can include a <participating node ID, an instance ID, phase value [phase-state value].[phase.unknown indication], a freshness value, a color (proximity) value, and a weight value> for the node having ID 174. The phase-state value (e.g., Inserting, Syncing, Routing, Operating) identifies the expressed phase of the node having ID 174 at the time of the first freshness value. The phase value (e.g., phase-state: [Inserting, Syncing, Routing, Operating], and phase.unknown) identifies the expressed and/or detected phase information of the node having ID 174 at the time indicated by the first freshness value.

However, a freshness value can be discounted due to communication delay. A freshness value can also decay with the passage of time. The decay curves for a freshness value can differ (and may not be linear or symmetric) for the different phase states (including unknown). Thus, across different node phases, the decay of a freshness value can be non-linear and/or asymmetric.

Method 1500 includes an act of accessing at least a current instance ID, current phase value, and current freshness value for the participating node maintained at the current node (act 1502). For example, the node having ID 144 can access a previous received and stored instance ID, phase value [phase-sate value].[phase.unknown indication], and freshness value for the node having ID 174.

Method 1500 includes an act of comparing at least the received instance ID, received phase value, and received freshness value to the current instance ID, the current phase value, and the current freshness value respectively at a current node (act 1503). For example, the node having ID 144 can compare the previously received and stored instance ID, phase value [phase-sate value].[phase.unknown indication], and freshness value for the node having ID 174 to the instance ID, phase value [phase-sate value].[phase.unknown indication], and freshness value received in the liveness header.

The node having ID 144 can determine that current state information for the node having ID 174 (e.g., received from the node having ID 151) is stale based on (in order) the first instance ID being greater than the currently stored instance ID for the node having ID 174, based on first phase-state value being more advanced than the currently stored phase-state value for the node having ID 174, or based on the first freshness value being a value greater than the freshness value currently stored for the node having ID 174. The node having ID 144 can also determine that at least one phase.unkown indication (either currently stored or received in the liveness header) indicates that a phase-state was known at the time the phase-state was detected/transmitted.

Method 1500 includes an act of determining if state information for the participating node is to be updated at the current node based on the comparison (act 1504). For example, based on the comparison of values for the node having ID 174, the node having ID 144 can determine that state information for the node having ID 174 is to be updated. Updating outdated state information for the node having ID 174 can include replacing current stored values (e.g., for instance ID, phase-state value, phase.unknown indication, or freshness value) with values included in the liveness header. For example, the node having ID 144 can update state information for the node having ID 174 to indicate that the node having ID 174 has transitioned to a more advanced phase-state.

In some embodiments, it can be detected that communication with the participating node may have been lost. For example, the node having ID 144 can detect that communication with the node having ID 151 has been lost. Referring briefly to FIG. 17, in response to a prior subscription for liveness events 1701 (with an endpoint of the node having ID 151), application layer 1752 can send endpoint down event 1703 (with an endpoint of the node having ID 151) to function layer 1751. In these embodiments such detected liveness conditions can be indicated in liveness information with the Phase.Unknown indicator being set to true along with the last known Phase state value.

Method 1500 can further include an act of receiving a message that includes a second liveness header from a second different node in the federation infrastructure For example, the node having ID 144 can receive a status message (from the node having ID 103 or some other node of ring 1206) that includes a second liveness header. The second liveness header can include <the participating node ID, a second instance ID, a second phase value [phase-state value].[phase.unknown indication], a second freshness value, a second color (proximity) value, and a second weight value> for the node having ID 174. The second phase value (e.g., phase-state: [Inserting, Syncing, Routing, Operating], and phase.unknown indication) identifies the expressed/detected phase of the node having ID 174 at the time of the second freshness value.

Alternately, subsequent to receiving the first liveness header, the node having ID 144 can attempt to communicate directly with the node having ID 174. If communication is successful, the node having ID 174 can return a message (e.g., sync response) having the node ID and second instance ID in an addressing header and having a liveness header including <the second phase value, the second freshness value, the second color (proximity) value, and the second weight value>. If a failure is detected, the node having ID 144 generates an internal liveness state change (e.g. freshness=max, and phase.unknown indication=true) and processes the state change as if the state change were received from another node. Such a state change has highest freshness value.

Method 1500 can also include an act of comparing the second instance ID, the second phase value, and the second freshness value to the current instance ID, the current phase value, and the current freshness value respectively (act 1506). For example, after receiving a status message from the node having ID 103, the node having ID 144 can determine that current state information for the node having ID 151 is stale based on (in order) the second instance ID being greater than the first instance ID, the second phase being more advanced than the first phase value, or the second freshness value being greater than the first phase value.

Method 1500 can also includes an act of determining if state information for the participating node is to be updated based on the comparison. For example, based on the comparison of values for the node having ID 174, the node having ID 144 can determine that state information for the node having ID 174 is to be updated. Updating outdated state information for the node having ID 174 can include replacing current stored values (e.g., for instance ID, phase-state value, phase-.unknown indication, or freshness value) with values included in the second liveness header. For example, the node having ID 144 can update state information for the node having ID 174 to indicate that the node having ID 174 has transitioned to a more advanced phase-state.

In some embodiments, phase values are compared within the context of equal color values. As previously described, a node can participate in multiple proximity rings. Participation in multiple proximity rings can occur as a result of participation in a more specific ring implying participation in a more general ring (along a common spine). For example, referring back to FIG. 5, a node's participation in ring 532 also implies that the node is participating in rings 522, 511, and 501. Thus, a color for a more specific ring also represents all parent proximal rings. Also as previously described, participation in multiple proximity rings can occur when a node in one ring is aliased into one or more other rings (potentially along different spines). For example, still referring to FIG. 5, a node participating in ring 532 can be aliased into ring 531 (or even ring 541 that would imply participation in rings 531, 522, 511, and 501). Thus, a color for one ring (e.g., ring 531) can be viewed as a peer color (or proximity) of another ring (e.g., ring 532).

When a node participates in a plurality of proximity rings in an aliased fashion, there is some potential that phase values (e.g., phase-state values and/or phase.unknown indications) for the node will differ between different proximity rings. Thus, a node that receives state information for another node, identifies the corresponding proximity ring for the state information (color) before determining if current state information is to be updated for that node and color. For example, the node having ID 144 can identify the corresponding proximity ring for received state information corresponding to the node having ID 174 before comparing the received state information to current state information.

Identifying an appropriate proximity ring can include comparing a received color value to one or more current color values. When the received color value and a current color value are equal, other state information, such as, for example, a current instance ID, a current phase value, and a current freshness value, can be compared to corresponding received state information, such as, for example, a received instance ID, a received phase value, and a received freshness value. On the other hand, when the received color value and a current color value differ, further comparisons do not occur.

Equality between color values can result in a variety of ways. For example, equality between color values can result when a current color value and a received color value indicate the same proximity ring (e.g., ring 532). Further, equality between color values can result when a more specific color value is compared to a corresponding parent color value (e.g., another ring along the same spine). For example, comparing the color value for ring 532 to the color value for ring 511 (or ring 522 or 501) can result in equality. Thus, the child proximity is the parent proximity but is more specific.

Thus generally, currently operational nodes in a federation infrastructure can exchange expressed and detected liveness state information for other nodes even when communication with those other nodes appears to be lost.

Bootstrapping Mechanisms

Generally, in order for a node to become an active member of a federation (e.g., join), the node has to communicate with at least one other node that is already an active member of the leaf ring it intends to join. To help insure this initial form of communication is available, federations can utilize a bootstrapping mechanism. A bootstrapping mechanism can be used as a last resort when other types of communication fail to identify an active member of a leaf ring or security constraints require a newly joining node to initially communicate with at least one of a set of special nodes such as seed nodes. That is when other types of communication fail or because of security requirements, a bootstrapping mechanism can be used to identify an active member node of a leaf ring.

In some embodiments, seed nodes are used to bootstrap communication with a federation. Seed nodes provide well known points of entry for some types of cross (inter) proximity communication). Seed nodes help heal ring partitions due to infrastructure failure/recovery and general dynamism. Each ring can have at least one operational seed node in order to provide basic bootstrapping properties for a federation.

Peer seed nodes can communicate amongst themselves to maintain a ring structure (e.g., a doubly linked list) for a proximity that consists of at least all active seed nodes for that proximity. A dedicated seed node synchronization protocol can be used to provide each seed node with at least total knowledge of all other seed nodes' presence (active) state. An active seed node is a member node of the proximity leaf ring in which it is homed as well as all other ancestral rings of the leaf ring. Thus, a seed node can represent an entire spine of proximity rings, for example, from the seed node's leaf ring to the root ring. Accordingly, seed nodes can function as highly available and well known entry nodes in each of those proximity rings. As a result, presence state about seed nodes can be useful for various forms of communication (e.g., inter-proximal communication) within a federation. Accordingly, seed nodes can provide a number of special properties, such as, for example, acting as well known "join points" for joining nodes, acting as a secure ring authority, aiding in healing infrastructure partitions, and acting as a stable "entry node" for each of their proximities.

To provide presence data, a seed node's arrivals and orderly departures can be registered as a stable entry node at a rendezvous point in each of their proximities. For example, registration messages can be routed to a fixed URI whose destination ID is the SHA-1 hash of the string "Proximity:/". While in one embodiment seed nodes acting as stable entry nodes register themselves in this manner there are other embodiments where selected non-seed nodes may also register themselves in the same manner and with the same or similar protocols described here for seed node. When a stable entry node (such as a seed node) registers, the stable entry node can indicate each ring it is a member of. Thus, information maintained at the rendezvous point identified by this fixed URI is essentially a list of stable entry nodes and their corresponding ring memberships. Accordingly, any node can refer to the rendezvous point identified by this fixed URI to obtain a list of available stable entry nodes and their ring memberships.

In one embodiment the stable entry node directly registers these arrival and departure events. In another embodiment, the stable entry node registers these events directly at a rendezvous point within it's immediate proximity ring and that rendezvous point transparently facilitates (directly or indirectly) updating of all other appropriate rendezvous points in each of the remaining proximities rings to which the registering/unregistering stable entry node belongs. The application state sequencing and propagation properties of a federation can be used to maintain and propagate this stable entry node registration information. For example, a reliable-flooding protocol can be used to replicate saved application state among a node's Neighborhood nodes.

The promotion of stable entry node's presence data towards the root ring allows other nodes in a federation to look up at least one entry node in every proximity. Entry Node Lookup can be facilitated by routing a node lookup message towards the above determined rendezvous point in the Lowest Common Ancestor Ring ("LCAR") of the leaf ring of the node performing the lookup and the desired proximity ring. For example, referring to FIG. 5, a node in ring 541 may desire to communication with a node in ring 533. However, the node in ring 541 may have no direct knowledge of any node in ring 533. Thus, the node in ring 541 can send a Node Lookup Message to ring 522 (the LCAR of ring of ring 541 and ring 533). A rendezvous point node in ring 522 that processes entry node presence information (e.g. caused to exist in the system because of a registration message originated by that entry node) can return a Lookup Response Message with contact information for at least a registered stable entry node in ring 533.

In some embodiments, stable entry nodes are seed nodes configured specifically as stable entry nodes for maintaining presence data for various proximities. In other embodiments, other types of nodes can also function as stable entry nodes maintaining presence data for various proximities and may also be configured to perform other operations. For example, certain other types of nodes may be configured (e.g., by an administrator) as being highly available and thus suitable as a stable entry node (i.e. to be registered as described above). However, the other types of nodes may not include additional seed node functionality (e.g., may not be trusted as a security ring authority). In some embodiments, rendezvous points that maintain entry node presence state for their immediate proximity may register themselves as a stable entry node in the ancestral ring or rings.

Inter-Proximity Communication

Figure 5A:
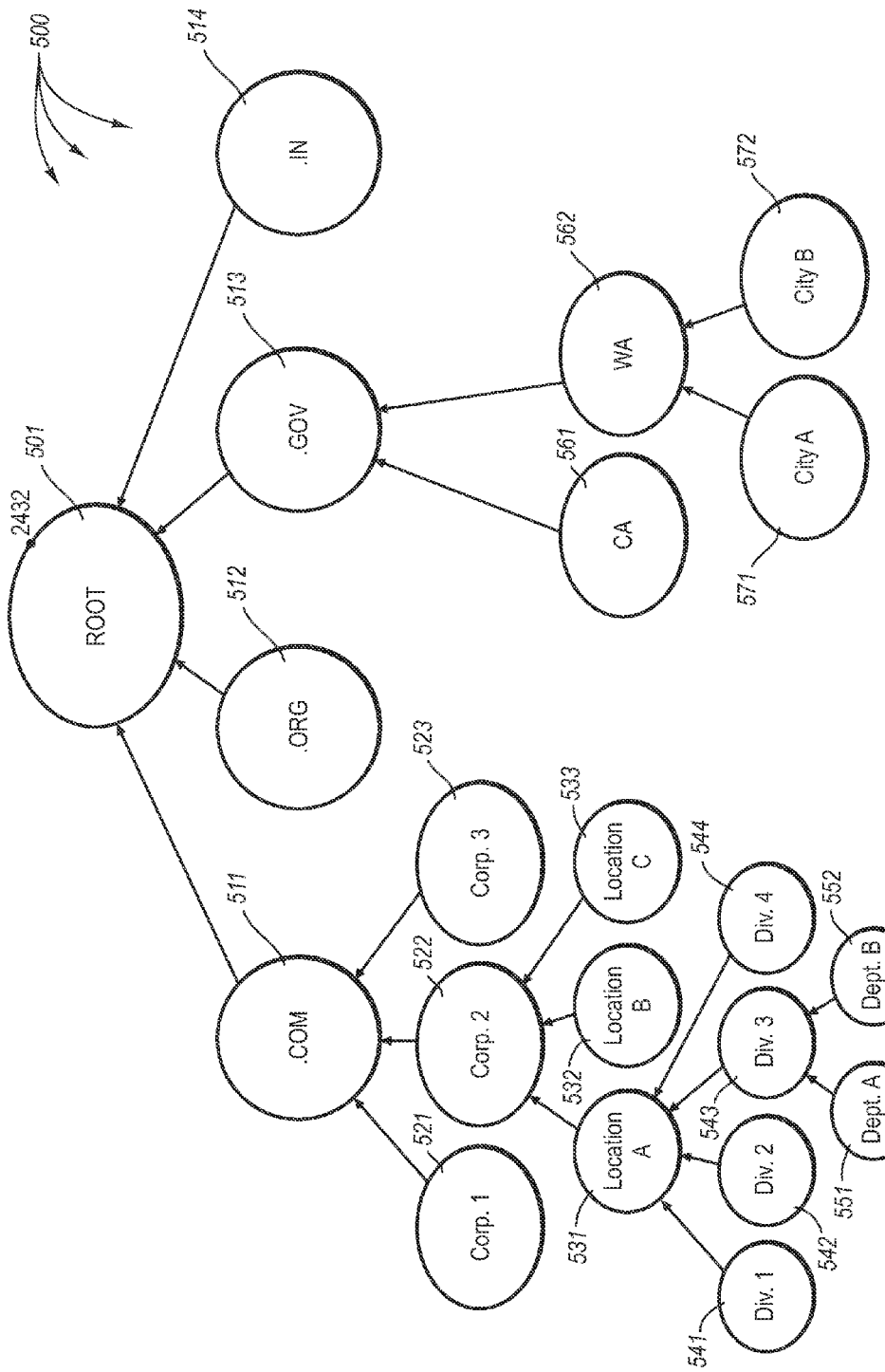
FIG. 5A illustrates the example proximity induced partition tree of rings of FIG. 5 with additional detail in portions of the partition tree of rings of FIG. 5.

Embodiments of the present invention can also facilitate inter-proximity communication, such as, for example, between nodes in different proximal branches of a tree of rings. Inter-proximity communication can be used to communicate to and/or between one or more, and potentially all, proximity rings in a proximally partitioned ring infrastructure. Referring now to FIG. 5A, FIG. 5A illustrates the example proximity induced partition tree 500 with additional levels of detail in portions of partition tree 500. Inter-proximity communication can occur between various nodes in FIG. 5A.

As depicted in FIG. 5A, partition tree of rings 500 addition includes various sub-rings under ring 513. Each of the additional sub-rings represents a partition of a sorted linked list. As previously described for FIG. 5, within partition tree 500, root ring 501 is partitioned into a plurality of sub-rings, including sub-rings 511, 512, 513, and 514, based on criterion 571 (a first administrative domain boundary criterion). Also as previously described for FIG. 5, sub-ring 511 can be further partitioned into a plurality of sub-rings, including sub-rings 521, 522, and 523, based on criterion 581 (a second administrative domain boundary criterion). Other sub-rings under sub-ring 522 are further portioned based on other criterion.

As previously described, within partition tree 500, each node has a single ID and participates in rings along a corresponding partition path (a spine) starting from the root to a leaf. For example, each node participating in sub-ring 552 would also participate in sub-rings 543, 531, 522, 511 and in root 501.

In FIG. 5A, sub-ring 513 can also be further partitioned into a plurality of sub-rings, including sub-rings 561 and 562 based on other criterion, such as, for example, state jurisdiction. Sub-ring 562 can be further portioned into a plurality of sub-rings, including sub-rings 571 and 572 based on other criterion, such as, for example, city jurisdiction. Accordingly, within FIG. 5A, inter-proximity communication can be used to send a message from a node of ring 541 to a node of ring 572, without requiring communication up a spine from ring 541 to root ring 501 and then back down from root ring 501 to ring 572.

Inter-proximity communication can be included as part of a communication pattern, such as, for example, broadcasting, multicasting, or any-casting, being implemented in a tree of rings. Broadcasting can include sending a message to all active nodes in a tree of rings. Multicasting can include sending a message to a group of nodes in a tree of rings. Any-casting can include sending a message to at least one node in a tree of rings.

Figure 19A:
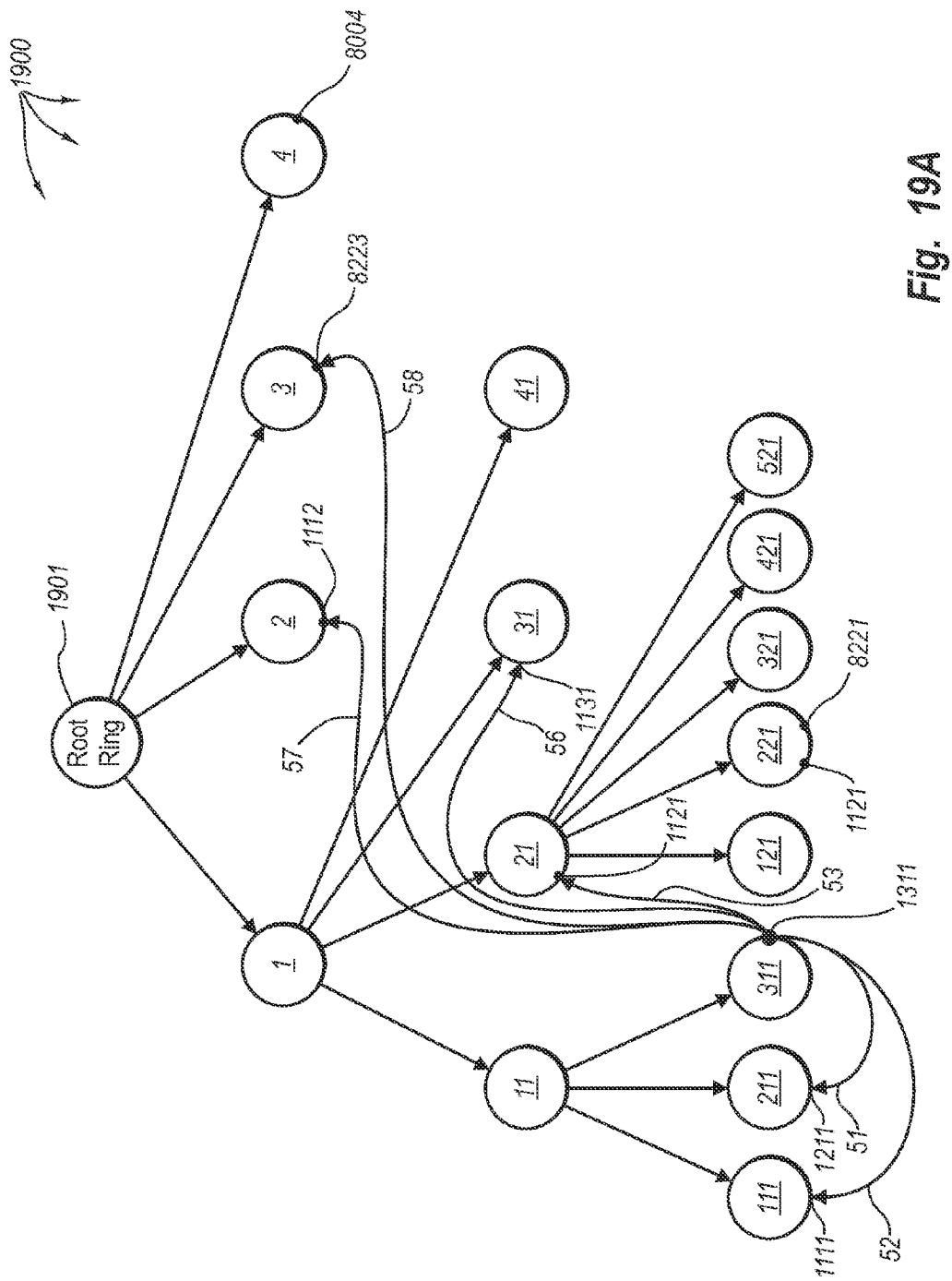
FIG. 19A illustrates an example proximity induced partition tree of rings that facilitates inter-proximity communication.

FIG. 19A illustrates an example proximity induced partition tree of rings 1900 that facilitates inter-proximity communication. Within partition tree of rings 1900, root ring 1901 is partitioned into a plurality of sub-rings, including sub-rings 1, 2, 3, and 4, based on selected criterion (e.g., a first administrative domain boundary criterion). Sub-ring 1 is further partitioned into sub-rings 11, 21, 31, and 41. Sub-ring 11 is further partitioned into sub-rings 111, 211, and 311. Sub-ring 21 is further partitioned into sub-rings 121, 221, 321, 421, and 521. Although not expressly depicted, other sub-rings, such as, for example, sub-rings 2, 3, 4, 31, and 41, can also be further partitioned.

The numbering convention of the rings in proximity induced partition tree of rings 1900 is configured such that any digits after the first digit indicate a ring's parent ring. For example, the "11" in ring "311" indicates that ring 11 is the parent ring of ring 311. Similarly, the "1" in ring "41" indicates that ring 1 is the parent ring of ring 41. Global ring 1901 is the parent ring for any rings numbered with a single digit, such as, for example, rings 1, 2, 3 and 4. Similar to proximity induced partition tree of rings 500 in FIG. 5A, partition tree of rings 1900 can be partitioned based upon various proximity criterion.

Within the description and following claims the annotation R["<number>"] is used to refer to a ring number. For example, R["11"] refers to ring 11. Within the description and following claims the annotation N[<number>] is used to refer to a node number. For example, N[1311] refers to node 1311.

To facilitate communication in a tree of rings, nodes can maintain an entry table that matches rings to corresponding entry nodes in those rings. As previously described, based on the configuration of partition tree of rings 1900 a parent ring contains all of the nodes from each of its child rings. For example, ring 11 contains all the nodes from R["111"], R["211"], and R["311"]. Thus, sending a message to ring 11 is sufficient to get the message to any node in ring R["111"], R["211"], and R["311"]. Accordingly, in some embodiments, a node's entry table can be reduced to entries for those rings that are relatively different from the perspective of the ring the node resides in. For example, N[1111] can simply maintain an entry for R["21"]-N[1121]—since maintaining entries for multiple child rings or R["21"] would be redundant.

Creation and Maintenance of Collateral Ring Sets

Within this description and in the following claims any peer ring of a specified ring is defined as a "collateral ring" of the specified ring. Within this description and in the following claims any peer ring of a specified ring's ancestor rings is also defined as a "collateral ring" of the specified ring. Any collateral ring of a specified ring is also collateral ring of all the nodes included in the specified ring.

Thus, for example, still referring to FIG. 19A, R["211"] is a collateral ring of R["111"] since R["211"] is a peer of R["111"]. R["211"] is also a collateral ring of any node included in R["111"], such as, for example N[1311]. Further, R["21"] is a collateral ring of R["111"] since R["21"] is a peer of R["11"] (i.e., an ancestor of R["111"]). R["21"] is also a collateral ring of any node included in R["111"], such as, for example N[1111].

Within this description and in the following claims a "collateral ring set" ("CRS") is defined as a set of one or more collateral rings from the perspective of a specified ring or nodes within a specified ring. For example, in FIG. 19A, a collateral ring set for R["221"], as well as any nodes in R["221"], such as, for example, N[8221], includes R["11"], R["121"], R["31"], R["41"], R["2"], R["3"], and R["4"].

Thus, to facilitate inter-proximity communication, a node can maintain a CRS entry table that includes one or more collateral rings and one or more corresponding entry nodes into the one or more collateral rings. A CRS entry table can be a data structure including one or more <collateral ring, 1 to N entry nodes> items, where N is some integer. For example, the data structure can be of the format <collateral ring_01, entry node_01, entry node_02, . . . >, where the ellipsis represents one or more additional entry nodes into collateral ring_01.

To create a CRS entry table, a node can make use of local knowledge, rendezvous protocol messages (e.g., ping messages, update messages, and update responses) used to propagate state in a tree of rings, application messages, and messages used to facilitate specified communication patterns (e.g., broadcasting, multicasting, and any-casting) in a tree of rings.

A node can use local knowledge, such as, for example, routing table information, from all levels of rings a node participates. For example, still referring to FIG. 19, N[1121] may be a neighbor of N[1311] in R["1"]. One collateral ring of N[1311] from the perspective of N[1121] is R["21"]. Accordingly, N[1311] can insert the pair(R["21"], N[1121]) (in this case an item having a single entry node) into N[1311]'s CRS entry table. By making use of this type of local knowledge, a node can insert entries into a CRS entry table Nodes can, in addition to specifically intended messages, propagate their CRS entry table information to other nodes in messages that are otherwise used for other purposes, such as, for example, to propagate neighborhood and routing partner state information. For example, nodes can include CRS entry table state in ping messages sent to neighborhood nodes and in update messages and update responses exchanged between routing partner nodes. Nodes that receive a CRS entry table state from another node can use the received CRS entry table state to augment and/or maintain their own CRS entry table.

For example, when a node exchanges Rendezvous Ping/Update messages with its neighbor/partner nodes (e.g., at a rendezvous protocol layer), the node can also exchange (at least part of and potentially all of) its CRS entry table (and use the CRS entry table state received from its neighbors/partners to update its own table. Suppose, for example, that N[1311] does not have prior knowledge of any node in R["3"] (within the context of or ring 1901). However, N[1311] does has a neighbor N[8221] (in R["1"]) and N[8221]'s CRS entry table has an entry (R["3"], N[8223]). At least because N[1311] and N[8221] are neighbors, N[1311] and N[8221] can, from time to time, send ping messages to one another. N[8221] can include (at least part of and potentially all of) its CRS entry table in ping messages that are sent to N[1311]. Thus, when N[1311] receives a ping message from N[8221], then ping message can include N[8221]'s CRS entry table. From N[8221]'s CRS entry table, N[1311] can identify the item <R["3"], N[8223], . . . > and include the item <R["3"], N[8223], . . . >) in its own CRS entry table. N[1311] can also identify other items for other rings in its CRS and include those other items in its own CRS entry table.

CRS entry table state can be similarly exchanged in update messages and update responses exchanged between routing partners in a ring. Also, any routing protocol message can use to learn (e.g., liveness information) about CRS entry nodes. Also, specific messages, intended to maintain CRS entry tables, can be used.

CRS entry table state can also be discovered in messages that facilitate specified communication patterns (e.g., broadcasting, multicasting, and any-casting) in a tree of rings. For example, to broadcast a message to every node in a tree of rings, a broadcasting algorithm may use various types of messages that are specific to broadcasting. Nodes that send these broadcast specific messages can include CRS entry table state within the broadcast specific messages. Similarly, when multicasting a message to every node in a group of nodes, a multicasting algorithm may use various types of messages that are specific to multicasting. Nodes that send these multicast specific messages can include CRS entry table state within the multicast specific messages. Likewise, when any-casting a message to at least one node, an any-casting algorithm may use various types of messages that are specific to any-casting. Nodes that send these any-cast specific messages can include CRS entry table state within the any-cast specific messages. Nodes that receive communication pattern specific messages can identify appropriate entries (e.g., <collateral ring, entry nodes> items) and include some or all the state from these entries in their own CRS entry table.

CRS state can also be discovered in application component messages that are exchange between applications. Referring briefly to FIG. 1, application layers 121, 122, and/or 123 may exchange application component messages that include CRS state. Upon receiving an application component message including CRS state, an application layer can transfer the CRS state down to corresponding other lower layers, such as, for example, to a rendezvous protocol layer, to augment existing CRS state.

CRS state can be application provided and/or hard wired, and is configurable by nodes within a tree of rings.

Referring back to FIG. 19A, if a node finds that it knows a plurality of entry nodes to the same ring, it may decide to retain two or more of the entry nodes for the ring. In some embodiments, the node randomly selects an entry node from among any retained entry nodes. In other embodiments, a policy is applied to aid in the selection of a specified entry node from among any retained entry nodes. A policy can indicate that the selected entry node is to be the same entry node each time. Alternately, a policy can indicate that the selected entry node is to be varied among any retained entry nodes. For example, in some embodiments, entry nodes are selected in a round-robin manner so that the load can be distributed evenly among any retained entry nodes.

Further, when multiple entry nodes are retained, a node can efficiently transition to a different entry node, for example, if a first selected entry node fails, is busy, or for some other reason is not available.

Alternately, a node may retain a single entry node for the ring.

From time to time a node may detect additional entry nodes for a ring. In some embodiments, when a node retains a single entry node or lacks memory to store additional entry nodes, the node can determine if a newly received entry node is to replace an existing entry node. In some embodiments, a node can use a function to compute the rank for each candidate entry node with the following parameters: the distance of the entry node, the freshness of the entry node information, and the weight of the entry node (e.g., configuration preference). An entry node with higher rank is retained.

A CRS entry table may or may not be complete. A complete CRS entry table includes at least one entry node for each ring in a node's CRS. For example, a complete CRS entry table for node 1311 would include at least one entry node into each of rings 111, 211, 21, 31, 41, 2, 3, and 4.

Utilizing the above mechanisms it may possible to construct complete CRS entry tables from the perspective of one or more rings and/or nodes in a proximal ring hierarchy. In some embodiments, it may be that routing table state information alone forms a complete CRS entry table for each node in the tree of rings. For example, routing table related information propagated (e.g., in ping messages, update request messages, and update response messages) in tree of rings 1900 may form a complete CRS entry table for every node in each of the depicted rings.

However, in other distributed networking environments the dynamic nature of the ring and/or delay in the exchange of entry table related state can hinder construction of a complete entry table. Put another way, in these other environments, there may be one or more rings from a ring's or node's collateral ring set that the node or ring is not aware of at any given time. For example, referring again to FIG. 19A, suppose N[8004] just joined, and prior to that there is no node belonging to R["4"], most nodes will not have an entry node for R["4"] until message traffic (e.g. the Ping/Update messages) or other activities cause distribution of that information across the entire ring infrastructure. Thus, maintaining a complete CRS entry table at a node is not always possible due to network dynamism (e.g., node failures, communication failures, communication delays, node additions, etc.). Accordingly, in many environments a node maintains a partial CRS entry table including entry nodes for less than all of the rings in the node's CRS.

Inter-Proximity Communication Using CRS Entry Table

A node can use information in a CRS entry table to send inter-proximity communication (e.g., without having to route a message to a LCAR of the sending ring and the destination ring). Still referring to FIG. 19A, based on appropriate entries in a CRS entry table, N[1311] (e.g., a publisher node) may be able to send inter-proximity communication directly to one or more of R["111"], R["211"], R["21"], R["31"], R["41"], R["2"], R["3"], and R["4"]. For example, at some point in time a CRS entry table for N[1311] may include the following entries:

R["2"]:N[1112]
R["3"]:N[8223]
R["21"]:N[1121]
R["31"]:N[1131]
R["111"]:N[1111]
R["211"]:N[1211].

These entries can be used for direct communication to R["111"], R["211"], R["21"], R["31"], R["2"], and R["3"]. For example, N[1311] can send communication 52 to R["111"], N[1311] can send communication 51 to R["211"], N[1311] can send communication 53 to R["21"] (N[1121] is a member of both R["21"] and R["221"]), N[1311] can send communication 56 to R["31"], N[1311] can send communication 57 to R["2"], and N[1311] can send communication 58 to R["3"]. Over time N["1311"] may identify entries (e.g., <collateral ring, entry node> items) for R["41"] and R["4"]. These entries can be identified from updated local knowledge, from CRS entry tables contained in rendezvous protocol messages (e.g., ping messages, update message, and update responses), through CRS entry table state contained in communication pattern specific messages, and through other mechanisms such as, for example, an application component.

Downward Routine Algorithm

Figure 19B:
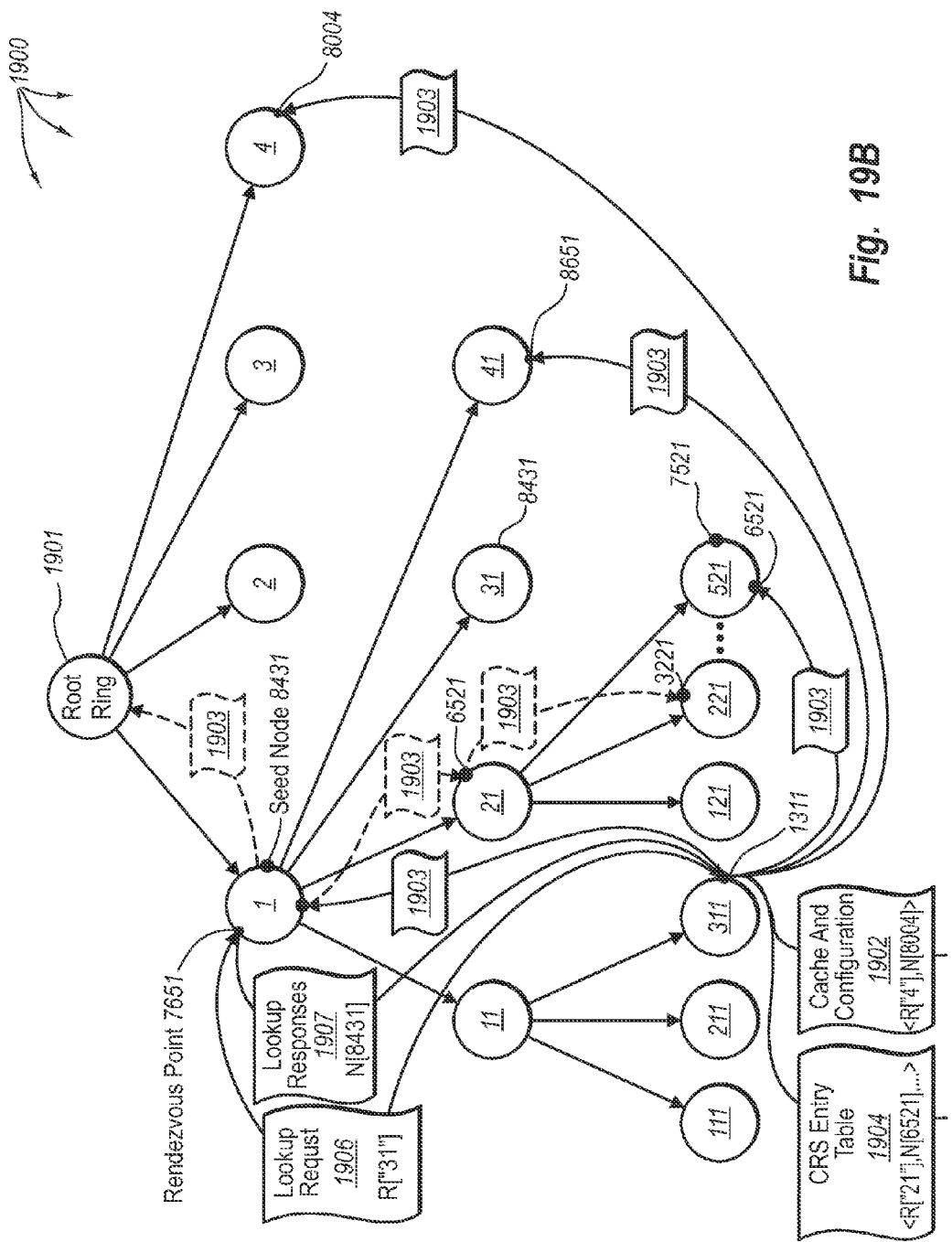
FIG. 19B illustrates another view of the example proximity induced partition tree of rings from FIG. 19A.

In a rendezvous federation (with or without CRS entry tables), it may be that a message is to be routed to the node closest to a given node ID within a specified proximity ring that is not an ancestor to (or in) the leaf ring where the message originated (hereinafter referred to as "downward routing"). One example of this is facilitating inter-proximity communication from a node in an originating ring to a collateral ring when the node in the originating ring is not aware of an entry node for the collateral ring. FIG. 19B illustrates another view of the example proximity induced partition tree of rings 1900. For example, referring now to FIG. 19B, it may be that N[1311] is to send communication destined to a node in R["4"] or R["41"].

Given a rendezvous federation, the following function can be defined:

RouteDown(M, P, ID): The federation is to deliver message M to the node closest to ID in the proximity P. Proximity P can be any proximity ring in the federation (leaf or intermediate) that is not an ancestor to (or in) the originating node's leaf ring.

In some embodiments, message M is never routed above nodes within the LCAR of the originating node's leaf ring and the target proximity ring P. For example, to implement downward routing from N[1311] to R["41"] there may be no need to route a message above R["1"] (the LCAR of R["311"] and R["41"]). However, in other embodiments, if appropriate a message can be routed above a LCAR.

The RouteDown(M, P, ID) function can include identifying an entry node known to be a member of the target proximity ring P. A sending node can identify an entry node in a target proximity ring using a variety of different mechanisms. A sending node can be an originating node (the first sending node). A sending node can also be an intermediate node that receives a message from the originating node or another intermediate node and then forwards the message.

A sending node can use local knowledge, such as, for example, configuration or locally cached information (e.g., in addition to a CRS entry table), to identify an entry node for a target proximity ring. For example, N[1311] may have access to cache and configuration 1902 that includes configuration or locally cached information about rings in tree of rings 1900. In some environments, local knowledge about a federation is obtained through communication mechanisms outside of the federation (i.e., out-of-band). Local knowledge can be used to identify any nodes in the exact target proximity ring P. If any nodes in the exact target proximity ring are found, message M can be forwarded to one of them. For example, N[1311] may be able to use cache and configuration 1902 to identify N[8004] and forward message 1903 to R["4"].

A sending node can use a CRS entry table to locate any entry nodes in the target proximity ring P. If any entry nodes the target proximity ring are found, message M can be forwarded to an entry node in the target proximity ring P. For example, when N[7521] is a destination for message 1903, N[1311] can identify N[6521] as an entry node for R["521"]. Accordingly, message 1903 can be routed to N[6521] (or into R["521"]). Within R["521"], N[6521] can then attempt to route message 1903 to N[7521] using intra-ring communication. Thus, if a sending node is able to identify an entry node for the target proximity ring, it forwards the message to the exact target proximity ring. For example, if N["6521"] is able to identify an entry node for R["21"] it forwards message 1903 on to R["21"] (dashed line).

On the other hand when sending node is unable to identify any entry nodes of the destination target proximity (e.g., from local knowledge or a CRS entry table), the sending node can check its CRS entry table to locate entry nodes for any ancestor rings to the target proximity ring. For example, it may be that N[1311] is attempting to send a message to a node in R["121"], however N[1311] may be unable to identify an entry node for R["121"]. Accordingly, N[1311] can refer to CRS entry table 1904 to locate N[6521] (an entry node into R["21"]). N[1311] can forward the message to N[6521], which now becomes the sending node for the message.

Logically, message 1903 can now be viewed as being "at" R["21"], since N[6521] is also a node of R[21]. N[6521] can then attempt to identify an entry node into R[221] (the target proximity). For example, N[6521] can refer to local knowledge, a CRS entry table, and/or can (recursively) apply the RouteDown algorithm. It may be that N[6521] identifies N[3221] as entry node into R[221]. Accordingly, N[6521] can send message 1903 to N[3221]. N[3321] can then route message 1903 to an appropriate node in R[221] using intra-ring communication When appropriate (e.g., in trees with more depth than shown in FIG. 19B), a message can be passed to ancestors that are closer and closer to the target proximity ring until an entry node into the target proximity ring is identified or no further ancestor rings are available.

A sending node can also route an Entry Node Lookup Request containing at least the request target proximity to an entry node directory mechanism, such as, for example, used for bootstrapping the federation. Routing of an Entry Node Lookup Request can be constrained to the LCAR of the sending node and the target ring. For example, N[1311] can route Look Up Request 1906 to rendezvous point 7651 to request entry nodes for R["31"]. An entry node directory mechanism can return a list of potential entry nodes. For example, rendezvous point 7651 can return a list of potential entry nodes (including N[8431]), and at least the seed nodes registered with that rendezvous point for the target proximity in look up response 1907.

The sending node considers any newly discovered nodes identified in a Lookup Response Message (sent from the rendezvous point) and forwards message M to one of those entry nodes. Considering newly discovered nodes can cause the CRS entry table, as well as other locally cached node presence knowledge, to be augmented and otherwise maintained. Lookup Response Messages may also contain other node presence information. For example, specific entry nodes known to be of importance to the sending node for possible inclusion in the CRS entry table of the sending node.

Thus, if one or more available mechanisms yield at least an entry node in the target proximity ring, the message M is sent (either by the original sending node, an entry node in an ancestor ring of the target proximity, or a looked up entry node) to at least one of those entry nodes in the target ring. The message M can include instructions for the entry node in the proximity target ring to route message M to ID. On the other hand, if none of the available mechanisms yield an entry node in the target proximity ring, the RouteDown request can be faulted back toward the original sending node.

In some embodiments, an originating node attaches an end-to-end RouteDown Message Header to the message, wherein the RouteDown Message Header specifies the target proximity URI.

If any of the above mechanisms identify multiple "next hop" nodes, a single node can be selected. When selecting a single node (e.g., breaking a tie), nodes that are closer to the target proximity P can be selected, then nodes with the higher weight can be selected, then the nodes that are closer to the destination ID of M can be selected. If no mechanisms result in a selection, a node can be then randomly selected. If a failed attempt to forward message M occurs when there are multiple candidates, forwarding can be re-attempted as long as there are non-faulted candidate nodes.

A reverse Status/Fault message path can be established as the application message passes from originator thru intermediaries to the final destination node. Once a message is delivered to the destination or a fault is detected, a corresponding fault/status message can be sent back toward the originator along this path.

Figure 19C:
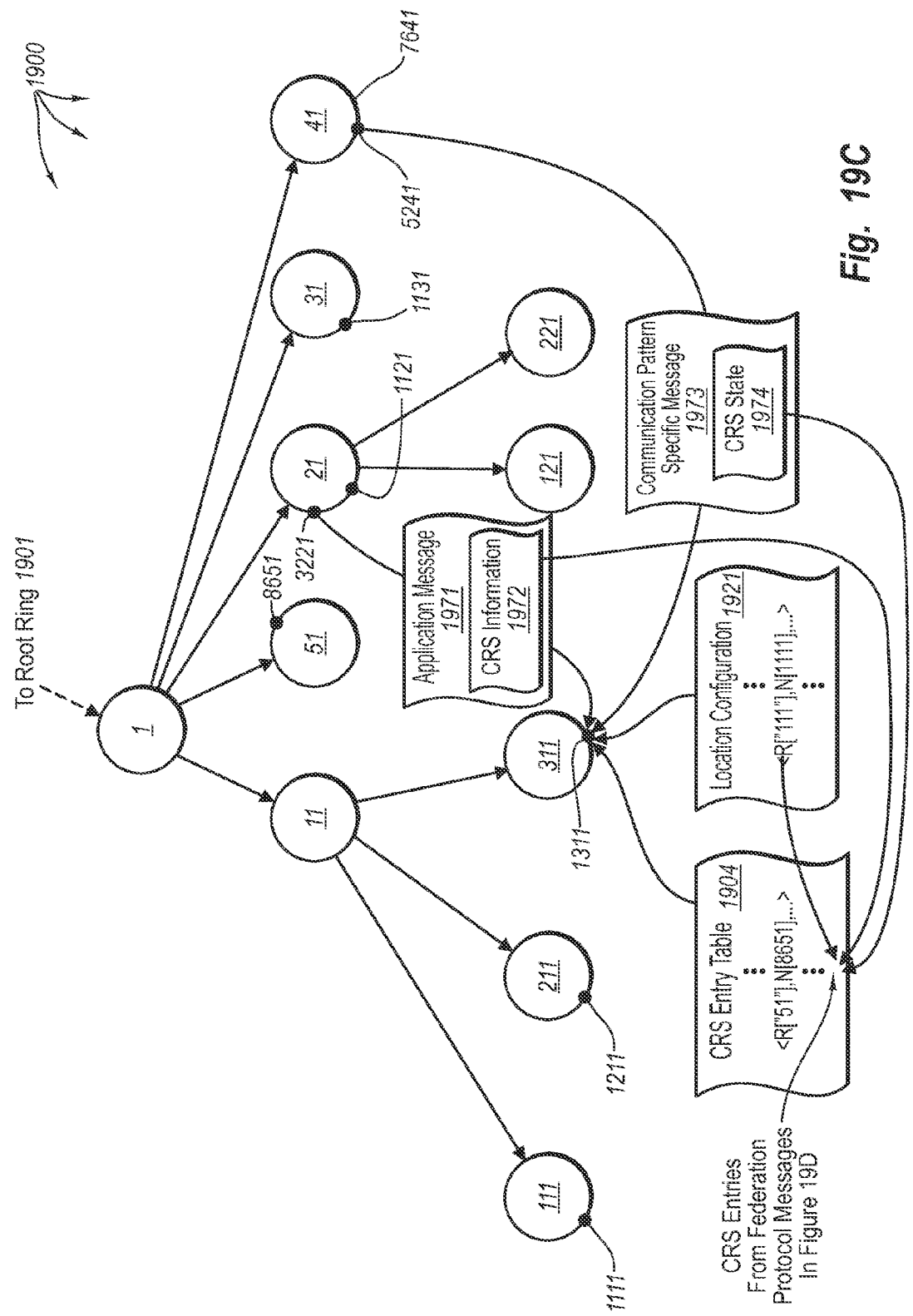
FIG. 19C illustrates a partitioned view of a portion of the example proximity induced partition tree of rings from FIG. 19A.
Figure 19D:
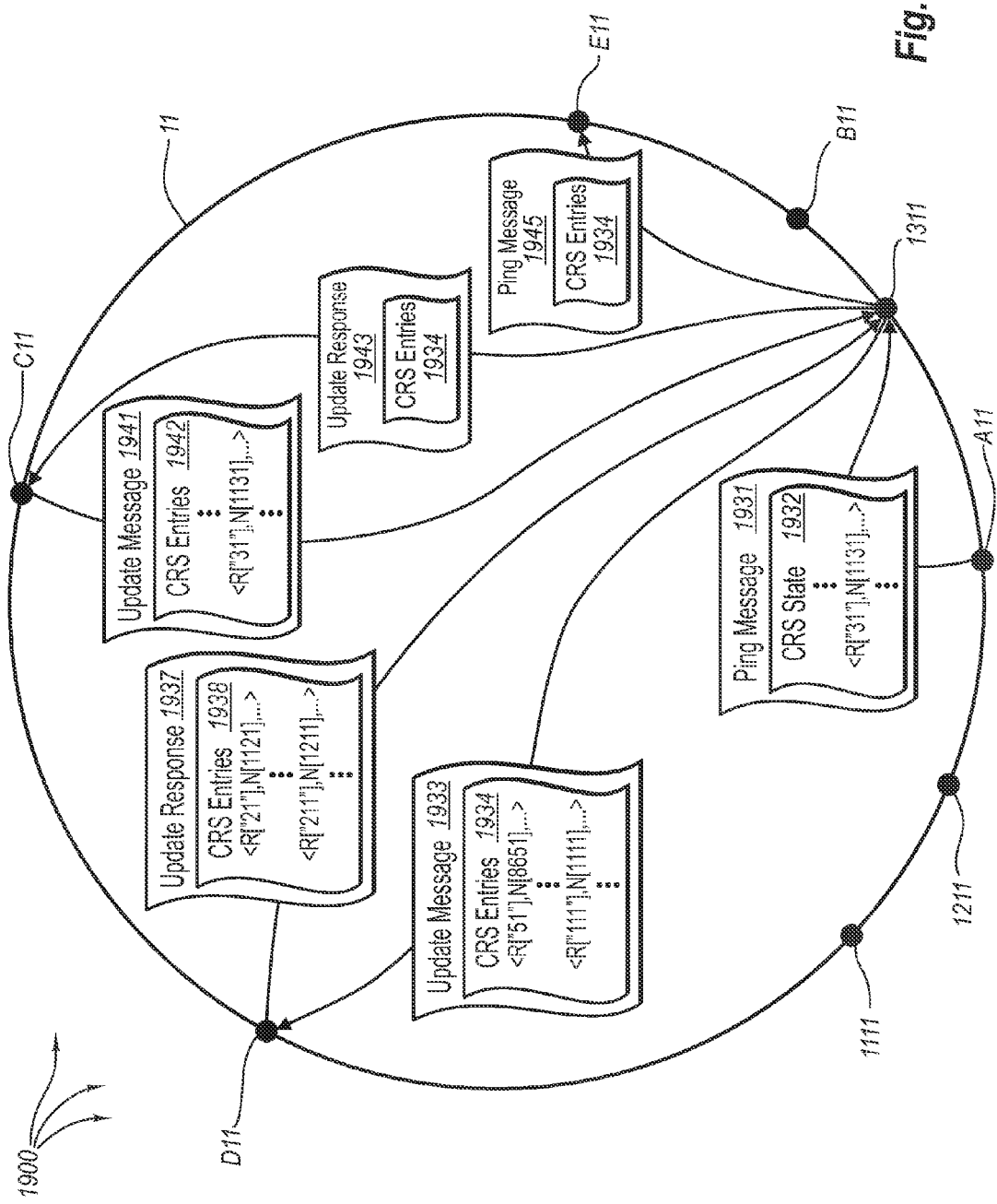
FIG. 19D illustrates an expanded view of an intermediate ring from the example proximity induced partition tree of rings from FIG. 19A.
Figure 20:
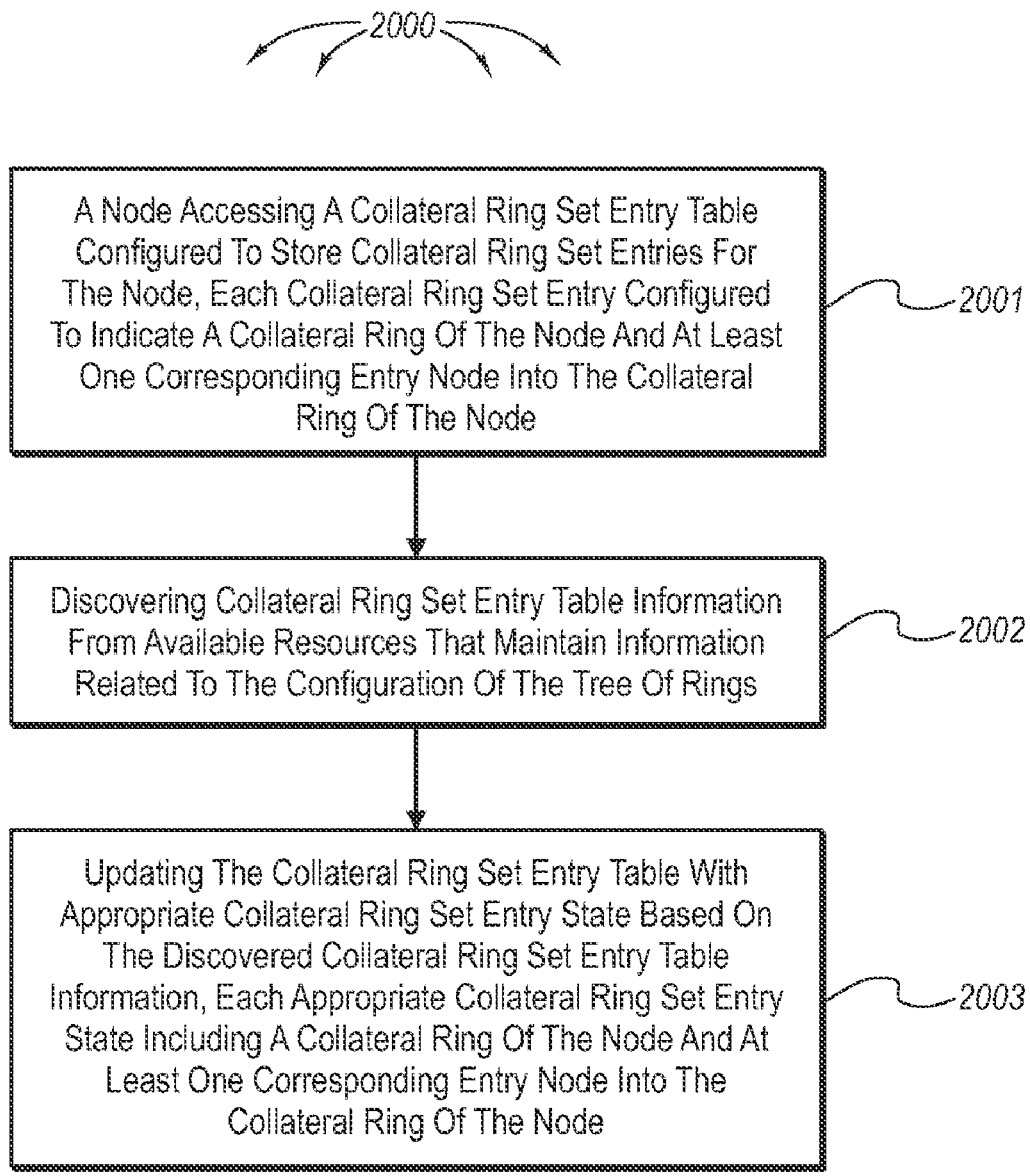
FIG. 20 illustrates an example flow chart of a method for maintaining a collateral ring set for a node in tree of rings.

FIG. 19C illustrates a partitioned view of a portion of the example proximity induced partition tree of rings 1900. FIG. 19D illustrates an expanded view of ring 11 from the example proximity induced partition tree of rings 1900. FIG. 20 illustrates an example flow chart of a method 2000 for maintaining a collateral ring set for a node in tree of rings. Method 2000 will be described with respect to the rings, nodes, messages, and data in FIGS. 19C and 19D.

Method 2000 includes an act of a node accessing a collateral ring set entry table configured to store collateral ring set entries for the node (act 2001). Each collateral ring set entry configured to indicate a collateral ring of the node and at least one corresponding entry node into the collateral ring of the node. For example, N[1311] can access CRS entry table 1904, which is configured to store collateral ring set entries, in the format <collateral ring, 1 to N entry nodes>, where N is some integer, for N[1311]. Thus, CRS entry table 1904 can include zero or more <collateral ring, entry node> items, each included item indicating a collateral ring of N[1311] and one or more corresponding entry nodes into that collateral ring. For example, as depicted in FIG. 19C, CRS entry table 1904 includes the CRS entry <R["51"], N[8651], . . . > indicative of N[8651] being one of the 1 to N entry nodes into R[51] (a collateral ring of N[1311] and R["311"]).

Method 2000 includes an act of discovering collateral ring set entry table information from available resources that maintain information related to the configuration of the tree of rings (act 2002). For example, N[1311] can discover collateral ring set entry table information form sources that maintain information related to the configuration of tree of rings 1900. As previously described, various different sources of CRS entry table information may be available to a node. For example, a node may have access to local knowledge, such as, for example local configuration and cache information, may access to CRS related state included in rendezvous protocol messages, such as, for example, ping messages, update messages, and update responses, used to propagate state in a tree of rings, may access CRS related state included in application messages, and may access CRS related state from messages used to facilitate specified communication patterns, such as, for example, broadcasting, multicasting, and any-casting, in a tree of rings.

Thus, in FIG. 19C, it may be that N[1311] accesses local configuration 1921. From local configuration 1921, N[1311] can discover CRS entry <R["111"], N[1111], . . . > indicative of N[1111] being at least one of the entry nodes into R["111"] (a collateral ring of N[1311] and R["311"]). N[1311] may also receive application message 1971. From application message 1971 N[1311] can discover CRS information 1972. CRS information 1972 may or may not contain CRS state for Rings in N[1311]'s CRS. N[1311] may also receive communication pattern specific message 1973. From communication pattern specific message 1973 N[1311] can discover CRS state 1974. CRS state 1974 may or may not contain CRS state for Rings in N[1311]'s CRS.

Referring now to FIG. 19D, N[1311] can discover and exchange CRS state in rendezvous protocol messages. Since N[1111] is a member of R["111"], N[1211] is a member of R["211"], and N[1311] is a member of R["311"], each of the nodes N[1111], N[1211], N[1311] are also members of R["11"]. As previously described, nodes that are members of a common ring can exchange ping messages, update messages, and update responses to maintain routing table information. Thus, the nodes of R["11"] can exchange ping messages, update messages, and update responses to maintain routing table information for R["11"]. CRS state can be included in exchanged ping messages, update messages, and update response, as well as other rendezvous protocol and application message traffic between nodes.

For example, N[A11] (a neighbor of N[1311] in R["11"]) can send ping message 1931, including CRS state 1932, to N[1311]. From CRS state 1932, N[1311] can discover CRS entry <R["31"], N[1131]> indicative of N[1131] being an entry node into R["31"] (a collateral ring of N[1311] and R["311"]). CRS entries 1932 can be a complete or partial list of the CRS entries in N[A11]'s CRS entry table. N[1311] can also send ping messages including CRS state to its neighbors. For example, N[1311] can send ping message 1945, including CRS state 1934, to N[E11] (a neighbor of N[1311] in R["11"]). CRS entries 1934 can include a complete or partial list of CRS entries from CRS entry table 1904.

N[1311] can also send and receive update messages and update responses that include CRS related information. For example, N[1311] can send update message 1933, including CRS entries 1934, to N[D11] (a routing partner of N[1311] in R["11"]). N[D11] can respond by sending update response 1937, including CRS entries 1938, to N[1331]. CRS entries 1938 can be a complete or partial list of the CRS entries in N[D11]'s CRS entry table. Similarly, N[1311] can receive update message 1941, including CRS entries 1942, from N[C11] (a routing partner of N[1311] in R["11"]). CRS entries 1942 can be a complete or partial list of the CRS entries in N[C11]'s CRS entry table. N[1331] can respond by sending update response 1943, including CRS entries 1934, to N["C11"].

A node can also receive collateral ring set entry table related information from available resources indicating (directly or indirectly) that a CRS entry may no longer be valid, for example, an indication that an entry node can not be contacted. Any resource used to send CRS related state can also be used to send an indication that can be interpreted to mean that a CRS entry may no longer be valid. Thus, it may be that, from time to time, a node receives CRS related state that causes one or more CRS entries to be added to its CRS entry table as well indications that may cause removal of one or more CRS entries that may no longer appropriate.

Method 2000 includes an act of updating the collateral ring set entry table with appropriate collateral ring set entry state based on the discovered collateral ring set entry table information (act 2003). Each appropriate collateral ring set entry state including a collateral ring of the node and at least one corresponding entry node into the collateral ring of the node.

For example, N[1311] can include any CRS entries received in FIGS. 19C and 19D into CRS entry table 1904. N[1311] can also remove any CRS entries from CRS entry table 1904 that are indicated (e.g., in configuration, rendezvous protocol messages, applications messages, or communication pattern specific messages) as potentially no longer being appropriate. Accordingly, a node's CRS entry table can be updated to appropriately reflect the changing structure of a rendezvous federation.

Figure 19E:
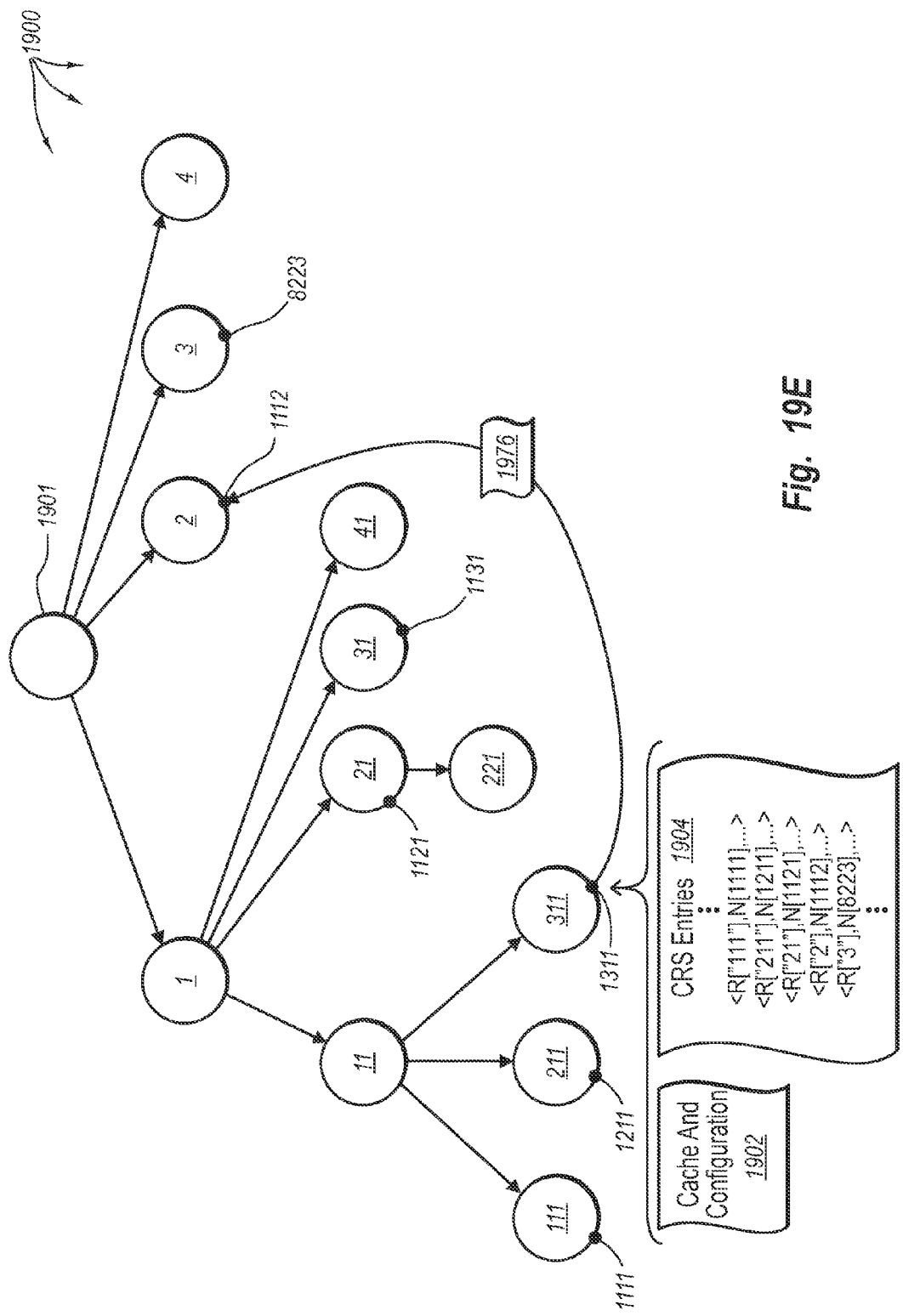
FIG. 19E illustrates yet another view of the example proximity induced partition tree of rings from FIG. 19A.
Figure 19F:
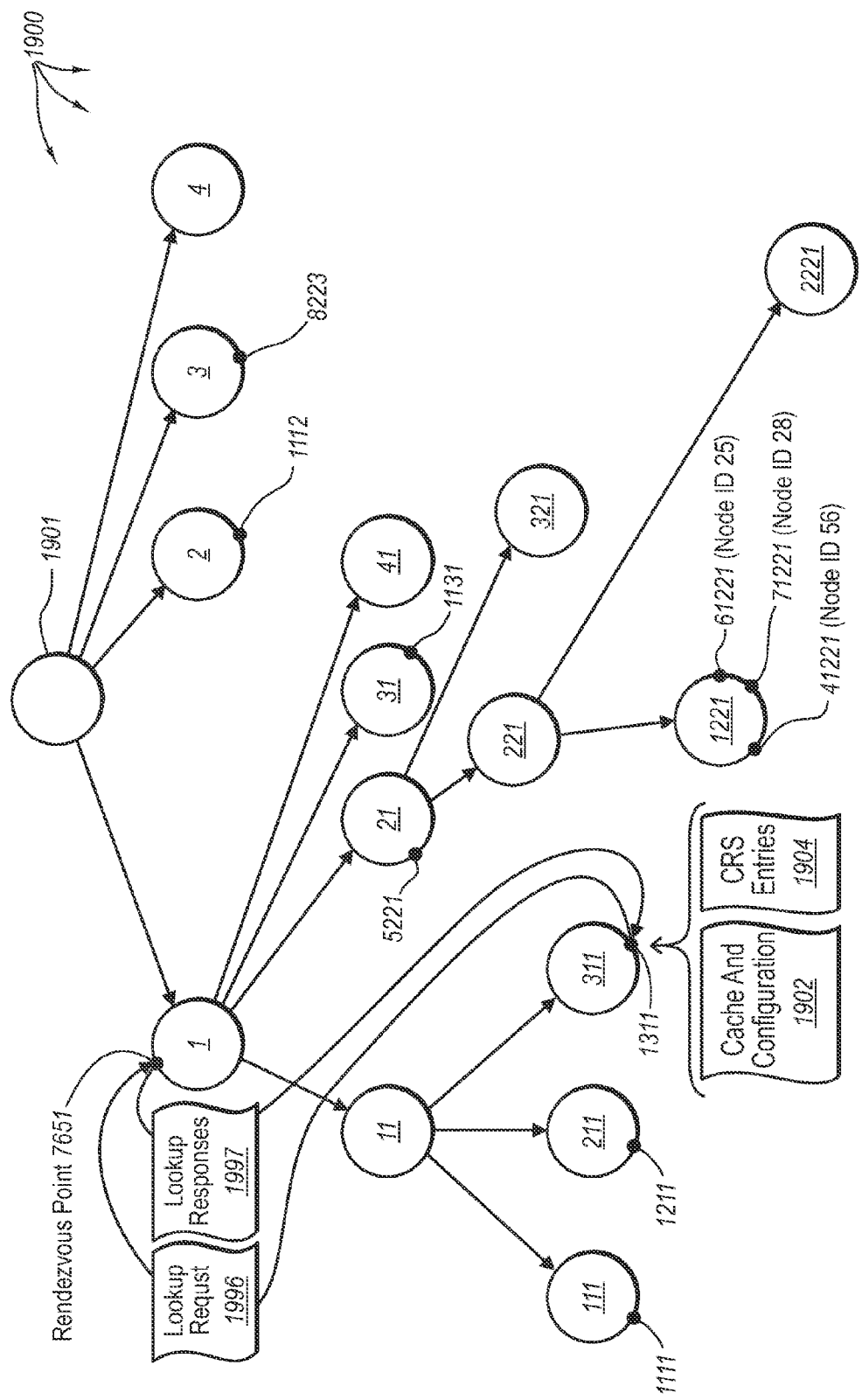
FIG. 19F illustrates a further view of the example proximity induced partition tree of rings from FIG. 19A.
Figure 21:
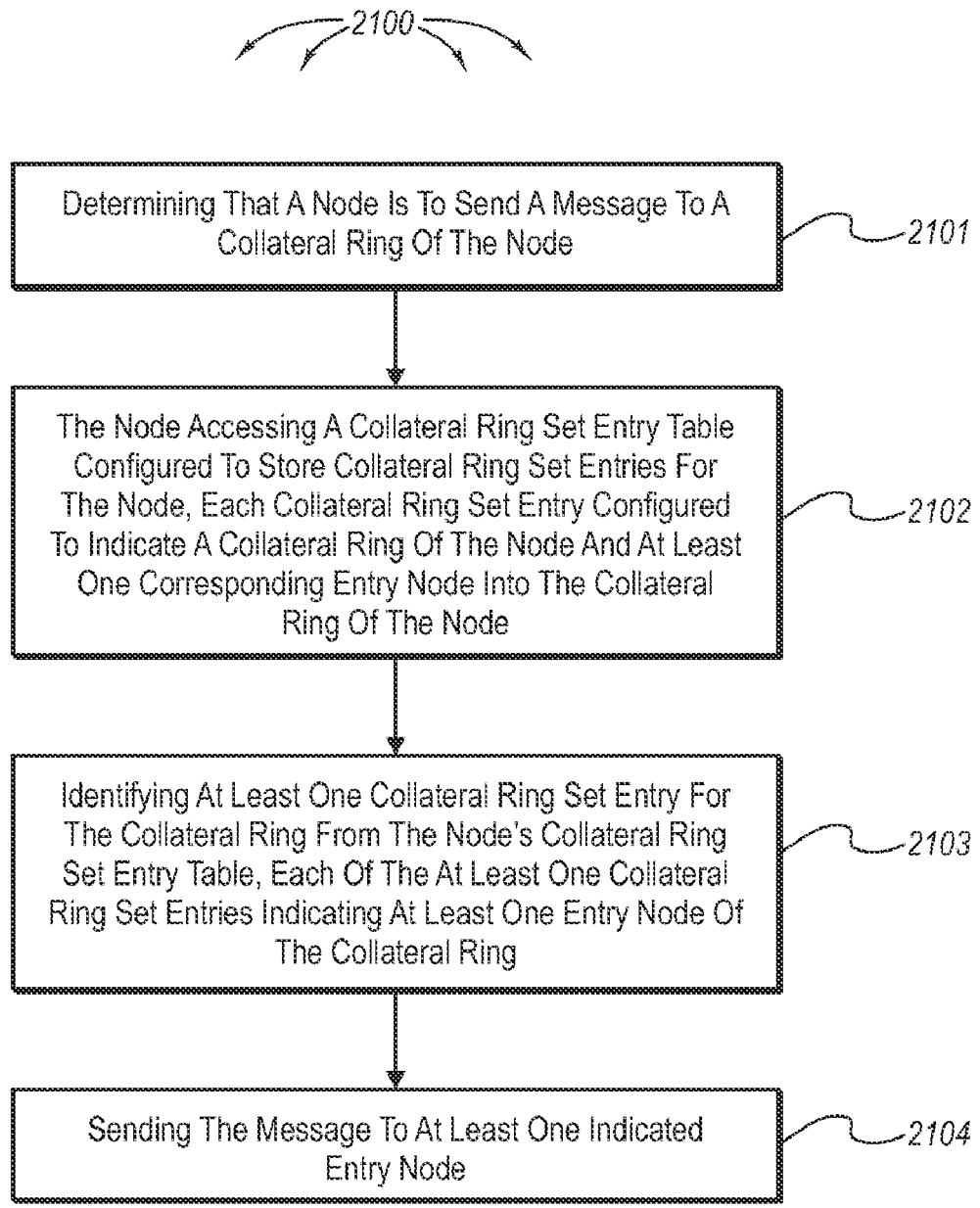
FIG. 21 illustrates an example flow chart for a method for sending inter-proximity communication in a tree of rings.

FIG. 19E illustrates yet another view of the example proximity induced partition tree of rings 1900. Depicted in FIG. 19E is CRS entry Table 1904, which may have been populated, based on CRS state exchanged in FIGS. 19C and 19D. FIG. 21 illustrates an example flow chart of a method 2100 for sending inter-proximity communication in a tree of rings. The method 2100 will be described with respect to the nodes, rings, messages, and data in FIG. 19F.

Method 2100 includes an act of determining that a node is to send a message to a collateral ring of the node (act 2101). For example, N[1311] can receive an indication that it is to send a message 1976 to R["2"]. An indication that a message is to be sent to collateral ring can be received from another node, be implied as a function of routing logic, an application at N[1311], a multicasting facility, a broadcasting facility, an any-casting facility, etc.

Method 2100 includes an act of the node accessing a collateral ring set entry table configured to store collateral ring set entries for the node (act 2102). Each collateral ring set entry configured to indicate a collateral ring of the node and at least one corresponding entry node into the collateral ring of the node. For example, N[1311] can access CRS entry table 1904. Each CRS entry in CRS entry table 1904 can indicate a collateral ring of N[1311] and at least one corresponding entry node into the collateral ring of N[1311]. For example, the entry <R["111"], N[1111], . . . > indicates that R["111"] is a collateral ring of N[1311] and N[1111] is one of the at least one entry nodes into R["111"].

Method 2100 includes an act of identifying at least one collateral ring set entry for the collateral ring from the node's collateral ring set entry table (act 2103). Each of the at least one collateral ring set entries indicating at least one entry node of the collateral ring. For example, N[1311] can identify the entry <R["2"], N[1112], . . . > for R["2"] from CRS entry table 1094. The entry <R["2"], N[1112], . . . > indicates that N[1112] (and potentially other nodes) is an entry node for R["2"].

Based on the number of corresponding entry nodes included in an identified collateral ring set entry (e.g., when there are two or more entry nodes), method 2100 may also include an act of resolving from a plurality of entry nodes for a collateral ring to an appropriate subset of entry nodes and potentially to a single appropriate entry node. For example, a subset of appropriate entry nodes can be resolved based on closeness between originating and target proximity P, based on node weight can be selected, based on closeness to a destination ID, or can be selected randomly.

Method 2100 includes an act of sending the message to at least one indicated entry node (act 2104). For example, N[1311] can send message 1976 to N[1112]. Sending a message to at least one node can include sending a message to all entry nodes in a plurality of nodes, to each entry node in a resolved appropriate subset of entry nodes, or to a single appropriate entry node. In some embodiments, when a message failure occurs to one entry node, one or more other entry nodes can be tried. It is also possible for a sending node to identify new nodes as a result of a failure.

Figure 22:
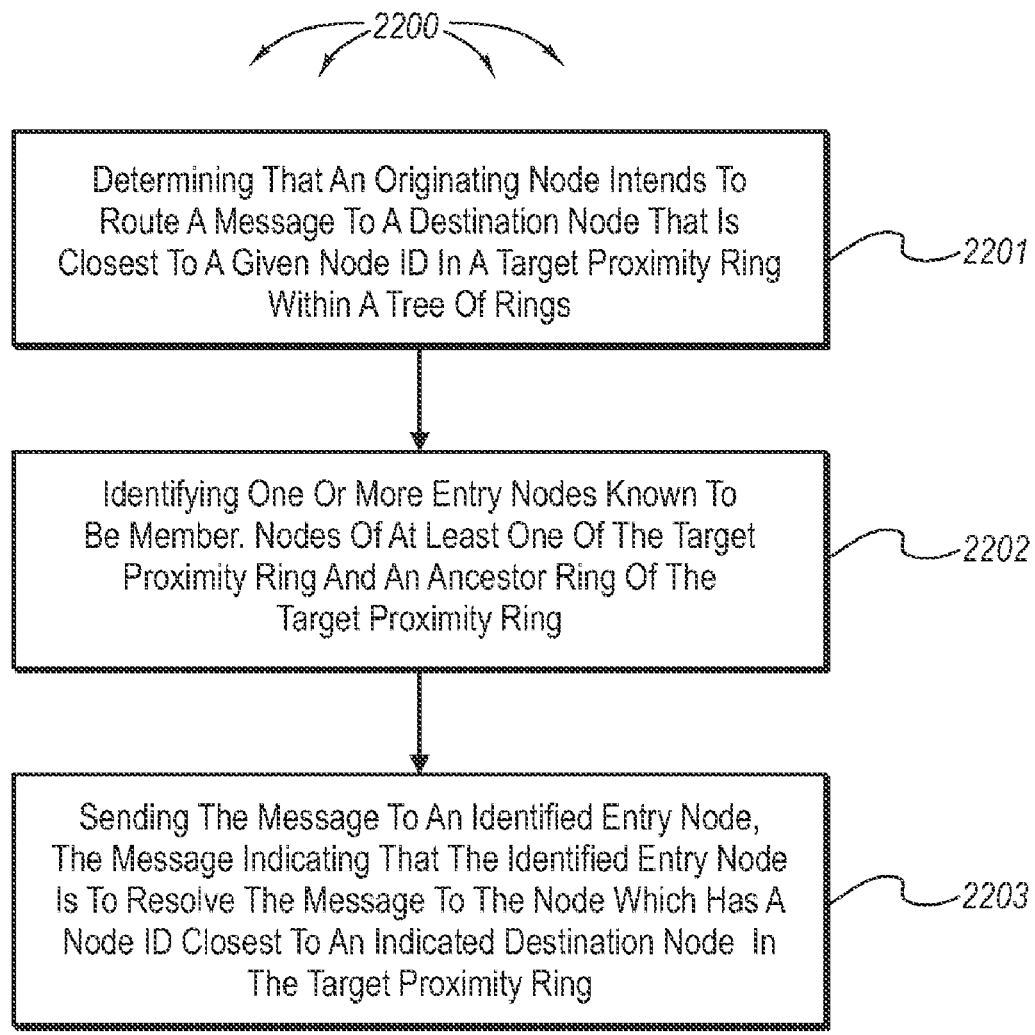
FIG. 22 illustrates an example flow chart for another method for sending inter-proximity communication in a tree of rings.

FIG. 22 illustrates an example flow chart for a method 2200 for sending inter-proximity communication in a tree of rings. The method 2200 will be described with respect to the nodes, rings, messages, and data in FIGS. 19F and 19G.

The method 2200 includes an act of determining that an originating node intends to route a message to a destination node that is closest to a given node ID in a target proximity ring within a tree of rings (act 2201). The target proximity ring can be a collateral ring of the originating node or a sub-ring of a collateral ring of the originating node. For example, N[1311] can receive an indication that it is to route a message 1998 into R["1221"] (the target proximity ring) towards the ID 30. An indication that a message is to be sent to collateral ring or a sub-ring of a collateral ring can be received from another node, an application related to N[1311], a multicasting facility, a broadcasting facility, an any-casting facility, etc.

Method 2200 includes an act of identifying a one or more entry nodes known to be member nodes of at least one of the target proximity ring and an ancestor ring of the target proximity ring (act 2202). For example, N[1311] can identify N[41221], having node ID 56, as an entry node into R["1221"]. A variety of different mechanisms can be used to identify N[41221]. N[1311] can refer to local knowledge to attempt to identify an entry node into the proximity target ring. For example, N[1311] can refer to cache and configuration 1902 to attempt to identify an entry node into R["1221"].

N[1311] can also refer to a CRS entry table to identify entry nodes into ancestor rings of the proximity target ring (e.g., when an entry node into the target proximity ring is not identified). It may be that sub-ring R["321"] contributes node N[4321] as an entry node into R["21"]. Likewise, it may be that R["2221"] contributes node N[12221] as an entry node into R["221"]. When an entry node into R[1221] is not identified, N[1311] can attempt to identify an entry node into R["221"], such as, for example, N[12221]. N[1331] may also attempt to identify an entry node into R["21"], such as, for example, N[4321].

It may be that a node attempts to identify entry nodes in closer ancestor rings before attempting to identify entry nodes in further ancestors from the perspective of a specified target proximity, when an entry node into the target proximity is not identified. For example, when an entry node into R["1221"] is not identified, N[1311] may first attempt to identify an entry node in R["221"]. If an entry node into R["221"] is not identified, N[1311] may then attempt to identify an entry node in R["21"].

N[1311] can also utilize bootstrapping mechanisms, such as, for example, seed nodes. For example, N[1311] can route an entry node lookup request to a known rendezvous point, such as, for example, rendezvous point N[7651], requesting known (registered) entry nodes (seed nodes being an example). In response to a lookup request, a rendezvous point can return (send) a lookup response message including any known entry nodes. For example, lookup response 1997 can be returned from rendezvous point N[7651] to N[1311]. Lookup response 1997 can include locations of any entry nodes registered with rendezvous point N[7651].

One or more of these mechanisms may identify N[4221] as an entry node into R["221"].

In some embodiments, some entry node identification mechanisms for are utilized before other entry node identification mechanisms. For example, a sending node may refer to local knowledge before attempting to identify entry nodes into ancestor rings of the target ring or routing an entry node lookup request. In these same embodiments, a sending node may also attempt to identify entry nodes into ancestor rings of the target ring before routing entry node lookup request. However, in other embodiments, entry node identification mechanisms can be utilized in a different order or omitted.

Method 2200 includes an act of sending the message to the identified entry node (act 2203). The message indicating that the entry node is to resolve the message to the node which has a node ID closest to the indicated destination node in the target proximity ring. For example, as indicated by the solid line, N[1311] can send message 1998 to N[41221] (an entry node into R["1221"] and having Node ID 56) with an indication that the message is to be resolved to node ID 30. N[41221] can access its routing table and/or neighborhood to determine the closest node ID to node ID 30 that it is aware of is N[61221] having node ID 25. Likewise, N [61221] can access its routing table and/or neighborhood to determine the closest node ID to node ID 30 that it is aware of is N[71221] having node ID 28. N[71221] can refer to its table and/or neighborhood to determine that its node ID, node ID 28, is the closet known node ID to node ID 30 and deliver the message.

Previously described routing algorithms can be also be used to route message 1998 within R["221"].

When a message is sent to an identified entry node that is a member of an ancestor ring or the target proximity ring, method 2200 can be recursively applied at the identified entry node. That is, the identified entry node into the ancestor ring can in turn attempt to identify an entry node into the target proximity ring. For example, as indicated by the dotted lines, it may be that an application of method 2200 causes message 1998 to be sent to entry node N[12221] (an entry node for R["221"] that is contributed by sub-ring R["2221"]). N[12221] (from the perspective of R["2221"]) can then identify an entry node into R["1221"]. Thus, a recursive application of method 2200 at N[12221] can cause message 1998 to be sent to N[41221].

If an identified entry node in the ancestor ring is not aware of an entry node into the target proximity ring, the identified entry node can attempt to identify an entry node into another ancestor ring that is closer to the target proximity. The entry node into the ancestor ring can then forward the message to the entry node of the closer ancestor ring of the target proximity ring.

For example, as indicated by the dashed lines, it may be that an application of method 2200 causes message 1998 to be sent to entry node N[4321] (an entry node for R["21"] that is contributed by sub-ring R["321"]). However, N[4321] (from the perspective of R["321"]) may be unable to identify an entry node in R["1221"]. Thus, N[4321] (from the perspective of R["321"]) may identify an entry node in R["221"]. Accordingly, a first recursive application of method 2200 at N[4321] can cause message 1998 to be sent to N[12221]. A second recursive application of method 2200 at N[12221] can then cause message 1998 to be sent to N[41221].

However, if N[4321] did identify an entry node into R["1221"] it could send message 1998 directly to the entry node. Thus, an entry node into an ancestor ring can forward a message to the target proximity ring or an entry node of a closer ancestor ring of the target proximity ring (which is typically in the CRS of the forwarding entry node) as appropriate. As described, the entry node into the closer ancestor ring can then forward the message to the target proximity ring or yet a closer ancestor ring of the target proximity ring (which is typically in the CRS of the forwarding "yet closer" entry node) as appropriate. This process can repeat (e.g., through recursively application of method 2200) until the target proximity ring entry node is reached.

When the target proximity ring is reached, previously described routing algorithms can be used to route the message within the target proximity ring.

Intra-Ring Broadcasting

Figure 23:
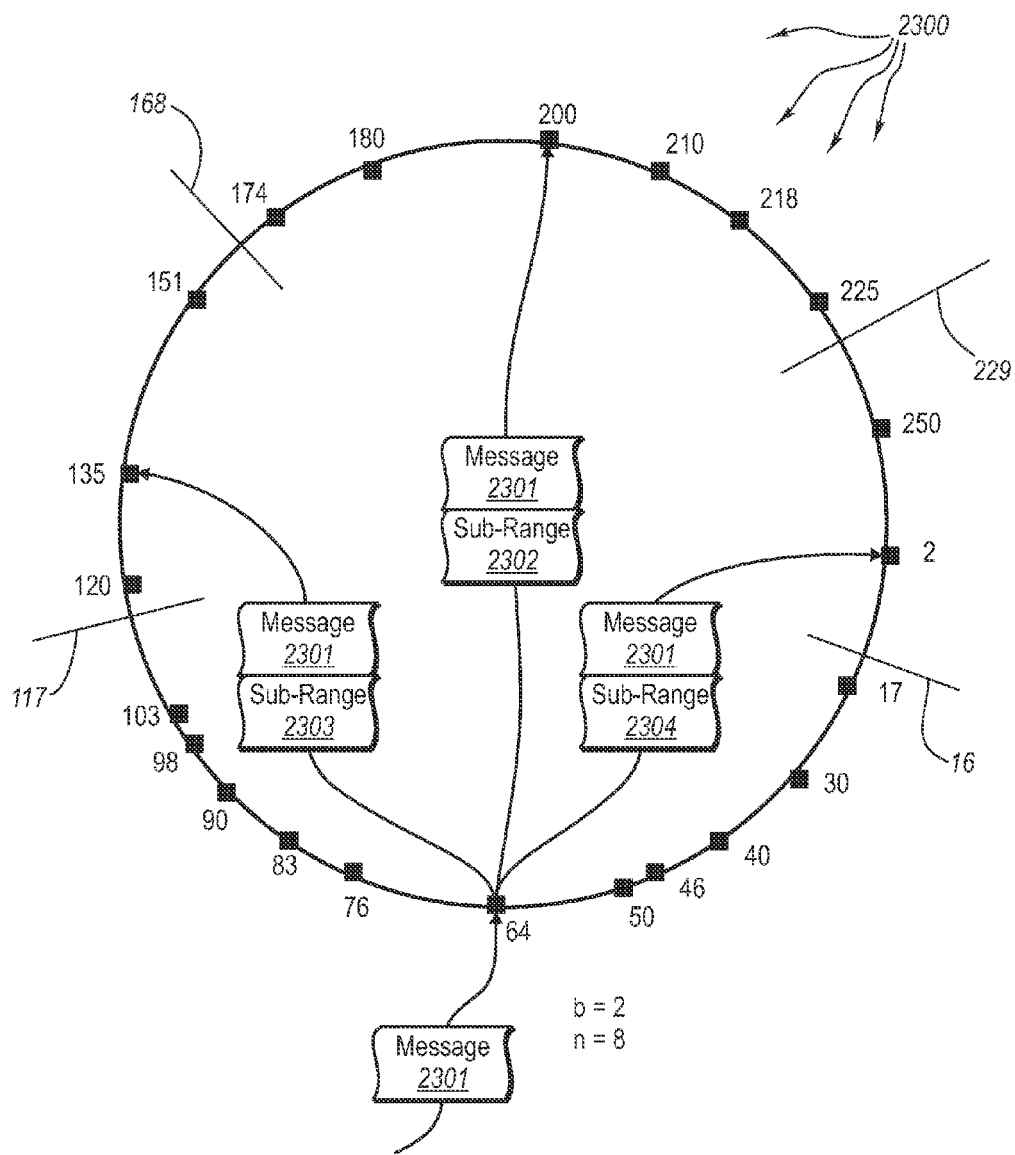
FIG. 23 illustrates an example ring that facilitates intra-ring broadcasting of a message.

In some embodiments, a message is sent to all the nodes in a ring. For example, a message can be broadcast within a ring (intra-ring broadcasting) to all the nodes in the ring. FIG. 23 illustrates an example ring 2300 that facilitates intra-ring broadcasting of a message. Generally, ring 2300 is configured similarly to ring 306 (in FIG. 3).

Figure 24:
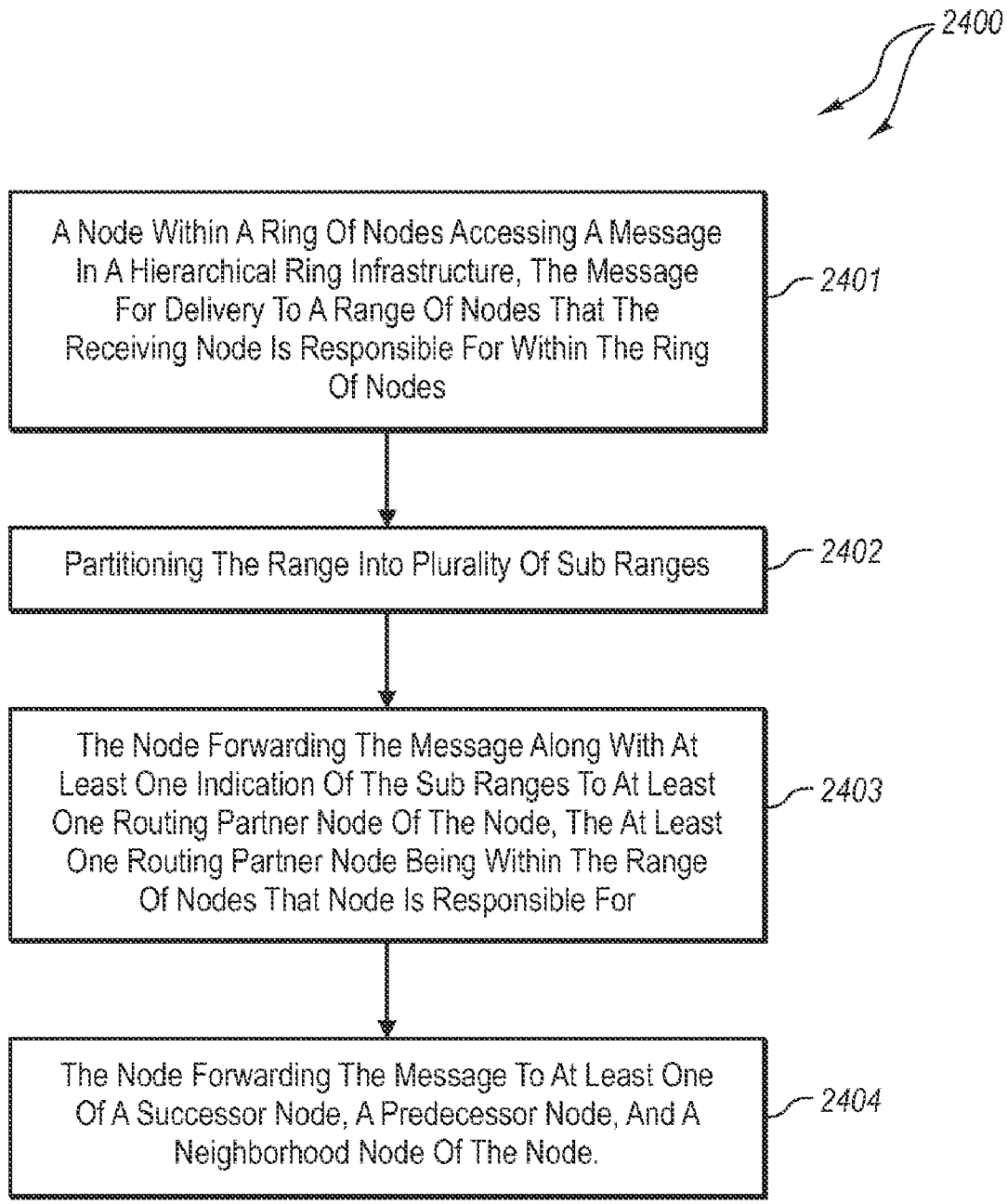
FIG. 24 illustrates an example flow chart of a method for broadcasting a message within a ring.

FIG. 24 illustrates an example method 2400 for broadcasting a message within a ring. The method 2400 will be described with respect to the nodes of ring 2300.

Method 2400 includes an act of a node within a ring of nodes accessing a message in a hierarchical ring infrastructure, the message for delivery to a range of nodes that the receiving node is responsible for within the ring of nodes (act 2401). For example, the node having ID 64 can receive message 2301 from a node in some other ring (as will be described in further detail below). Alternately, message 2301 can originate at the node having ID 64 or be proxied by the node having ID 64 for any other sender. Upon accessing message 2301, the node having ID 64 can determine that the message is for delivery to other (and potentially all) nodes of ring 2300.

The node having ID 64 can also determine the range of nodes it is responsible for is all of the nodes of ring 2300 (the range of IDs from 0-255). The determination that it is responsible for all the nodes of ring 2300 can result from node having ID 64 detecting that it is the first node of ring 2300 to access message 2301. Alternately, the node having ID node 64 can be configured as an entry node for ring 2300. Thus, some messages sent to ring 2300 can enter ring 2300 though the node have ID 64.

In other embodiments, a node can determine that it is responsible for less than all of the nodes in a ring. In these other embodiments, this determination can be made based on broadcast control information included in a message header associated with the message. For example, broadcast control information can indicate a sub range of node within a ring that a node is responsible for.

Method 2400 can also include an act of partitioning the range into plurality of sub ranges (act 2402). For example, the node having ID 64 can partition the range of IDs 0-255 into sub-ranges within ring 2400. A range of nodes can be partitioned in a plurality of sub-ranges of nodes based at least in part on the location of a node's routing nodes within a ring. For example, a sub-range of IDs 168-229 can be partitioned from the range of IDs 0-255 based on the locations of the nodes having IDs 200, 2, and 135. That is, the node ID 168 is near the midway point between node the nodes having IDs 135 and 200. Similarly, the node having ID 229 is near the midway point between the node IDs 2 and 200. It should be understood that one or more positions in an ID range may not include an actual node. As depicted in ring 2300, nodes having IDs 174, 180, 200, 210, 218, and 225 are in the range of IDs from 168-229.

Other sub-ranges can also be partitioned. For example, a sub-range of IDs 117-168 can be partitioned from the range of IDs 0-255 based on the location of the nodes having IDs 135 and 98. That is, the node ID 117 is near the midway point between the nodes having IDs 135 and node 98. Similarly, a sub-range of IDs 229-16 can be partitioned from the range of IDs 0-255 based on the location of the nodes having IDs 2 and 30. That is, the node ID16 is near the mid-way point between the nodes having IDs 2 and 30. Thus, as depicted, there is no requirement that sub-ranges be symmetrical around a routing node.

Sub-ranges can be dynamically determined at or near the time of message processing (e.g., at a routing layer) based on available communication. For example, the sub-ranges depicted in FIG. 23 can be recalculated when communication with node 200 is unavailable. Thus, the broadcasting of message is still possible when nodes and communication paths fail.

In other embodiments, sub-ranges can be statically defined in administrative rules and/or ring configuration settings. Administrative rules and configuration settings can partition sub-ranges based on data other than routing partner locations.

Method 2400 includes an act of the node forwarding the message along with at least one indication of the sub ranges to at least one routing partner node of the node, the at least one partner node being within the range of nodes that the receiving node is responsible for (act 2403). For example, the node having ID 64 can forward message 2301 along with sub-range 2302 (indicating the sub-range of IDs 168-229) to the node having ID 200. Potentially in parallel, the node having ID 64 can send message 2301 along with sub-range 2303 (indicating the sub-range of IDs 117-168) to node the node having 135 and can send message 2301 along with sub-range 2304 (indicating the sub-range of IDs 229-16) to the node having 2.

Also potentially in parallel, the node having ID 64 can also forward message 2301 along with other sub-ranges (e.g., selected from a range of IDs between 117 and 64 and from range of IDs between 64 and 16) to other routing nodes. For example, the node having ID 64 can send message 2301 along with appropriate partitioned sub-range to the nodes having IDs 30 and 98 (although this is not expressly depicted in FIG. 23).

Method 2300 includes an act of the node forwarding the message to at least one of a successor node, a predecessor node, and a neighborhood node of the node (act 2404). For example, the node having 64 can forward message 2301 to the node having ID 76 and/or the node having ID 50 and/or any of the nodes having IDs 83, 76, 50, and 46.

Method 2400 can then be recursively applied at each node receiving message 2301. For example, the node having ID 200 can receive message 2301 and sub-range 1202 (IDs 168-229). The node having ID 200 can partition the sub-range 2302 into further sub-ranges. The node having ID 200 can forward message 2301 along with a further sub-range to any of its routing partners within the sub-range 1202 (IDs 168-229), such as, for example to the node having ID 225. The node having ID 200 can also forward the message to at least one of a successor node, a predecessor node, and a neighborhood node.

Similarly, the node having ID 135 can receive message 2301 and sub-range 2303 (IDs 117-168). The node having ID 135 can partition sub-range 1203 into further sub-ranges. The node having ID 135 can forward message 2301 along with a further sub-range to any of its routing partners within sub-range 1203 (IDs 117-168). The node having ID 135 can also forward the message to at least one of a successor node, a predecessor node, and a neighborhood node.

Likewise, the node having ID 2 can receive message 2301 and sub-range 1204 (IDs 229-16). The node having ID 2 can partition sub-range 2304 into further sub-ranges. The node having ID 2 can forward message 2301 along with a further sub-range to any of its routing partners within sub-range 2304 (IDs 229-16). The node having ID 2 can also forward the message to at least one of a successor node, a predecessor node, and a neighborhood node.

In some embodiments, broadcasting within a ring is further performed in accordance with the following algorithm. A message is delivered to a node from a routing partner, a predecessor node, a successor node, a neighborhood node. A received message includes broadcast control information specifying a number range that the node is responsible for within the ring. The range can include the recipient node.

Alternately, when a ring entry node receives a message from an external node or when a node within a ring originates a message, the node can assign a number range to cover the entire ring. For example, when the receiving node is an entry node the range is can be assigned as [0, MAX_NODE_ID] (e.g., [0, 65535] for b=2, n=16).

When a node is assigned a range it attempts to forward the message to routing partners that fall within the assigned range but outside of its neighborhood. In addition, the node partitions the assigned range among the routing partners that fall within the range but outside of its neighborhood and assigns each of these routing partners a resulting sub-range. This assigned sub-range is indicated in broadcast control information associated with the message at the time the message is forwarded to each appropriate routing partner. The partition of a range between a pair of consecutive nodes can be based on the middle point between them.

The node can also forward the message to both its successor and predecessor (if the message is received from a routing partner), or to its successor (if the message is received from its predecessor) or to its predecessor (if the message is received from its successor).

It is possible for a node to receive a given message multiple times from different senders with the above algorithm (for example, both from its successor and predecessor). Therefore, a node can remember the messages it has received and can ignore the duplicates. This ensures that the same message is not delivered to a corresponding application layer multiple times, nor is the message forwarded unnecessarily.

If a routing partner fails to forward message, the range it is responsible for can be covered by the message forwarded along the successor/predecessor direction, for example, to a successor, predecessor, or a neighborhood node in the direction of the successor or predecessor. In some embodiments, to increase efficiency, when a message is forwarded along the successor/predecessor direction, a counter can be maintained in corresponding broadcast control information to specify how many consecutive hops the message has been transferred along the ring's edge in that direction. If this number becomes too large, it is likely that a message targeted to a partner node has failed. In such a case, the recipient of the message can decide to forward the message to its partners in addition to its successor/predecessor.

Embodiments of the invention can also compensate for node failure. If any single node fails, all other nodes will still be able to get the message since every node at least has the chance of receiving the message from both its successor side and the predecessor side.

Embodiments of the present invention can facilitate intra-ring broadcasting at any level in a hierarchy of rings. Thus, intra-ring broadcasting can be implemented in a root ring, in any intermediate rings of a hierarchy, or in any leaf ring. For example, intra-ring broadcasting can be implemented in any of the rings in FIGS. 4, 5, 5A, 12A and 12B, and 19A-19G.

Inter-Ring Broadcasting

Figure 25:
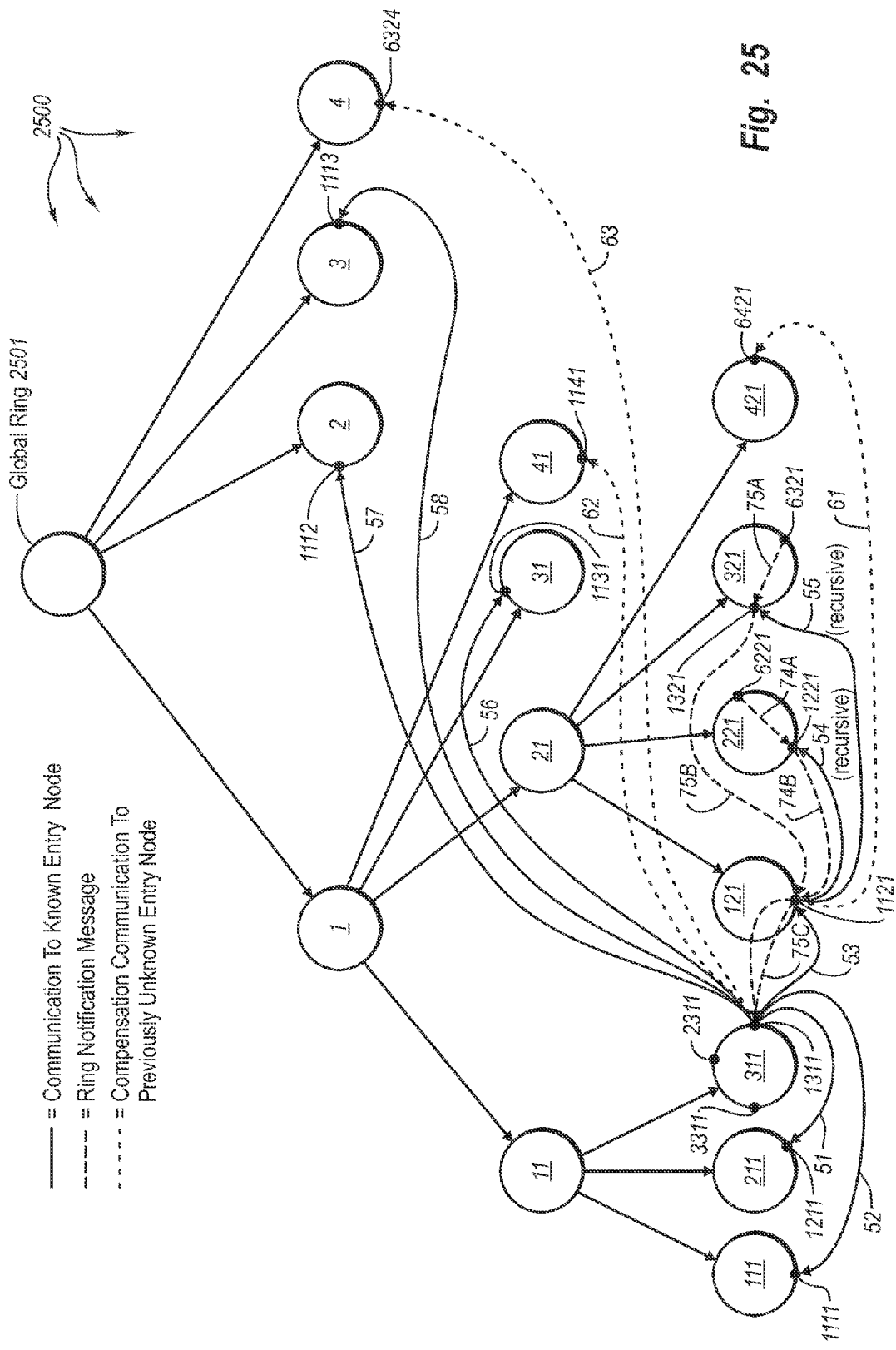
FIG. 25 illustrates an example proximity induced partition tree of rings that facilitates broadcasting a message to rings in the proximity induced partition tree of rings.

Embodiments of the present invention can also facilitate inter-ring broadcasting to and/or between one or more, and potentially all, the rings in a proximally partitioned ring infrastructure. Inter-ring broadcasting can include broadcasting a message to destination rings in a proximally partitioned ring infrastructure. FIG. 25 illustrates an example proximity induced partition tree of rings 2500 that facilitates broadcasting a message to destination rings in the proximity induced partition tree of rings 2500.

Within partition tree of rings 2500, root ring 2501 is partitioned into a plurality of sub-rings, including sub-rings 1, 2, 3, and 4, based on selected criterion (e.g., a first administrative domain boundary criterion). Sub-ring 1 is further partitioned into sub-rings 11, 21, 31, and 41. Sub-ring 11 is further partitioned into sub-rings 111, 211, and 311. Sub-ring 21 is further partitioned into sub-rings 121, 221, 321 and 421. Although not expressly depicted, other sub-rings, such as, for example, sub-rings 2, 3, 4, 31, and 41, can also be further partitioned.

The numbering convention of the rings in proximity induced partition tree of rings 2500 is configured such that any digits after the first digit indicate a ring's parent ring. For example, the "21" in ring "321" indicates that ring 21 is the parent ring of ring 321. Similarly, the "1" in ring "41" indicates that ring 1 is the parent ring of ring 41. Global ring 2501 is the parent ring for any rings numbered with a single digit, such as, for example, rings 1, 2, 3 and 4. Similar to proximity induced partition tree of rings 500 in FIGS. 5 and 5A, partition tree of rings 2500 can partitioned based upon various proximity criterion.

Within the description and following claims the annotation R["<number>"] is used to refer to a ring number. For example, R["11"] refers to ring 11. Within the description and following claims the annotation N[<number>] is used to refer to a node having a specified ID number. For example, N[1141] refers to the node having 1141.

To facilitate broadcasting communication, nodes can maintain a CRS entry table (as previously described) that includes one or more collateral rings and one or more corresponding entry nodes into the one or more collateral rings. Thus, when a node exchanges Rendezvous Ping/Update messages with its neighbor/partner nodes as previously described (e.g., at a rendezvous protocol layer), the node can also exchange CRS entry table entries and use CRS entry table entries received from its neighbors/partners to update its own CRS entry table. For example, suppose N[1311] is not aware of an entry node into R["3"]. However, its neighbor N[6221] (in R["1"]1) has an entry (R["3"], N[8223]) in its CRS entry table. Thus, N[1311] will be able to figure out it can use this pair in its CRS entry table also after N[6221] sends an appropriate CRS entry table entry to N[1311].

When forwarding a message, a sending node can attach broadcast control information to indicate what rings have been reached (e.g., as compensation communication 63). Every node along the distribution path can compare and see whether it knows of rings that should have been distributed to (reached) but are missing from this attached reached-list. If this situation is detected, the detecting node can send the broadcast control information (indicating the missed ring) to the responsible entry node that is responsible for the missed ring. That responsible entry node, upon receiving the broadcast control information, can recognize that it has missed this ring. The responsible entry node can then add the missed ring and at least one of the missed ring's included entry nodes to its CRS entry table and forward the message to at least one of the missed ring's entry nodes.

If later another node finds the same missing ring and sends the responsible entry node the same message (maybe with a different entry node to that ring), the responsible entry node can ignore the message because the missing ring situation has already been resolved. For example, during broadcast of a message, if a publisher node N[1311] does not know about R["4"], and while the message is distributed within the leaf ring R["311"], N[2311] sends a CRS entry pair (R["4"], N[6324]) to N[1311], N[1311] will forward the message to N[6324] and let it take care of broadcasting the message within R["4"]. Later, suppose N[3311] also sends a CRS entry pair (R["4"], N[3114]) to N[1311], this time N[1311] can ignore the message since R["4"] has already been taken care of.

This essentially resolves the conflict within a less expensive proximity ring so that only a single inter-ring message is needed. If we let N[2311] and N[3311] directly deliver the message to R["4"], two inter-ring messages would have been used. Another benefit is that by sending the entry node the entry pair information for R["4"] to the responsible node, the responsible node will be able to update its entry table so that the next time it can send the message to R["4"] directly.

As previously described, when nodes have a complete CRS entry table, a publisher node can to send the message to an entry node for every ring in CRS to facilitate broadcasting the message to every node in a corresponding tree. Forwarding to entry nodes can be applied recursively along a distribution path. That is, entry nodes that receive the message, can recursively send the message to at least one entry node for every CRS ring not already covered in their CRS entry tables. Thus, every leaf ring can be reached within "h" steps, where h is the height of the ring tree. Intra-ring broadcasting (e.g., similar to method 2400) can then be used to broadcast the message within each leaf ring.

In some environments, broadcast control information (e.g., a broadcast header) is sent along with a message that is being broadcast. The broadcast header control information can include: 1) a reached ring list indicative of the rings (from a receiving node's collateral ring list) the message has already reached by ancestor nodes in distribution tree, 2) a responsible ring indicator indicating the ring that the receiving node is responsible for, and 3) a parent entry node indicator indicating the last parent node (i.e., node that previously received the message) that was an entry node along the message's distribution path.

The responsible ring indicator can be set based on proximal restriction information indicting a highest level proximity the current node is responsible for. For example, proximal restriction information can indicate that a publishing (originating) node's responsibility, such as, for example, node 1311's responsibility, is less than the root ring (e.g., restricted to R["<null>1"]). For a publisher node, the reached ring list and parent entry node indicator can be empty and the responsible ring indicator can indicate that the publisher now is responsible for the root ring or a lower level ring if proximal restriction is applied by the originator. A recipient node can determine how to recursively forward the message to addition nodes based at least in part on the contents of a header containing broadcast control information.

In some embodiments, for example, when a node has global knowledge of other nodes and rings in a hierarchical ring infrastructure, a list or other indication of rings that have not be reached can be used to augment or replace a reached ring list.

Figure 26:
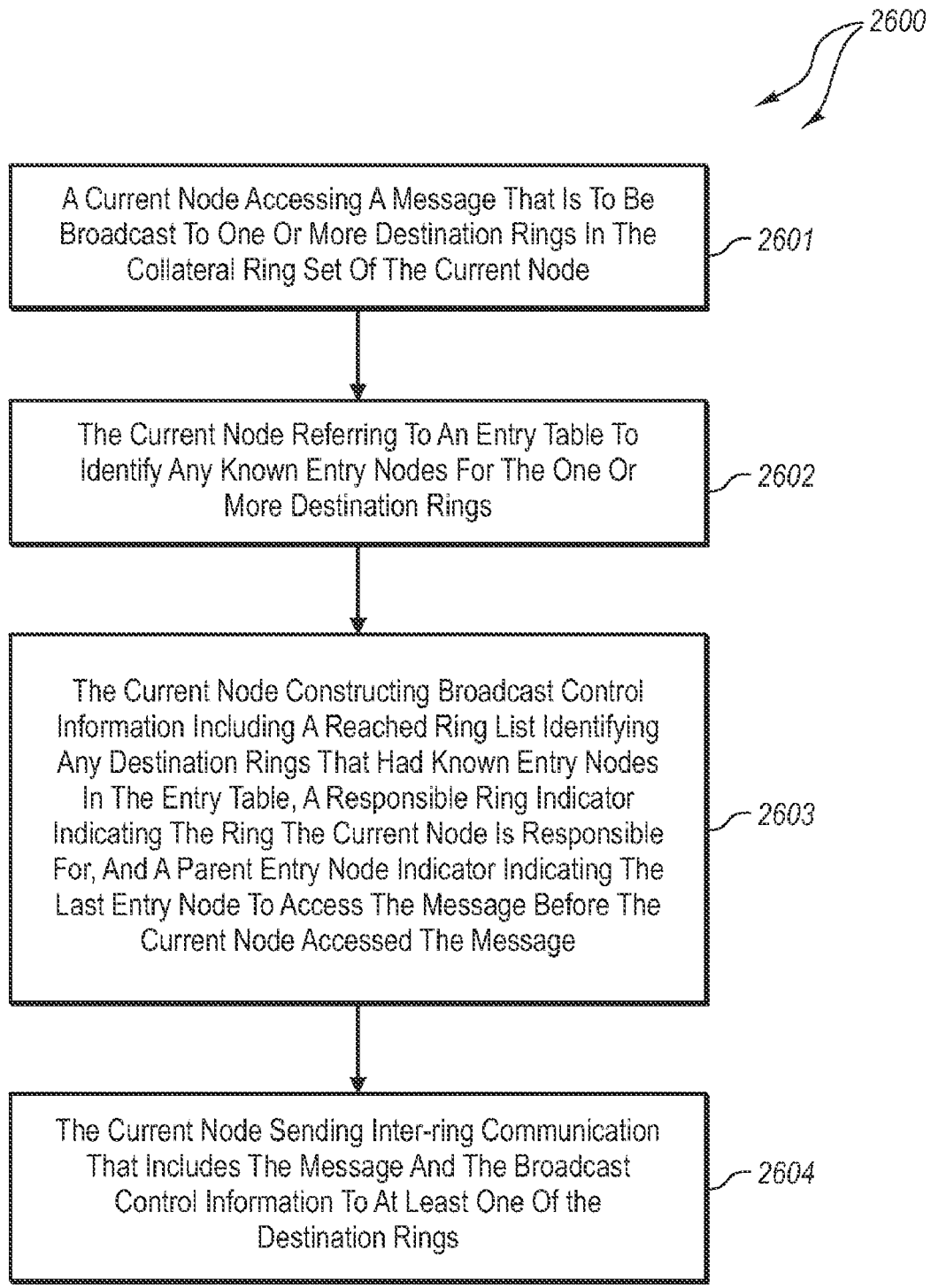
FIG. 26 illustrates an example flow chart of a method for broadcasting a message to one or more rings in a hierarchical ring infrastructure.

FIG. 26 illustrates an example flow chart of a method 2600 for broadcasting a message to one or more rings in hierarchical ring infrastructure. Method 2600 will be described with respect to the nodes, rings, and communication in partition tree of rings 2500.

Method 2600 includes an act of a current node accessing a message that is to be broadcast to one or more destination rings in the collateral ring set of the current node (act 2601). For example, a message can originate at node 1311 and node 1311 can publish the message that is to be broadcast to all the leaf rings of partition tree of rings 2500. Alternately, node 1311 can publish a message that is to be broadcast to all rings at the specified hierarchical level, such as, for example, at the level of R["11"], R["21"], R["31"], R["41"]. Proximal restriction information can be applied to limit broadcasting to a subset of rings at a specified level. For example, proximal restriction information (e.g., nodes immediately below R["1"]) can be used to limit broadcasting to the subset of R["11"], R["21"], R["31"], and R["41"], even though R["2"], R["3"], and R["4"] have other rings at the same level as R["11"], R["21"], R["31"], R["41"]. Similar proximal restriction information can be used to limit broadcasting to all the leaf nodes under R["1"], even though R["2"], R["3"], and R["4"] have other leaf nodes.

In some embodiments, a current node publishes a message it receives from another node that is not included in the ring's hierarchical ring infrastructure. For example, node 1311 can receive a message from a node external to tree of rings 2500. None the less, node 1311 can be responsible for publishing the message within the tree of rings 2500 (e.g., to all the leaf rings).

Method 2600 includes an act of the current node referring to a CRS entry table to identify any known entry nodes for the one or more destination rings (act 2602). For example, node 1311 can refer to an entry table to identify entry nodes for one or more rings in node 1311's collateral ring set. Thus, node 1311's entry table can include one or more entry nodes for one or more of rings 111, 121, 21, 31, 41, 2, 3, 4. For example, node 1311's entry table can include the following entries:

R["2"]:N[1112]
R["3"]:N[1113]
R["21"]:N[1121]
R["31"]:N[1131]
R["111"]:N[1111]
R["211"]:N[1211]

Depending on the any specified hierarchical level and any proximity restriction information of the destination rings, node 1311 can identify one or more of the entry nodes. For example, if a message is to be broadcast to rings at the hierarchical level of R["11"], R["21"], R["31"], R["41"], node 1311 can identify N[1121] and N[1131]. When a node 1311 is to broadcast a message to all leaf rings in tree rings 2500, node 1311 can identify all the listed entry nodes.

Method 2600 includes an act of the current node constructing broadcast control information including a reached ring list identifying any destination rings that had known entry nodes in the CRS entry table, a responsible ring indicator indicating the ring the current node is responsible for, and a parent entry node indicator indicating the last entry node to access the message before the current node accessed the message (act 2603). For example, when broadcasting to all leaf rings in the tree of rings 2500, node 1311 can construct a broadcast control information with a reached list including rings 2, 3, 21, 31, 111, 211, and 311 a responsible ring indicator indicating that node 1311 is responsible for the root ring, and a last entry node indicator that is empty. Depending on the any specified hierarchical level and any proximity restriction information, a reached ring list can include only rings at the specified hierarchical level and a responsible ring indicator indicating some ring below (and in the spine from node 1311 and the root ring) the root ring.

For example, a publishing node can determine to which entry nodes outside its leaf ring the message is to be forwarded. It does this by checking its CRS entry table, for every pair in the entry table for rings that the publishing node is not responsible; adding these rings to a "next ring list". For every ring in the next ring list, the recipient entry node will forward the message to the at least one corresponding entry node, with the broadcasting headers broadcast control information set as follows:

Reached ring list: the current reached ring list.
Responsible ring: the destination ring.
Parent entry node: the recipient entry (or publishing) node itself If the current node is an intermediate node in the message path, the intermediate node can also augment broadcast control information with (e.g., ring, entry node) data from its CRS entry node table as will be described in further detail below.

Method 2600 includes an act of the current node sending inter-ring communication that includes the message and the broadcast control information to at least one of the destination rings (act 2604). For example, as indicated by the solid lines in FIG. 25, node 1311 can send inter-ring communications 51, 52, 53, 56, 57, 58, to entry nodes 1211, 1111, 1121, 1131, 1112, and 1113 for rings 211, 111, 21, 31, 2, and 3 respectively. The communication can include the message to be broadcast and the constructed (and potentially augmented) broadcast control information.

Nodes receiving communication from node 1311 can send a reply to node 1311 indicating receipt of the inter-ring communication. Nodes receiving communication form node 1311 can also recursively apply method 2600 to further forward the message that is to be broadcast. For example, node 1121 can access the message that is to be broadcast from communication 53. Node 1121 can refer to its entry table to identify entry nodes for one or more rings in node 1121's collateral ring set. Node 1121's entry table can include a (ring, entry node) pair for one or more of rings 11, 221, 321, 421, 31, 41, 2, 3, 4. For example, node 1121's entry table can include the following entries:

R["221"]:N[1221]
R["321"]:N[1321]

As indicated by the solid lines in FIG. 25, node 1121 can recursively send inter-ring communications 54 and 55 to entry nodes 1221 and 1321 for rings 221 and 321 respectively. Entry nodes in other rings can also recursively apply method 2600 to further forward the message that is to be broadcast. Upon entry into a leaf ring, intra-ring broadcasting can be used to broadcast the message within the ring. For example, the message can be broadcast similar to the broadcasting of message 2301 in FIG. 23 and/or in accordance with method 2400.

Figure 27:
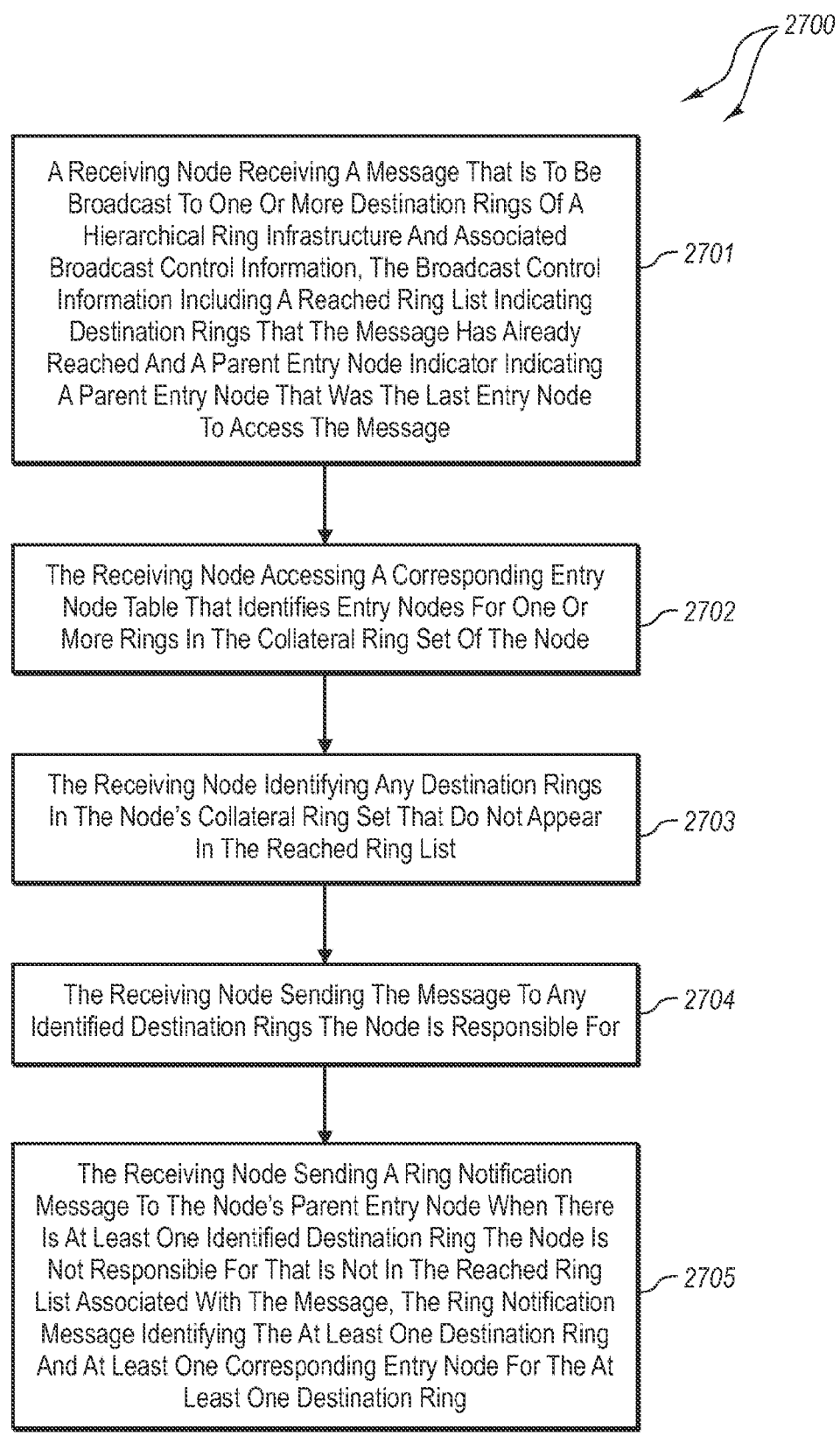
FIG. 27 illustrates an example flow chart of a method for broadcasting a message between rings in hierarchical ring infrastructure.

FIG. 27 illustrates an example flow chart of a method 2700 for broadcasting a message between a plurality of rings in hierarchical ring infrastructure. Method 2700 will be described with respect to the nodes, rings, and communication in partition tree of rings 2500.

Method 2700 includes an act of a receiving node receiving a message that is to be broadcast to destination rings of the hierarchical ring infrastructure and associated broadcast control information (act 2701). The broadcast control information includes a reached ring list indicating destination rings that the message has already is to be considered to have reached and a parent entry node indicator indicating a parent entry node that was the last entry node to access the message. For example, node 1121 can receive a message and a reached ring list and parent entry node indicator (included in a broadcast header) as part of communication 53. The reached ring list can include rings 2, 3, 31, and 11 and the parent entry node indicator can indicate node 1311.

Method 2700 includes an act of the receiving node accessing a corresponding CRS entry node table that identifies entry nodes for one or more rings in the collateral ring set of the receiving node (act 2702). For example, node 1121 can access a node entry table including the following entries:

R["221"]:N[1221]
R["321"]:N[1321]
R["41"]:N[1141]

Method 2700 includes an act of the receiving node identifying any destination rings in the receiving node's collateral ring set that do not appear to have been covered according to information in the reached ring list (act 2703). For example, node 1121 can compare its entries to the reached ring list to determine that rings 221, 321, 41 have not yet been reached.

Method 2700 includes an act of the receiving node sending the message to any identified destination rings the receiving node is responsible for (act 2704). Since node 1121 is the entry node for ring 21, node 1121 can determine that it is responsible for rings 221 and 321. Node 1121 can also update the broadcast control information. For example, node 1121 can update the reached ring list to include rings 221 and 321, can update the responsible ring indicator to indicate ring 21, and can update the parent entry node indicator to indicate node 1121 was the last entry node that accessed the message to be broadcast. Node 1121 can send communications 54 and 55 (including the message and updated broadcast header) to nodes 1221 and 1321 for rings 221 and 321 respectively.

Method 2700 includes an act of the receiving node sending a ring notification message to the receiving node's parent entry node when there is at least one identified destination ring the receiving node is not responsible for that is not covered by the received reached ring list associated with the message, the ring notification message identifying the at least one destination ring and at least one corresponding entry node for the at least one destination ring (act 2705). For example, as indicated by a dashed line, node 1121 can send ring notification message 71 to node 1311. Ring notification message 71 can identify ring 41 and identify node 1141 as an entry node for ring 41. A ring notification message can also include an updated broadcast control information (e.g., in a broadcast header).

Upon receiving a ring notification message, a receiving entry node determines if it is responsible for the identified ring. For example, upon receiving ring notification message 71, node 1311 updates its entry table to include R["41"]:N[1141] and determines if it is responsible for node 41. In FIG. 25 node 1311 is the publishing node and is responsible for the root ring (or all rings). However, based on proximity restriction information, a publishing node can be responsible for less than the root ring (e.g., proximity restriction information can limit node 1311's responsibility to R["11"] or R["1"]). In response to a ring notification message and when responsible for a ring, a receiving entry node can send a compensation message to an entry node for the unreached ring. For example, as indicated by a dotted line, node 1311 can send compensation communication 62 to node 1141. Compensation communication can include the message to be broadcast and updated broadcast control information (e.g., updating the reached ring list to include ring 41). Upon receiving compensation communication 62, node 1141 can reply to node 1311 acknowledging receipt of compensation communication 62. Node 1141 can forward the message through further inter-ring and/or intra-ring communication to each node in ring 41.

During subsequent inter-ring and/or intra-ring communication each node that receives a message and associated broadcast control information can compare the reached ring list in the broadcast control information to entries in its CRS entry table. As a result of the comparison, the node may determine that each ring in its entry table has received the message. On the other hand, the node may identify one or more rings in its entry table that may have not received the message.

When an entry node identifies rings that may not have not received a message, the entry node then determines if it is responsible for forwarding the message to any of the identified rings. When the entry node is responsible for an identified ring is forwards the message to the identified ring as previously described with respect to recursive inter-ring communications 54 and 55. On the other hand, when the entry node is not responsible for the ring it sends a ring notification message to its parent message path entry node as previously described with respect to nodes 1311 and 1121.

When a non-entry node identifies rings that have not received a message, the non-entry node sends a ring notification message to its corresponding message path entry node. For example, in response to receiving communication 54 from parent entry node 1121, node 1221 can initiate intra-ring distribution to broadcast within ring 221. During intra-ring distribution in ring 221 node 6221 can receive a message that is to be broadcast and associated broadcast control information. It may be that node 6221's CRS entry table includes the following entry:

R["421"]:N[6421]

Node 6221 can compare this entry to a reached ring list in the broadcast control information to determine that ring 421 is missing from the reached ring list. Since node 6221 is not an entry node, as indicated by a dashed line it sends a ring notification message 74A to node 1221 (the entry node for ring 221). Node 1221 can update its entry table to include R["421"]:N[6421] and determines it is not responsible for ring 421. (Previously described entry table entries depict that node 1121 is responsible for ring 21 and thus each of ring 21's child rings). Accordingly, node 1221 sends ring notification message 74B (as indicated by a dashed line) to its parent entry node, node 1121.

Node 1121 determines that it is responsible for ring 421. Accordingly, node 1121 sends compensation communication 61 (as indicated by a dotted line) to node 6421. Node 1121 can also update its CRS entry table to include R["421"]: N[6421] In response to receiving compensation communication 61 from parent entry node 1121, node 6421 can initiate intra-ring distribution to broadcast within ring 421.

It may be that a ring notification message propagates all the way back to a publishing node.

For example, in response to receiving communication 55 from parent entry node 1121, node 1321 can initiate intra-ring distribution to broadcast within ring 321. During intra-ring communication distribution in ring 321 node 6321 can receive a message that is to be broadcast and associated broadcast control information. It may be that node 6321's entry table includes the following entry:

R["4"]:N[6324]

Node 6321 can compare this entry to a reached ring list in the broadcast control information to determine that ring 4 is missing from the reached ring list. Since node 6321 is not an entry node, it sends a ring notification message 75A (as indicated by a dashed line) to node 1321 (the entry node for ring 321). Node 1321 can update its entry table to include R["4"]: N[6324] and determines it is not responsible for ring 4. Accordingly, node 1321 sends ring notification message 75B (as indicated by a dashed line) to its parent entry node, node 1121. Node 1121 can update its entry table to include R["4"]: N[6324] and also determines that it is not responsible for ring 4. Accordingly, node 1121 sends ring notification message 75C (as indicated by a dashed line) to its parent entry node, node 1311.

Node 1311 can update its entry table to include R["4"]:N [6324] and determines that it is responsible for ring 4. Accordingly, node 1311 sends compensation communication 63 (as indicated by a dotted line) to node 6324. In response to receiving compensation communication 63 from parent entry node 1311, node 6324 can initiate intra-ring distribution to broadcast the message within ring 4.

In some embodiments, inter-ring broadcasting is further performed in accordance with the following algorithm. When an entry node receives a message, it also receives the following broadcast control information (e.g., in one or more broadcast headers): 1) a reached ring list indicating the rings the message has already reached by ancestors in the distribution tree (rings in the collateral ring set of the node), 2) a responsible ring indicating the ring the node is responsible for (empty except for entry nodes), and 3) a parent entry node indicating the last parent node in the distribution tree that is an entry node for the received message.

The recipient entry node sends a reply to the parent entry node to confirm receipt of the message. If the parent does not receive the reply, it can try another entry node for the same ring.

The entry recipient node determines to which entry nodes outside its leaf ring the message is to be forwarded. It does this by checking its CRS entry table, for rings that do not appear in the reached ring list. The recipient entry node checks whether entry nodes in rings outside its leaf ring are sub rings of its responsible ring. If so, these rings are added into a "next ring list"-rings to which the recipient entry node will directly forward the current message. If not, (i.e., if the ring is outside of its responsible ring), the recipient node will send a "ring notification message" with the corresponding node information to its parent entry node and then add the ring to the reached ring list.

For every ring in the next ring list, the recipient entry node will forward the message to the at least one corresponding entry node, with the broadcast control information set as follows:

Reached ring list: the current reached ring list plus the next ring list minus the destination ring.
Responsible ring: the destination ring.
Parent entry node: the recipient entry node itself Whenever a node receives a ring notification message, it may add the entry for the missed ring into its CRS entry table and may also add the ring to the reached ring list where it has not yet been included. If the ring belongs to its responsible ring, it will forward the message. Otherwise, it will forward the received ring notification message to its parent entry node. It will also send a positive reply to the informing node to acknowledge the receipt of the ring notification message. In some rare cases, the entry node might have forgotten the message already (after a reboot for example), in such cases, it has no way to forward the message and must send a negative reply to the informing node.

A node which sends out a "ring notification message" waits for a reply. If a positive reply is received, its responsibility is over. If a negative reply is received, or if no reply is received within certain period, it should forward the message to the missing ring itself. In such cases, since there may not be a single parent node to coordinate, the missing ring can receive the same message from multiple external nodes.

Subsequently, the recipient entry node can distribute the message within its ring. In some embodiments this ring can be a leaf ring. The recipient entry node can implement intra-ring distribute as previously described. For example, the recipient node can send the message to its partner nodes and/or the successor/predecessor nodes according to method 2400. The recipient entry node can set the broadcast message header information with the responsible ring set to empty. Each node in the ring can also check for missing rings, although they may not have the responsibility to forward the message to any ring by themselves as described above.

When a ring notification message reaches an entry node that is responsible for an indicated ring, that responsible entry node can send a compensation message to the indicted ring.

Subfederation Creation and Management

Figure 28:
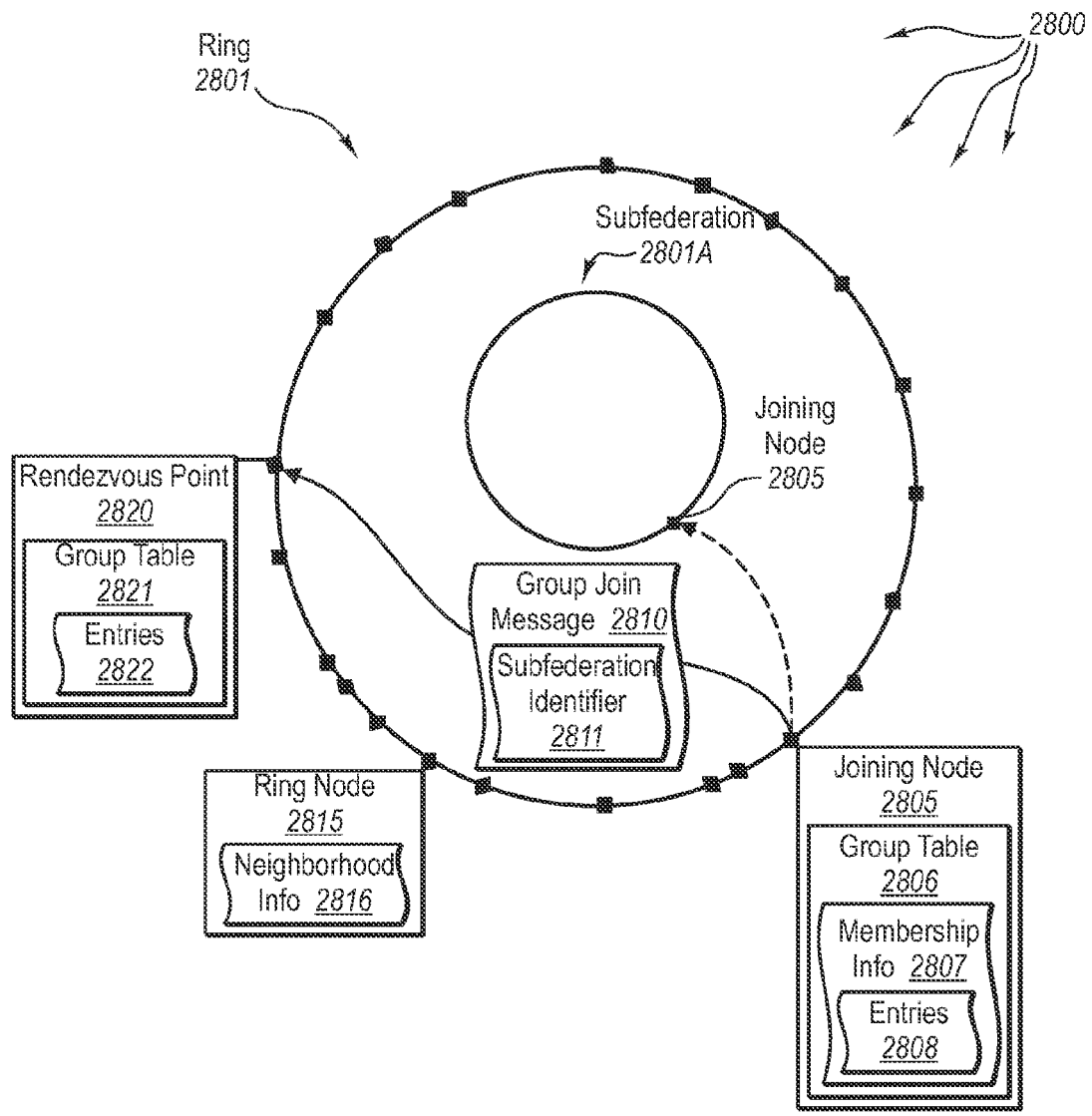
FIG. 28 illustrates an example of a node forming a subfederation within a federation infrastructure.

FIG. 28 illustrates a federation infrastructure ring architecture 2800 in which the principles of the present invention may be employed. Ring architecture 2800 may be similar to or the same as other ring architectures described above. For example, ring 2801 may include functionality and structure similar to that of ring 1206 described in relation to FIG. 12B. Ring 2801 may include many different nodes. Although arbitrarily chosen node numbers are shown in FIG. 28, is should be understood that any number and/or type of nodes are possible in ring 2801. Ring 2801 depicts, at least on one level, the interconnections between nodes that are part of a federation infrastructure.

In some embodiments, a node (or group of nodes) may wish to send a message, the receipt of which is to be restricted to a particular group or subset of nodes within a federation (i.e. within ring 2801). This group or subset of nodes may include a single node or multiple nodes. When such a message is sent targeted to all nodes within such a group of nodes in a federation, it may be referred to as multicasting the message to those nodes within the context of the underlying federation. When such a message is sent targeted to only one destination node within such a group of nodes in a federation, it may be referred to as unicasting the message to those nodes within the context of the underlying federation. When such a message is sent targeted to only a first destination node within such a group of nodes in a federation, it may be referred to as anycasting the message to those nodes within the context of the underlying federation. Such a group of nodes within a federation may be referred to as a subfederation).

In general, a subfederation may comprise any or all of the characteristics and functionality of the underlying federation infrastructure. These characteristics include the proximal hierarchy of the underlying federation. As explained in greater detail above with regard to FIG. 4, a federation infrastructure may be partitioned into a proximal tree of sub-rings and sub-sub rings and so on. A subfederation may comprise an extracted subset of nodes (for example) from every leaf node and/or proximal sub-ring. Such a subfederation would parallel its underlying proximal sub-ring's tree structure. In this manner, any operation (routing, broadcasting, unicasting, etc.) that can be constrained by proximity in the underlying federation can also be carried out only within the subset of nodes belonging to the subfederation and possibly constrained proximally.

Creating, managing and maintaining a subfederation involves multiple steps, as outlined below with regard to methods 2900, 3100 and 3300 of FIGS. 29, 31 and 33. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 29:
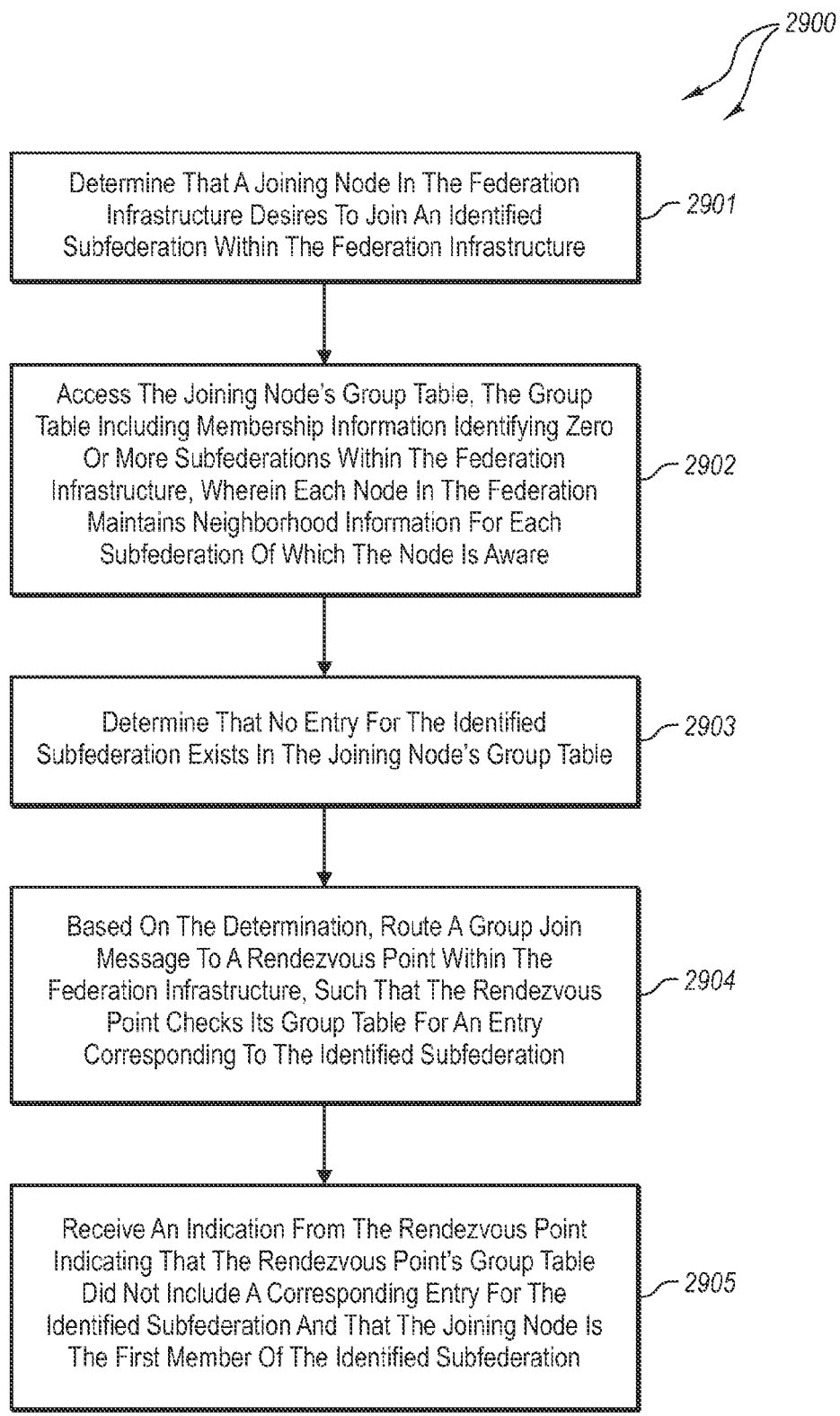
FIG. 29 illustrates an example flow chart of a method for forming a subfederation within a federation infrastructure.
Figure 30:
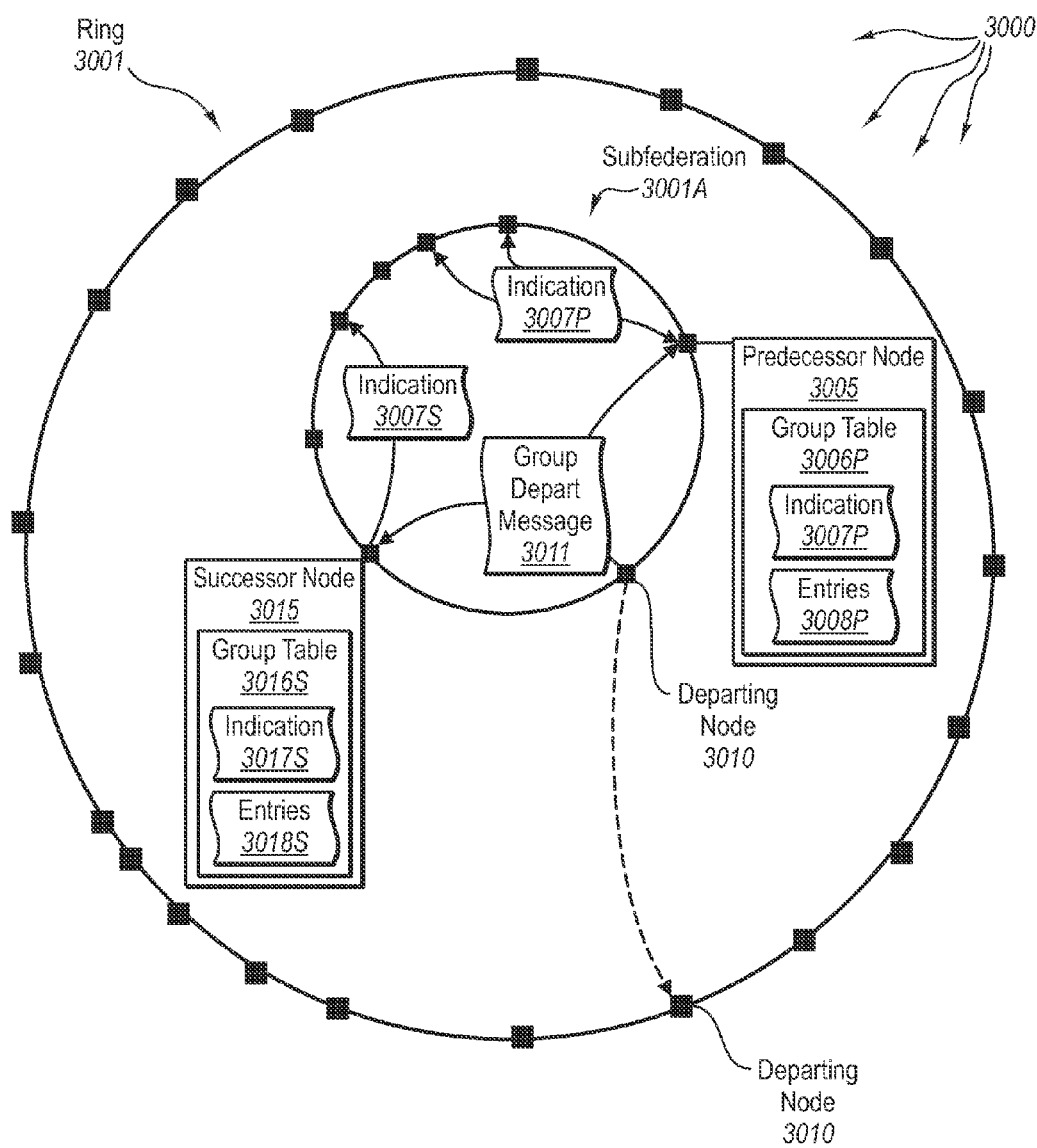
FIG. 30 illustrates an example of a node departing a sub-federation within a federation infrastructure.

FIG. 29 illustrates a flowchart of a method 2900 for forming a subfederation within a federation infrastructure. The method 2900 will now be described with frequent reference to the components and data of environment 2800.

Method 2900 includes an act of determining that a joining node in the federation infrastructure desires to join an identified subfederation within the federation infrastructure (act 2901). For example, joining node 2805 may desire to join subfederation 2801A within ring 2801. Joining node 2805 may desire to join (or establish) a subfederation for a variety of reasons. One reason might be to become a member of a group and receive group-specific messages. Such a group or subfederation may also be thought of as a small network (graph) of nodes where each node is communicatively connected to all the other nodes (at least indirectly). Similar to a larger ring or federation infrastructure, each node may be responsible for maintaining at least some of the other nodes' statuses and/or liveness information. This concept will be explained in greater detail below.

Method 2900 includes an act of accessing the joining node's federation infrastructure's group table, the group table including membership information identifying zero or more subfederations within the federation infrastructure, wherein each node in the federation maintains neighborhood information for each subfederation of which the node is aware (act 2902). For example, group table 2806 may be accessed, where the group table includes membership information 2807 identifying zero or more subfederations within ring 2801. In some cases, each node (e.g. node 2815) in ring 2801 is configured to maintain neighborhood information (e.g. 2816) for each subfederation of which the node is aware. Thus, ring node 2815 would maintain neighborhood information regarding each subfederation of which node 2815 was aware. Accordingly, if node 2815 was aware of subfederation 2801A, neighborhood information including subfederation 2801A's identity and/or other associated characteristics including one or more subfederation members will be maintained by node 2815.

As mentioned above, joining node's group table 2806 (and group tables in general) may be configured to store information regarding various subfederations. The group table's membership information 2807 may include zero or more entries 2808 for the various subfederations in ring 2801 of which the joining node is aware. In some embodiments, the membership information may include one entry for each subfederation. The entry may include the identity of the subfederation, a list of at least some members or nodes with the identities of the members, the member's liveness or other status information, or any other item of information about the subfederation.

In some cases, based on the information accessed in the group table 2806, the joining node determines that an entry for the identified subfederation already exists in the joining node's group table. In such cases, the joining node can route a group join message (e.g. 2810) to the closest known node in the identified subfederation. The node that received the group join message 2810 may reply to the joining node 2805 indicating its neighborhood and routing partner information for the identified subfederation 2801A, so that the joining node can learn about its neighborhood and routing partner nodes in the subfederation. As explained above in the "Federating Mechanisms" section, a node's neighborhood includes the closest N nodes in the subfederation on both the successor and the predecessor sides of the node, where N is a configurable neighborhood size.

In other cases, the joining node may determine that no entry for subfederation 2801A exists in the joining node's group table 2806. Here, the joining node may establish the subfederation by joining as the subfederation's first member node. This aspect will be explained in greater detail below.

Group table information may be appended to one or more existing federation infrastructure messages including ring maintenance messages. The group table information may also be carried within specific messages meant for sub-federation creation and maintenance. Federation infrastructure ring maintenance messages include those messages or other communications sent between nodes in a ring that verify or communicate a node's state or other information about the node. For instance, ring maintenance messages may indicate that a node has gone offline, come online, joined a federation, has gone out of synch or undergone any of a number of different state changes. As a result, ring maintenance messages may include, but are not limited to, the following: a ping message, an update message, a join message, a depart message and a synchronize message. The joining node 2805 may be configured to update its group table 2806 using information received as part of a federation infrastructure ring maintenance message. In this manner, a node's group table may stay up-to-date as a result of receiving communication directly from nodes of the subfederation, or by receiving updated information attached to regularly sent ring maintenance messages.

Furthermore, at least in some cases, a group table may be partitioned in a way such that each message that carries group table information propagates a portion of the group table. Thus, joining node 2805's group table 2806 may be partitioned into a plurality of different portions. Each of those portions may be propagated to other nodes using federation infrastructure ring maintenance or other federation infrastructure messages. This ability to piggyback group table information on other message traffic may reduce bandwidth and otherwise increase ring communication efficiency. As ring 2801 may scale to substantially any number of nodes, and as substantially any number of subfederations may be created within ring 2801, it should be noted that group tables may grow quite large when many thousands or millions (or more) of entries are stored in a group table. Accordingly, in some cases, a group table may be partitioned automatically after reaching a threshold size. This reduces overhead for message transmission between nodes in a ring or subfederation.

Method 2900 also includes an act of determining that no entry for the identified subfederation exists in the joining node's group table (act 2903). For example, joining node 2805 may determine that no entry for subfederation 2801A exists in the joining node's group table 2806. In some cases, group table entries (e.g. 2808) may include the corresponding node's liveness information such that that node's address is obtainable from the entry. Thus, entry 2808 may include joining node 2805's liveness information, which can include not only the node's current status but also the node's address or other identifier.

Additionally or alternatively, entry 2808 in the joining node's group table 2806 may include a group node instance ID for the node which is incremented each time a node joins a group, so that if a node joins a group shortly after the node departs that same group, other nodes will know that the current join occurred later than the depart. This provides useful information indicating whether the node is still part of a group or not. The purpose and functionality of a node instance ID, including a group Node Instance ID, is explained in greater detail above in the "Insertion Phase" subsection under the "Join Protocol" heading of the "Node Phases" section.

Method 2900 includes, based on the determination that no entry for the identified subfederation exists in the joining node's group table, an act of routing a group join message to a rendezvous point within the federation infrastructure, such that the rendezvous point node checks its group table for an entry corresponding to the identified subfederation (act 2904). For example, joining node 2805 may route group join message 2810 to rendezvous point 2820 of ring 2801. The rendezvous point then checks its group table 2821 for an entry corresponding to the subfederation specified in the identifier 2811 that is sent along with the group join message. As described above, a rendezvous point may be configured to maintain liveness and other information related to ring 2801 and/or any subfederations. Accordingly, the rendezvous point is to be checked to verify whether the rendezvous point has any knowledge of the subfederation joining node 2805 is attempting to join. Any information regarding such subfederations is stored in the rendezvous point's entries 2822.

Method 2900 includes an act of receiving an indication from the rendezvous point indicating that the rendezvous point's group table did not include a corresponding entry for the identified subfederation and that the joining node is the first member of the identified subfederation (act 2905). For example, rendezvous point 2820 may indicate that its group table 2821 does not include a corresponding entry for subfederation 2801A. Furthermore, the indication may indicate that joining node 2805 is the first member of subfederation 2801A. Accordingly, in such cases where neither the joining node nor the rendezvous point includes information regarding a particular subfederation, the joining node can, in effect, establish the subfederation, becoming the ring's first member. Thereafter, other nodes can join the already-established subfederation using the same process as outlined above in acts 2901-2905.

However, in other cases, either or both of the joining node's group table and the rendezvous point's group table may include an entry for the identified subfederation (group). Either the joining node or the rendezvous point would forward the new node's group join message to the closest node in subfederation 2801A. Another notable difference in this case is that because the subfederation was identified as already existing, the new joining node would join the established subfederation as the subfederation's second member. This process can continue ad infinitum as subfederation 2801A can include substantially any number of nodes. As each of these nodes can continually join and depart the subfederation 2801A or the ring 2801, maintaining the subfederation and/or ring can become increasingly difficult. Accordingly, a method for gracefully departing the ring and/or subfederation is described below.

Figure 31:
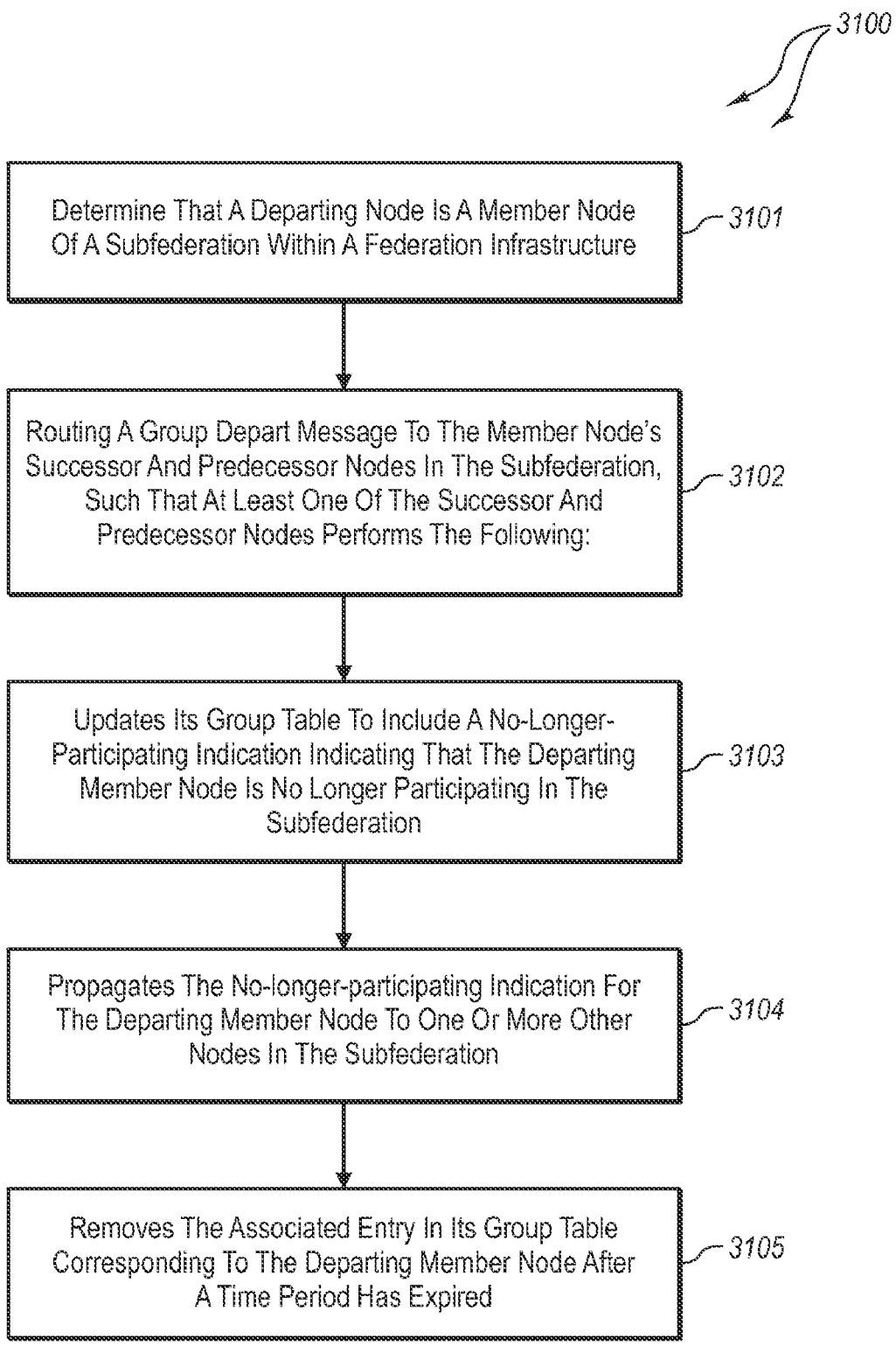
FIG. 31 illustrates an example flow chart of a method for departing a subfederation within a federation infrastructure.

FIG. 31 illustrates a flowchart of a method 3100 for departing a subfederation within a federation infrastructure. The method 3100 will now be described with frequent reference to the components and data of environment 3000.

Method 3100 includes an act of determining that a departing node is a member node of a subfederation within a federation infrastructure (act 3101). For example, it may be determined that departing node 3010 is a member node of subfederation 3001A within ring 3001. In some cases, departing node may be a member of both ring 3001 and subfederation 3001A simultaneously. Departing node 3010 may either maintain or terminate memberships established with other subfederations independent of its relationship to 3001A.

Method 3100 includes an act of the member node routing a group depart message to the member node's successor and predecessor nodes in the subfederation, such that at least one of the successor and predecessor nodes performs the following (act 3102). For example, departing node 3010 may route group depart message 3011 to the departing node's successor (3015) and predecessor (3005) nodes in subfederation 3001A. Upon receiving the group depart message 3011, the successor and predecessor nodes are configured to perform various tasks including sending indications 3007S and 3007P to other nodes within the subfederation. In this manner, when a node indicates to its adjacent nodes that it is departing the subfederation, the adjacent nodes assume the responsibility of notifying the other nodes of the departing node's departure. By having both adjacent nodes assume this responsibility, knowledge of the departing node's departure is virtually guaranteed to be disseminated among the nodes of the subfederation.

Method 3100 includes an act of updating its group table to include a no-longer-participating indication indicating that the departing member node is no longer participating in the subfederation (act 3103). For example, either or both of successor node 3015 and predecessor node 3005 may update its group table (e.g. 3016S or 3006P, respectively) to include a no-longer-participating indication (3017S or 3007P, respectively) indicating that the departing node is no longer participating in (i.e. will no longer a member of) subfederation 3001A. Accordingly, when other nodes wishing to join subfederation 3001A query successor node 3015 or predecessor node 3005, these nodes will be updated and apprised as to the existence of the subfederation and as to which nodes are members of the subfederation. Such group table entries (e.g. 3018S and 3008P, respectively) would also include the indication that departing node 3010 had departed the subfederation.

In some cases, the successor and/or predecessor nodes may access the departing member node's liveness information. The liveness information may indicate that the departing member node is in either a shutdown state or an unknown state. This may indicate that rather than actually departing the subfederation, the departing node has just gone into an unknown state or has otherwise shutdown or become disconnected. The departing member node's liveness information may, in some cases, be generated and updated by the underlying federation infrastructure (i.e. by ring 3001). In such cases, the underlying federation infrastructure is responsible for maintaining liveness information for each of the nodes in the ring and in any subfederation.

In some embodiments, it may be determined that at least one node in the subfederation 3001A includes liveness information in its group table indicating that the departing member node is unavailable. After this determination, it may then be determined that the departing member node is actually currently available (i.e. the other node's group table information is out-of-date and is incorrect). And, upon determining that the departing member node is actually available, the liveness information of the incorrect node may be overridden. This ensures that each of the nodes in the subfederation remains up-to-date regarding the liveness of the other subfederation nodes.

Method 3100 includes an act of propagating the no-longer-participating indication for the departing member node to one or more other nodes in the subfederation (act 3104). For example, predecessor node 3005 may propagate the no-longer-participating indication 3007P for departing node 3010 to one or more other nodes in subfederation 3001A. Additionally or alternatively, successor node 3015 may propagate the no-longer-participating indication 3007S for departing node 3010 to one or more other nodes in subfederation 3001A. These nodes may be the same nodes or different nodes than those to which the predecessor node sent indications 3007P.

Figure 32:
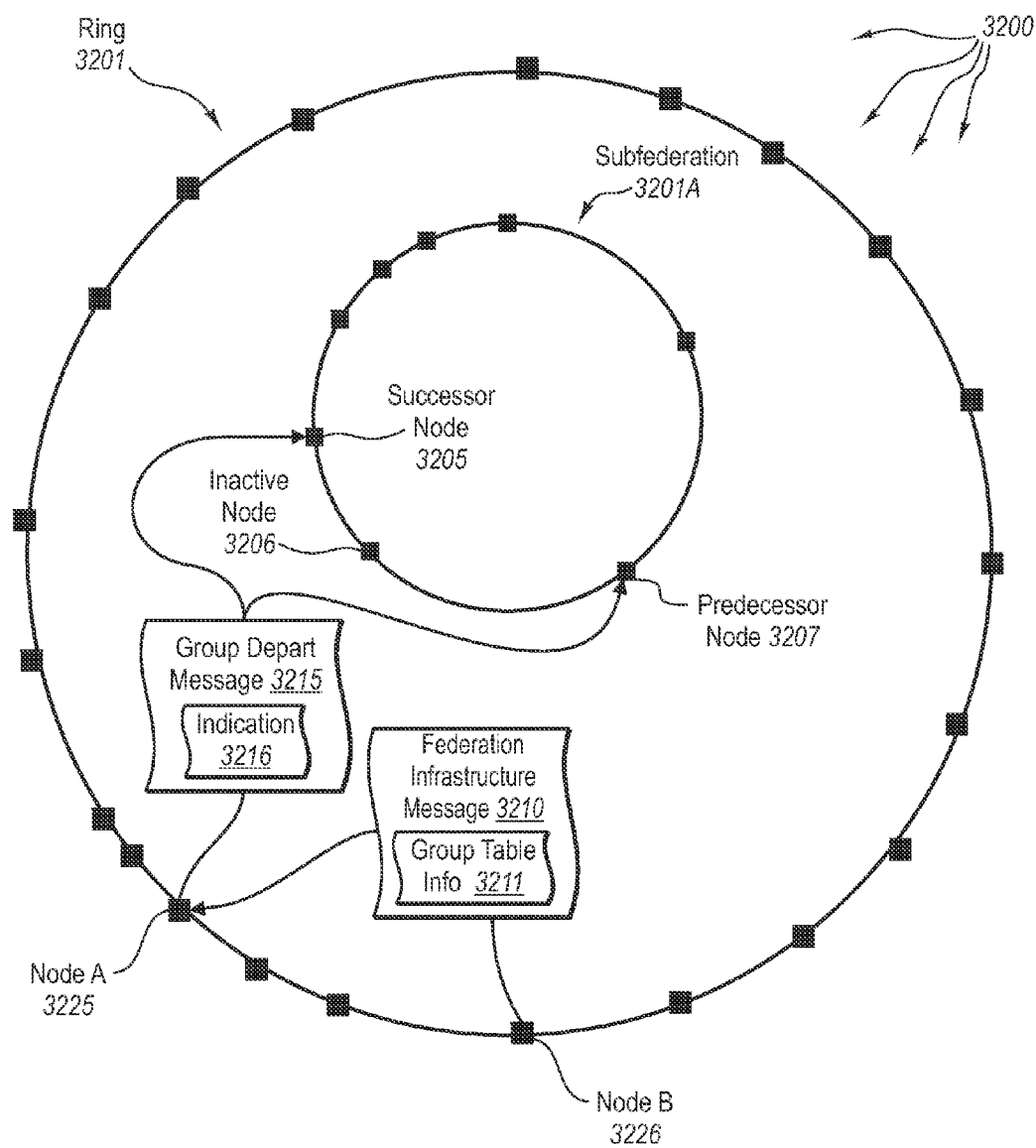
FIG. 32 illustrates an example of nodes maintaining a subfederation in a federation infrastructure.

Method 3100 includes an act of removing the associated entry in its group table corresponding to the departing member node after a time period has expired (act 3105). For example, either or both of the successor node and the predecessor node may remove the associated entry (3018S or 3008P) in its group table (3016S or 3006P) corresponding to the departing member node after a given time period has expired. In some cases, this time period may be user configurable. By removing the entry from the group table, the system ensures that state representing departed nodes is not continually propagated. This ensures that when nodes are continually joining and departing subfederations, group table entries are kept up-to-date. This then reduces the number of maintenance messages that have to be sent by avoiding sending messages to nodes that are no longer participating in a given subfederation. However, in some cases for a variety of reasons, departing nodes do not send out a group depart message. In such cases, the system responds as described below with regard to FIGS. 32 and 33.

Figure 33:
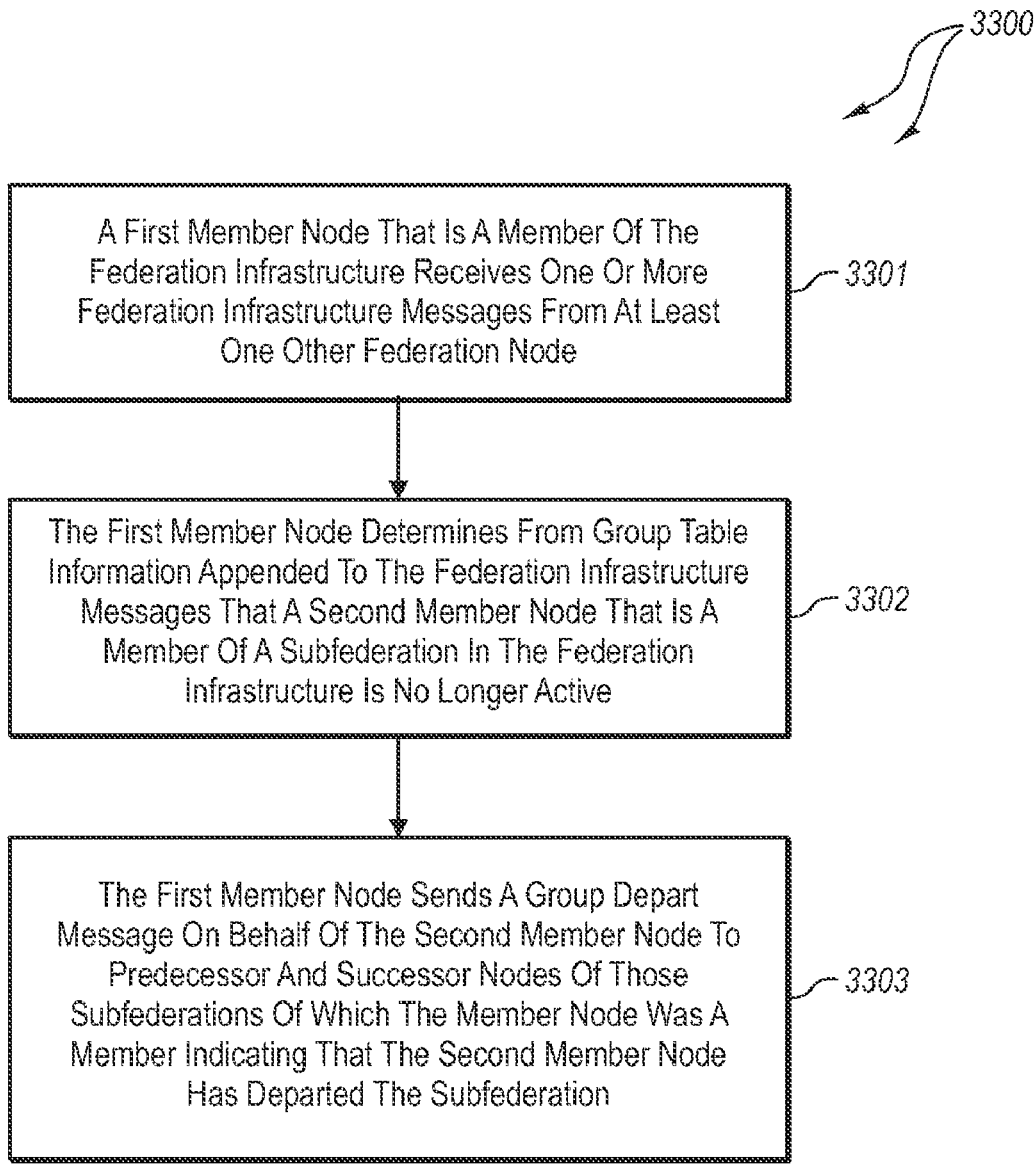
FIG. 33 illustrates an example flow chart of a method for maintaining a subfederation in a federation infrastructure.

FIG. 33 illustrates a flowchart of a method 3300 for maintaining a subfederation in a federation infrastructure. The method 3300 will now be described with frequent reference to the components and data of environment 3200.

Method 3300 includes an act of a first member node that is a member of the federation infrastructure receiving one or more federation infrastructure messages from at least one other federation node (act 3301). For example, node A 3225, which is a member of ring 3201, may receive federation infrastructure message 3210 from federation node B 3226. It should be noted that nodes A and B are arbitrarily chosen nodes and that potentially any node on the ring could send or receive a federation infrastructure message. A federation infrastructure message may include group table information 3211 and any other information pertinent to the maintenance of ring 3201 and/or subfederation 3201A and may, at least in some embodiments, comprise a ring maintenance message.

Method 3300 also includes an act of the first member node determining from group table information appended to the federation infrastructure messages that a second member node that is a member of a subfederation in the federation infrastructure is no longer active (e.g. inactive node 3206) (act 3302). For example, node A 3225 may determine from group table information 3211 appended to federation infrastructure message 3210 that inactive node 3206, which is a member of subfederation 3201A in the federation infrastructure is no longer active. The inactive node may have gone inactive (or may appear inactive) for a variety of reasons including a communications or system failure, power loss, connectivity loss or any number of other reasons. In some cases, the node may be running and may be properly connected, but for some reason, may appear to be offline or otherwise inactive. In any case, regardless of whether the node is inactive or only appears to be so, the inactive node's peers (i.e. predecessor and successor nodes (3207 and 3205, respectively) should be notified of the inactive node's inactivity.

In some embodiments, the first member node (node A 3225) is not a member of the subfederation (subfederation 3201A) of which the second member node (node B 3226) is a member. However, because both are members of ring 3201, message communication can proceed regardless of which subfederations each node belongs to. Moreover, in some cases, node A may notify a rendezvous point that the inactive node has departed the federation. This may occur in some embodiments when the rendezvous point is between the inactive node's group predecessor and successor nodes (e.g. 3207 and 3205, respectively).

Method 3300 includes an act of the first member node sending a group depart message on behalf of the second member node to predecessor and successor nodes of those subfederations of which the member node was a member indicating that the second member node has departed the subfederation (act 3303). For example, node A 3225 may send group depart message 3215 on behalf of inactive node 3206 to predecessor node 3207 and successor node 3205 of subfederation 3201A of which inactive node 3206 was a member. The group depart message 3215 may include indication 3216 indicating that inactive node 3206 has departed the subfederation 3201A. Accordingly, thereafter, the predecessor and successor nodes in the subfederation can update the entries in their group tables to indicate that inactive node 3206 is no longer participating as a member of subfederation 3201A. In this manner, other ring nodes can send a group depart message on behalf of a terminated or otherwise inactive node that departed without successfully sending a group depart message to its peers.

Thus, as described in the above text, a subfederation may be established and maintained within a federation infrastructure. A joining node may join an existing subfederation or may establish a new subfederation. Nodes that are departing a subfederation may be configured to send a group depart message so as to gracefully depart the subfederation. Nodes that do not depart gracefully can still be accounted for by implementing a system where the departed/inactive node's peers within the underlying federation can send a group depart message on behalf of the departed/inactive node. In this manner, any number of subfederations can be cheaply maintained within a federation infrastructure.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. In a federation infrastructure comprising a plurality of nodes that each include one or more processors and system memory and that are organized into a ring of nodes, the plurality of nodes being configured to route messages to one another through the ring, each of the plurality of nodes storing a routing table that includes one or more of a predecessor node of said node in the ring of nodes, a successor node of said node in the ring of nodes, or a plurality of neighbor nodes of said node in the ring of nodes including one or more first neighbor nodes in a first direction of said node in the ring of nodes and one or more second neighbor nodes in a second opposite direction of said node in the ring of nodes, a method for forming a subfederation within the federation infrastructure, the method comprising:

an act of determining that a joining node selected from the plurality of nodes in the federation infrastructure desires to join an identified subfederation within the federation infrastructure;

an act of the joining node accessing a first group table corresponding to the joining node, the first group table including membership information identifying zero or more subfederations within the federation infrastructure, each subfederation comprising a subset of the plurality of nodes in the federation infrastructure that are organized into a sub-ring, wherein each of the plurality of nodes in the federation maintains neighborhood information for each subfederation of which the node is aware;

an act of the joining node determining that no entry for the identified subfederation exists in the joining node's first group table;

based on the determination, an act of the joining node routing a group join message to a rendezvous point comprising one of the plurality of nodes in the federation infrastructure, such that the rendezvous point checks a second group table corresponding to the rendezvous point for an entry corresponding to the identified subfederation; and an act of the joining node receiving an indication from the rendezvous point indicating that the rendezvous point's second group table does not include a corresponding entry for the identified subfederation and that the joining node is the first member of the identified subfederation.

2. The method of claim 1, wherein, based on the information accessed in the first group table, the joining node determines that an entry for the identified subfederation exists in the joining node's first group table.

3. The method of claim 2, further comprising an act of the joining node routing a group join message to the closest known node in the identified subfederation.

4. The method of claim 3, wherein the node that received the group join message replies to the joining node indicating its neighborhood information for the identified subfederation, such that the joining node can learn about its neighborhood in the subfederation.

5. The method of claim 3, wherein the node that received the group join message replies to the joining node indicating its routing partner for the identified subfederation, such that the joining node can learn about its routing partner nodes in the subfederation.

6. The method of claim 1, wherein the joining node receives an indication from the rendezvous point indicating that the rendezvous point's group table includes a corresponding entry for the identified subfederation and further indicating the identity of at least one node in the identified subfederation.

7. The method of claim 1, further comprising an act of the rendezvous point forwarding the group join message to the closest node in the identified existing subfederation.

8. The method of claim 1, wherein the neighborhood comprises the closest N nodes in the subfederation on both the successor and the predecessor sides of the node, and wherein N is a configurable neighborhood size.

9. The method of claim 1, wherein the entry in each node's group table includes a group node instance ID which is incremented each time a node joins a group, such that if a node joins a group shortly after the node departs that same group, other nodes will know that the join occurred later than the depart.

10. The method of claim 1, wherein group table information is appended to an existing federation infrastructure message.

11. The method of claim 10, wherein the joining node updates its group table using information received as part of a federation infrastructure message.

12. The method of claim 10, further comprising an act of partitioning the group table such that each federation infrastructure message propagates a portion of the group table.

13. The method of claim 1, wherein the subfederation comprises substantially all of the characteristics and functionality of the underlying federation infrastructure.

14. In a federation infrastructure comprising a plurality of nodes that each include one or more processors and system memory and that are organized into a ring of nodes, the plurality of nodes being configured to route messages to one another through the ring, each of the plurality of nodes storing a routing table that includes one or more of a predecessor node of said node in the ring of nodes, a successor node of said node in the ring of nodes, or a plurality of neighbor nodes of said node in the ring of nodes including one or more first neighbor nodes in a first direction of said node in the ring of nodes and one or more second neighbor nodes in a second opposite direction of said node in the ring of nodes, a method for departing a subfederation within the federation infrastructure, the method comprising:

an act of determining that a departing node selected from the plurality of nodes is a member node of a subfederation within a federation infrastructure, the subfederation comprising a subset of the plurality of nodes in the federation infrastructure that are organized into a subring including the departing node; and an act of the member node routing a group depart message to the member node's successor and predecessor nodes in the subfederation, such that at least one of the successor and predecessor nodes performs the following:
updates a corresponding group table to include a no-longer-participating indication indicating that the departing member node is no longer participating in the subfederation; and
removes and associated entry in the group table corresponding to the departing member node after a time period has expired.

15. The method of claim 14, wherein liveness information corresponding to the departing member node indicates that the member node is in either a shutdown state or an unknown state.

16. The method of claim 15, further comprising:
an act of determining that at least one node in the subfederation includes liveness information in its group table indicating that the departing member node is unavailable;
an act of determining that the departing member node is currently available; and
an act of overriding the liveness information upon determining that the departing member node is available.

17. The method of claim 14, wherein at least one of the successor and predecessor nodes propagates the no-longer-participating indication for the departing member node to one or more other nodes in the subfederation.

18. In a federation infrastructure comprising a plurality of federation nodes that each include one or more processors and system memory and that are organized into a ring of nodes, the plurality of federation nodes being configured to route messages to one another through the ring, each of the plurality of federation nodes storing a routing table that includes one or more of a predecessor node of said node in the ring of nodes, a successor node of said node in the ring of nodes, or a plurality of neighbor nodes of said node in the ring of nodes including one or more first neighbor nodes in a first direction of said node in the ring of nodes and one or more second neighbor nodes in a second opposite direction of said node in the ring of nodes, a method for maintaining a subfederation in the federation infrastructure, the method comprising:

an act of a first member node of the plurality of federation nodes of the federation infrastructure receiving one or more federation infrastructure messages from at least one other federation node of the plurality of federation nodes;

an act of the first member node determining from group table information appended to the federation infrastructure messages that a second member node that is a member of a subfederation in the federation infrastructure is no longer active, the subfederation comprising a subset of the plurality of federation nodes in the federation infrastructure that are organized into a sub-ring including the second member node; and an act of the first member node sending a group depart message on behalf of the second member node to predecessor and successor nodes of those subfederations of which the member node was a member indicating that the second member node has departed the subfederation.

19. The method of claim 18, wherein the first member node is not a member of the subfederation of which the second member node is a member.

20. The method of claim 18, further comprising an act of the first member node notifying a rendezvous point that the second member node has departed the federation.

21. A computer program product comprising one or more computer storage devices having stored thereon computer executable instructions that, when executed by one or more processors, implement a method for forming a subfederation within a federation infrastructure that comprises a plurality of nodes that are organized into a ring of nodes, the plurality of nodes being configured to route messages to one another through the ring, each of the plurality of nodes storing a routing table that includes one or more of a predecessor node of said node in the ring of nodes, a successor node of said node in the ring of nodes, or a plurality of neighbor nodes of said node in the ring of nodes including one or more first neighbor nodes in a first direction of said node in the ring of nodes and one or more second neighbor nodes in a second opposite direction of said node in the ring of nodes, the method comprising:

an act of determining that a joining node selected from the plurality of nodes in the federation infrastructure desires to join an identified subfederation within the federation infrastructure;

an act of the joining node accessing a first group table corresponding to the joining node, the first group table including membership information identifying zero or more subfederations within the federation infrastructure, each subfederation comprising a subset of the plurality of nodes in the federation infrastructure that are organized into a sub-ring, wherein each of the plurality of nodes in the federation maintains neighborhood information for each subfederation of which the node is aware;

an act of the joining node determining that no entry for the identified subfederation exists in the joining node's first group table;

based on the determination, an act of the joining node routing a group join message to a rendezvous point comprising one of the plurality of nodes in the federation infrastructure, such that the rendezvous point checks a second group table corresponding to the rendezvous point for an entry corresponding to the identified subfederation; and an act of the joining node receiving an indication from the rendezvous point indicating that the rendezvous point's second group table does not include a corresponding entry for the identified subfederation and that the joining node is the first member of the identified subfederation.

22. The computer program product of claim 21, wherein the one or more computer storage devices comprise a computer system that includes the one or more processors.

23. A computer program product comprising one or more computer storage devices having stored thereon computer executable instructions that, when executed by one or more processors, implement a method for maintaining a subfederation in a federation infrastructure that comprises a plurality of federation nodes that are organized into a ring of nodes, the plurality of federation nodes being configured to route messages to one another through the ring, each of the plurality of federation nodes storing a routing table that includes one or more of a predecessor node of said node in the ring of nodes, a successor node of said node in the ring of nodes, or a plurality of neighbor nodes of said node in the ring of nodes including one or more first neighbor nodes in a first direction of said node in the ring of nodes and one or more second neighbor nodes in a second opposite direction of said node in the ring of nodes, the method comprising:

an act of a first member node of the plurality of federation nodes of the federation infrastructure receiving one or more federation infrastructure messages from at least one other federation node of the plurality of federation nodes;

an act of the first member node determining from group table information appended to the federation infrastructure messages that a second member node that is a member of a subfederation in the federation infrastructure is no longer active, the subfederation comprising a subset of the plurality of federation nodes in the federation infrastructure that are organized into a sub-ring including the second member node; and an act of the first member node sending a group depart message on behalf of the second member node to predecessor and successor nodes of those subfederations of which the member node was a member indicating that the second member node has departed the subfederation.

24. The computer program product of claim 23, wherein the one or more computer storage devices comprise a computer system that includes the one or more processors.

* * * * *